(12) United States Patent
Kawahara et al.

(10) Patent No.: US 11,892,060 B2
(45) Date of Patent: Feb. 6, 2024

(54) FRICTIONAL ROLLER REDUCER

(71) Applicant: NSK LTD., Tokyo (JP)

(72) Inventors: Hiroshi Kawahara, Kanagawa (JP);
Hiroki Hashiguchi, Kanagawa (JP);
Hirofumi Itagaki, Kanagawa (JP);
Azusa Hidaka, Kanagawa (JP); Hiroki Nishida, Kanagawa (JP); Naofumi Fujita, Kanagawa (JP); Hikari Yoshimi, Kanagawa (JP); Naohiro Hitomi, Kanagawa (JP); Masahiro Kita, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/926,873

(22) PCT Filed: Dec. 3, 2021

(86) PCT No.: PCT/JP2021/044543
§ 371 (c)(1),
(2) Date: Nov. 21, 2022

(87) PCT Pub. No.: WO2022/124234
PCT Pub. Date: Jun. 16, 2022

(65) Prior Publication Data
US 2023/0193984 A1    Jun. 22, 2023

(30) Foreign Application Priority Data

Dec. 7, 2020  (JP) ................................. 2020-202497
Sep. 6, 2021  (JP) ................................. 2021-144488
(Continued)

(51) Int. Cl.
*F16H 13/08*  (2006.01)
*F16H 13/14*  (2006.01)
*F16H 57/04*  (2010.01)

(52) U.S. Cl.
CPC ............. *F16H 13/08* (2013.01); *F16H 13/14* (2013.01); *F16H 57/043* (2013.01); *F16H 57/0486* (2013.01)

(58) Field of Classification Search
CPC .......... F16H 13/06; F16H 13/08; F16H 13/14; F16H 57/043
(Continued)

(56) References Cited

U.S. PATENT DOCUMENTS 1,737,997 A * 12/1929 Garrard ................... F16H 13/06
475/183
4,541,305 A * 9/1985 Hamabe .................. F16H 13/08
475/184
2022/0221031 A1   7/2022 Kawahara et al.

FOREIGN PATENT DOCUMENTS

JP        57-184351 Y    5/1981
JP       2008-196657 A   8/2008
(Continued)

OTHER PUBLICATIONS

Japanese Notice of Reason for Refusal for 2022-527952, dated Jun. 14, 2022.
(Continued)

*Primary Examiner* — Derek D Knight
(74) *Attorney, Agent, or Firm* — Sughrue Mion, PLLC

(57) ABSTRACT

A frictional roller reducer having a sun roller; a ring roller; a plurality of intermediate rollers having rolling surfaces coming in rolling contact with the sun roller and the ring roller; the sun roller or the ring roller having a pair of roller elements including inclined surface portions on a circumferential surface coming in rolling with rolling surfaces, the inclined surface portions inclined in directions going toward the intermediate rollers in a radial direction as going away from each other in the axial direction; a pressing device pressing the pair of roller elements in directions going closer (Continued)

to each other, and an elastic member arranged between the pair of roller elements, the elastic member urging the pair of roller elements in directions going away from the rolling surface of the intermediate rollers.

21 Claims, 55 Drawing Sheets

(30) Foreign Application Priority Data

| Sep. 9, 2021 | (JP) | 2021-146763 |
| Sep. 27, 2021 | (JP) | 2021-156570 |
| Sep. 30, 2021 | (JP) | 2021-162050 |
| Oct. 29, 2021 | (JP) | 2021-177185 |

(58) Field of Classification Search
USPC .................................. 475/195, 196
See application file for complete search history.

(56) References Cited

FOREIGN PATENT DOCUMENTS

| JP | 2010-121711 A | 6/2010 |
| JP | 2012-193793 A | 10/2012 |
| JP | 2016-223468 A | 12/2016 |
| JP | 2017-120121 A | 7/2017 |
| WO | 2020/188967 A1 | 9/2020 |

OTHER PUBLICATIONS

Japanese Decision to Grant a Patent for 2022-527952, dated Aug. 23, 2022.
International Search Report for PCT/JP2021/044543, dated Jan. 11, 2022.

* cited by examiner

FRICTIONAL ROLLER REDUCER

CROSS REFERENCE TO RELATED APPLICATIONS

This application is a National Stage of International Application No. PCT/JP2021/044543 filed Dec. 3, 2021, claiming priority based on Japanese Patent Application No. 2020-202497 filed Dec. 7, 2020, Japanese Patent Application No. 2021-144488 filed Sep. 6, 2021, Japanese Patent Application No. 2021-146763 filed Sep. 9, 2021, Japanese Patent Application No. 2021-156570 filed Sep. 27, 2021, Japanese Patent Application No. 2021-162050 filed Sep. 30, 2021, Japanese Patent Application No. 2021-177185 filed Oct. 29, 2021.

TECHNICAL FIELD

The present invention relates to a frictional roller reducer that is incorporated, for example, in a drive system of an electric vehicle for transmitting torque to driven wheels after reducing the rotation (increasing the torque) of an electric motor.

BACKGROUND ART

In an electric vehicle, in order to improve the efficiency of the electric motor that is the drive source and increase the traveling distance per charge, the rotation of the output shaft of a small electric motor is transmitted to the driven wheels after being decelerated by a reducer. As such a reducer, a frictional roller type reducer can be used.

FIG. 54 illustrates a frictional roller reducer described in JP 2017-120121A. The frictional roller reducer 100 includes an input shaft 101, an output shaft 102, a sun roller 103, a ring roller 104, a plurality of intermediate rollers 105, and a loading cam device 106.

The output shaft 102 is supported coaxially with the input shaft 101 so as to be able to relatively rotate with respect to the input shaft 101. The output shaft 102 has a flange portion 107 protruding outward in the radial direction on one side in the axial direction (left side in FIG. 54).

The sun roller 103 has an inner-diameter side rolling contact surface 108 having an arc-shaped cross-sectional shape (generating line) on the outer circumferential surface. The sun roller 103 is provided integrally with the input shaft 101 at the end portion on the other side in the axial direction (right side in FIG. 54) of the input shaft 101.

The ring roller 104 has an outer-diameter side rolling contact surface 109 on the inner circumferential surface, and is arranged coaxially with the sun roller 103 around the sun roller 103. The ring roller 104 includes a pair of roller elements 110a, 110b and a connecting cylinder 111.

Each of a pair of roller elements 110a, 110b has an inclined surface portions 112a, 112b respectively on the inner circumferential surface, the inclined surface being inclined in a direction in which the inner diameter decreases as the distance from each other in the axial direction increases, and an engaging concave and convex portion 113 respectively at the tip end portion that faces each other. That is, the outer-diameter side rolling contact surface 109 is configured by the inclined surface portions 112a, 112b of the pair of roller elements 110a, 110b.

The pair of roller elements 110a, 110b are combined so that the respective engaging concave and convex portions 113 are engaged with each other so as to be able to relatively displace in the axial direction and not to be able to relatively rotate. Further, of the pair of roller elements 110a, 110b, the roller element 110a on the one side in the axial direction is internally fitted in a portion on the one side in the axial direction of the connecting cylinder 111, and is prevented from being displaced toward the one side in the axial direction and from being rotated with respect to the connecting cylinder 111 by a retaining ring 114 locked to the inner circumferential surface of the end portion on the one side in the axial direction of the connecting cylinder 111. On the other hand, the roller element 110b on the other side in the axial direction is internally fitted at the intermediate portion in the axial direction of the connecting cylinder 111 so as to be able to displace in the axial direction with respect to the connecting cylinder 111. That is, the pair of roller elements 110a, 110b and the connecting cylinder 111 rotate integrally.

Each of the intermediate rollers 105 has an arc-shaped cross-sectional shape (generating line) on the outer circumferential surface, and includes a rolling surface 115 that comes in rolling contact with the inner-diameter side rolling contact surface 108 and the outer-diameter side rolling contact surface 109. Each of the intermediate rollers 105 is supported with respect to a carrier 116, which is supported by a portion such as a housing that does not rotate even in use, so as to be able to rotate around its center axis and to displace in the radial direction around the center axis O of the input shaft 101. That is, although each of the intermediate rollers 105 can rotate, it is prevented from revolving around the center axis of the input shaft 101.

The loading cam device 106 presses the pair of roller elements 110a, 110b in directions toward each other. The loading cam device 106 includes the roller element 110b on the other side in the axial direction, a cam disk 117, and a plurality of rolling bodies 118.

The roller element 110b on the other side in the axial direction has a drive-side cam surface 119 on the side surface on the other side in the axial direction, in which the same number of concave and convex portions are alternately arranged in the circumferential direction.

The cam disk 117 includes a cylindrical portion 120, a side plate portion 121 which is bent outward in the radial direction from an end portion on the one side in the axial direction of the cylindrical portion 120, and a convex portion 122 protruding toward the other side in the axial direction from one position in the circumferential direction of an end portion on the other side in the axial direction of the cylindrical portion 120. The side plate portion 121 has a driven-side cam surface 123 on the side surface on the one side in the axial direction, in which the same number of concave and convex portions are alternately arranged in the circumferential direction.

The cam disk 117 is internally fitted and supported by an angular contact ball bearing 124 at the end portion on the other side in the axial direction of the connecting cylinder 111 so as to be able to relatively rotate with respect to the connecting cylinder 111 and not to be able to displace toward the other side in the axial direction with respect to the connecting cylinder 111. Further, in the cam disk 117, the cylindrical portion 120 is externally fitted onto the flange portion 107 of the output shaft 102 without looseness, and the convex portion 122 is engaged with an axial concave groove provided on the outer circumferential surface of the flange portion 107 of the output shaft 102 so as to be able to displace in the axial direction. That is, the output shaft 102 and the cam disk 117 are combined so as to be able to relatively displace in the axial direction, and not to be able to relatively rotate. In other words, the output shaft 102 and the cam disk 117 rotate integrally.

Each of the plurality of rolling bodies 118 is held between the drive-side cam surface 119 and the driven-side cam surface 123.

In the frictional roller reducer 100, when the input shaft 101 is rotationally driven and the sun roller 103 is rotationally driven, the intermediate rollers 105 rotate based on the rolling contact between the inner-diameter side rolling contact surface 108 of the sun roller 103 and the rolling surface 115 of the intermediate rollers 105. When the intermediate rollers 105 rotate, the ring roller 104 rotate around the center axis O of the input shaft 101 based on the rolling contact between the rolling surface 115 of the intermediate rollers 105 and the outer-diameter side rolling contact surface 109 of the ring roller 104. The rotation of the ring roller 104 is transmitted to the output shaft 102 through the loading cam device 106.

When the roller element 110b on the other side in the axial direction of the ring roller 104 rotates, the amount that the rolling bodies 118 of the loading cam device 106 ride up from the bottom portions of the concave portions of the drive-side cam surface 119 as well as the amount that the rolling bodies 118 of the loading cam device 106 ride up from the bottom portions of the concave portions of the driven-side cam surface 123 increase. Due to this, the dimension in the axial direction of the loading cam device 106 increases, and when the pair of roller elements 110a, 110b are pressed in directions toward each other, the inner diameter of the portions of the inclined surface portions 112a, 112b of the outer-diameter side rolling contact surface 109, that comes in rolling contact with the rolling surface 115, becomes smaller. As a result, the surface pressure at the traction portion (rolling contact portion) between the outer-diameter side rolling contact surface 109 and the rolling surface 115 increases. Further, when the intermediate rollers 105 are pressed inward in the radial direction around the center axis O of the input shaft 101 due to the increase in the surface pressure, the surface pressure at the traction portion between the rolling surface 115 and the inner-diameter side rolling contact surface 108 also increases. As a result, the torque input from the input shaft 101 to the sun roller 103 can be transmitted to the ring roller 104 through the intermediate rollers 105 and can be taken out from the output shaft 102 through the loading cam device 106 without causing excessive slipping in each traction portion.

CITATION LIST

Patent Literature

Patent Literature 1: JP 2017-120121A
Patent Literature 2: JP 2016-223468A
Patent Literature 3: JP 2008-196657A

SUMMARY OF THE INVENTION

Technical Problem

The frictional roller reducer 100 described in JP 2017-120121A has room for improvement in the aspect of ensuring excellent transmission efficiency.

In the frictional roller reducer 100, when the surface pressure at the traction portions between the rolling surface 115 and the inner-diameter side rolling contact surface 108 and the outer-diameter side rolling contact surface 109 is insufficient, the transmission efficiency of the frictional roller reducer 100 decreases, and, in extreme cases, harmful slipping called gross slipping (excessive slipping) may occur. When gross slipping occurs, the rolling surface 115, and the inner-diameter side rolling contact surface 108 and/or the outer-diameter side rolling contact surface 109 come directly into rolling contact with each other without intervening a thin film of traction oil. As a result, the rolling surface 115, and the inner-diameter side rolling contact surface 108 and/or outer-diameter side rolling contact surface 109 are significantly worn, and the durability of the frictional roller reducer 100 is significantly reduced. In order to prevent the occurrence of such gross slipping, it is important to keep the operating traction coefficient $\mu$ (=tangential force/normal force) that represents the actual operating state below the limit (maximum traction coefficient $\mu_{max}$), which represents the limit value of the traction coefficient (=tangential force/normal force) at which torque can be transmitted without causing gross slipping. The maximum traction coefficient $\mu_{max}$ is also affected by parameters other than the torque to be transmitted between the input shaft 101 and the output shaft 102.

For example, it is known that the traction coefficient changes according to the temperature (oil temperature) of the traction oil that is supplied to the traction portions. More specifically, in a normal temperature environment (for example, in an environment of 0° C. or higher), as the oil temperature becomes higher, the viscosity of the traction oil lowers, and thus the traction coefficient also decreases. On the other hand, as described in JP 2016-223468A, it is known that in an extremely low temperature environment (for example, in an environment of less than 0° C.), as the oil temperature lowers, the viscosity of the traction oil increases while the maximum traction coefficient decreases.

Moreover, J P 2008-196657A describes that the traction coefficient changes under the influence of the slip rate $S(=(U_1-U_2)/U_1)$, which represents the delay of the peripheral speed $U_2$ of the driven side rotating body with respect to the peripheral speed $U_1$ of the driving side rotating body.

Further, as illustrated in FIG. 55, it is known that the maximum traction coefficient $\mu_{max}$ increases as the surface pressure P of the traction portions increases.

Regardless of the influence of parameters other than the torque to be transmitted between the input shaft 101 and the output shaft 102, such as the oil temperature of the traction oil, the peripheral speed and the surface pressure at the traction portions, it is effective to secure a large difference or ratio (traction coefficient safety factor) between the maximum traction coefficient $\mu_{max}$ and the operating traction coefficient $\mu$ in order to transmit torque from the sun roller 103 to the ring roller 104 without causing gross slipping in each traction portion. However, when the traction coefficient safety factor is excessively increased, the surface pressure of each traction portion becomes excessive in order to keep the operating traction coefficient $\mu$ small, and the rolling resistance may increase unnecessarily. As a result, the transmission loss becomes large, and the transmission efficiency of the frictional roller reducer 100 may decrease.

By adopting a structure where a pair of roller elements are pressed in directions toward each other by a pressing device provided with an actuator such as a hydraulic pump or an electric motor and capable of adjusting the pressing force to an arbitrary amount, the surface pressure of the traction portions can be adjusted to an appropriate amount while considering the influence of parameters other than the torque to be transmitted between the input shaft 101 and the output shaft 102, such as the oil temperature of the traction oil, peripheral speed at the traction portions, and the surface pressure. As a result, the occurrence of gross slipping can be prevented, and the transmission loss can be suppressed to a small amount. However, in such a structure, since the actuator for driving the pressing device is provided separately from the drive source of the input shaft, the frictional roller reducer as a whole may be larger or complicated. And/or, since energy loss also occurs in the actuator, the efficiency of the frictional roller reducer as a whole may deteriorate.

As another means, it can be considered to adjust the lead angle of the drive-side cam surface and/or driven-side cam surface of the loading cam device or the inclination angle of the inclined surface portions of the pair of roller elements of the ring roller. As illustrated in FIG. 55, since the maximum traction coefficient $\mu_{max}$ increases as the surface pressure P of the traction portion increases, when the torque transmitted by the frictional roller reducer increases, the surface pressure of the traction portion becomes excessive. Therefore, when the torque transmitted by the frictional roller reducer is large, by regulating the lead angle of the drive-side cam surface and/or driven-side cam surface or the inclination angle of the inclined surface portions of the roller elements so as to suppress the increase in the pressing force by the loading cam device or to reduce the pressing force, setting the surface pressure of the traction portion to an appropriate value, it is possible to prevent the occurrence of gross slipping and suppress the transmission loss. However, when adopting such a structure, the lead angle or the inclination angle needs to be determined in consideration of the elastic deformation of the roller elements and the cam disk etc. due to torque transmission and the manufacturing error of these members, and there is a problem that high shape accuracy is required and mass productivity is low.

Further, when the frictional roller reducer 100 is in operation, if skew occurs in which the intermediate rollers 105 rotate while the center axes of the intermediate rollers 105 are tilted with respect to the center axis of the ring roller 104, a force (skew force) in a direction perpendicular to the tangential direction (torque transmission direction, rolling direction) of the outer-diameter side rolling contact surface 109 and the rolling surface 115 is applied to the outer-diameter side rolling contact surface 109 and the rolling surface 115. This skew force is proportional to the magnitude of the force (tangential force, torque) transmitted by the traction portion between the outer-diameter side rolling contact surface 109 and the rolling surface 115. The skew force has an axial component that is in the same direction as the direction where the loading cam device 106 presses the pair of roller elements 110a, 110b. Therefore, when the skew occurs in the intermediate rollers 105, the pressing force of the outer-diameter side rolling contact surface 109 against the rolling surface 115 changes.

When the traction coefficient in a direction perpendicular to the torque transmission direction in a traction portion is constant, when the pressing force of the outer-diameter side rolling contact surface 109 against the rolling surface 115 increases, the skew force in the traction portion between the outer-diameter side rolling contact surface 109 and the rolling surface 115 also increases. In other words, when skew occurs in the intermediate rollers 105, the pressing force of the outer-diameter side rolling contact surface 109 against the rolling surface 115 may increase at an accelerating rate. When the pressing force of the outer-diameter side rolling contact surface 109 against the rolling surface 115 becomes excessive, the transmission efficiency of the frictional roller reducer 100 may decrease, or damage such as seizure may occur. Further, when the amount of displacement of the roller element 110b on the other side in the axial direction to the one side in the axial direction increases as the pressing force of the outer-diameter side rolling contact surface 109 against the rolling surface 115 increases, the rolling bodies 118 may come off (ride on) the drive-side cam surface 119 and/or the driven-side cam surface 123.

The rate of increase in the pressing force based on the occurrence of the skew in the intermediate rollers 105 is determined by the inclination angle of the inclined surface portions 112a, 112b with respect to the center axis O of the input shaft 101. Therefore, by increasing the inclination angle (making the inclination steep) of the inclined surface portions 112a, 112b, the rate of increase of the pressing force can be suppressed to a low level.

However, when the inclination angle of the inclined surface portions 112a, 112b is increased, the peripheral speed difference between both end portions in the lengthwise direction of the contact ellipse existing in the traction portion between the outer-diameter side rolling contact surface 109 and the rolling surface 115 becomes large, and the differential slipping in the traction portion becomes large, so as to cause a problem in which the transmission efficiency of the frictional roller reducer 100 is lowered. Moreover, when the inclination angle of the inclined surface portions 112a, 112b is increased, the normal force acting on the traction portion between the outer-diameter side rolling contact surface 109 and the rolling surface 115 becomes smaller based on the loading cam device 106 pressing the pair of roller elements 110a, 110b in directions toward each other. Therefore, in order to obtain a desired normal force, the pressing force that should be generated by the loading cam device 106 becomes large, and this causes a problem that the loading cam device 106 becomes large.

It can also be considered a means for preventing excessive displacement of the roller elements in the axial direction by providing flange portions protruding inward in the radial direction at the end portions on the small diameter side of the roller elements, and by making the side surfaces in the axial direction of the flange portions face side surfaces in the axial direction of the intermediate rollers. However, in such a structure, until the side surfaces in the axial direction of the flange portions and the side surfaces in the axial direction of the intermediate rollers come in contact with each other, the pressing force of the outer-diameter side rolling contact surface against the rolling surface becomes excessive, and it becomes impossible to prevent a decrease in the transmission efficiency of the frictional roller reducer. Furthermore, friction loss may occur or damage such as seizure may occur due to the sliding of the side surfaces in the axial direction of the flange portions and the side surfaces in the axial direction of the intermediate rollers.

In view of the circumstances described above, it is an object of the present invention to achieve a structure of a frictional roller reducer that is capable of securing good transmission efficiency and preventing an accelerating increase in the pressing force.

Solution to Problem

The frictional roller reducer according to one aspect of the present invention includes a sun roller, a ring roller, a plurality of intermediate rollers, a pressing device, and an elastic member.

The ring roller is arranged coaxially with the sun roller around the sun roller.

The plurality of intermediate rollers respectively have a rolling surface on an outer circumferential surface thereof, the rolling surfaces thereof coming in rolling contact with the sun roller and the ring roller.

The sun roller or the ring roller has inclined surface portions inclined in directions going toward the intermediate rollers in a radial direction as going away from each other in an axial direction, on a circumferential surface that comes in rolling contact with the rolling surface, in other words, on an outer circumferential surface of the sun roller, or on an inner circumferential surface of the ring roller, and has a pair of roller elements that are supported so as to be able to relatively displace in the axial direction.

The pressing device presses the pair of roller elements in directions going toward each other.

The elastic member is arranged between the pair of roller elements and elastically urges the pair of roller elements in directions going away from the rolling surfaces of the intermediate rollers.

In the frictional roller reducer according to one aspect of the present invention, the pressing device can be configured by a loading cam device.

In the frictional roller reducer according to one aspect of the present invention, the rolling surfaces respectively have a pair of intermediate roller side inclined surface portions arranged on both side portions in the axial direction and inclined in directions where outer diameters thereof becomes smaller as going away from each other in the axial direction, and coming in rolling contact with the inclined surface portions, and have a connection surface portion arranged in an intermediate portion in the axial direction, having an outer diameter that does not change in the axial direction or a radius of curvature of a generating line thereof that is larger than a radius of curvature of generating lines of the pair of intermediate roller side inclined surface portions, and coming in rolling contact with the other roller of the sun roller and the ring roller.

In the frictional roller reducer according to one aspect of the present invention, the pair of intermediate roller-side inclined surface portions may respectively have an arc-shaped or a linear generating line.

In the frictional roller reducer according to one aspect of the present invention, a gap may be provided between the elastic member and at least one roller element of the pair of roller elements in an initial state before the pressing device exerts pressing force.

In the frictional roller reducer according to one aspect of the present invention, the elastic member may be configured by one or a plurality of disc springs, and when the thickness of the disc springs is t and the total deflection amount is $h_0$, $h_0/t$ may be 1.0 or less.

In the frictional roller reducer according to one aspect of the present invention, the ring roller may have the pair of roller elements, which have the inclined surface portions inclined in directions where inner diameters thereof become smaller as going away from each other in the axial direction, on the inner circumferential surface.

In the frictional roller reducer according to one aspect of the present invention, the elastic member may have two-disc springs combined in a substantially V-shaped cross section having an opening on an inner diameter side thereof.

Alternatively, in the frictional roller reducer according to one aspect of the present invention, the elastic member may have two-disc springs combined in a substantially V-shaped cross section having an opening on an outer diameter side thereof.

In the frictional roller reducer according to one aspect of the present invention, the ring roller may have a connecting cylinder that supports the pair of roller elements so as to be able to relatively displace in the axial direction and not to be able to relatively rotate.

In the frictional roller reducer according to one aspect of the present invention, the connecting cylinder may have an opening section that opens to an inner circumferential surface and an outer circumferential surface thereof.

The opening section may have a size such that end surfaces of the pair of roller elements facing each other can be visually seen from a radially outer side of the connecting cylinder.

The opening section may have a size such that a contact state between the elastic member and the pair of roller elements can be visually seen from the radially outer side of the connecting cylinder.

The opening section may form an oil discharge hole.

The opening section may be provided at a plurality of locations uniformly spaced in a circumferential direction of the connecting cylinder.

In the frictional roller reducer according to one aspect of the present invention, an oil discharge passage may be provided that communicates a radial inner side and a radial outer side of a space existing between the pair of roller elements and including the elastic member.

In the frictional roller reducer according to one aspect of the present invention, the elastic member may be configured by one or a plurality of disc springs.

The elastic member may have notches that open to an outer circumferential edge and/or an inner circumferential edge thereof or may have through holes that penetrate at an intermediate portion in the radial direction thereof.

In the frictional roller reducer according to one aspect of the present invention, a shim plate held between at least one roller element of the pair of roller elements and the elastic member may be provided, and the shim plate may have concave grooves or ridges along a radial direction on a side surface in the axial direction thereof.

In the frictional roller reducer according to one aspect of the present invention, a lock washer may be provided between at least one roller element of the pair of roller elements and the elastic member.

In the frictional roller reducer according to one aspect of the present invention, at least one roller element of the pair of roller elements may have concave grooves along a radial direction on a tip-end surface thereof.

In the frictional roller reducer according to one aspect of the present invention, the elastic member may be configured by a wave washer.

Alternatively, in the frictional roller reducer according to one aspect of the present invention, the elastic member may be configured by a torsion coil spring. In this case, the frictional roller reducer according to one aspect of the present invention may include a retainer arranged between the pair of roller elements and have retaining holes penetrating in the axial direction at a plurality of locations in the circumferential direction, and may hold the torsion coil spring in each of the retaining holes.

Effect of Invention

With the frictional roller reducer according to one aspect of the present invention, it is possible to secure good transmission efficiency and to prevent an accelerating increase in pressing force.

DESCRIPTION OF THE EMBODIMENTS

First Example of First Embodiment

Figure 1:
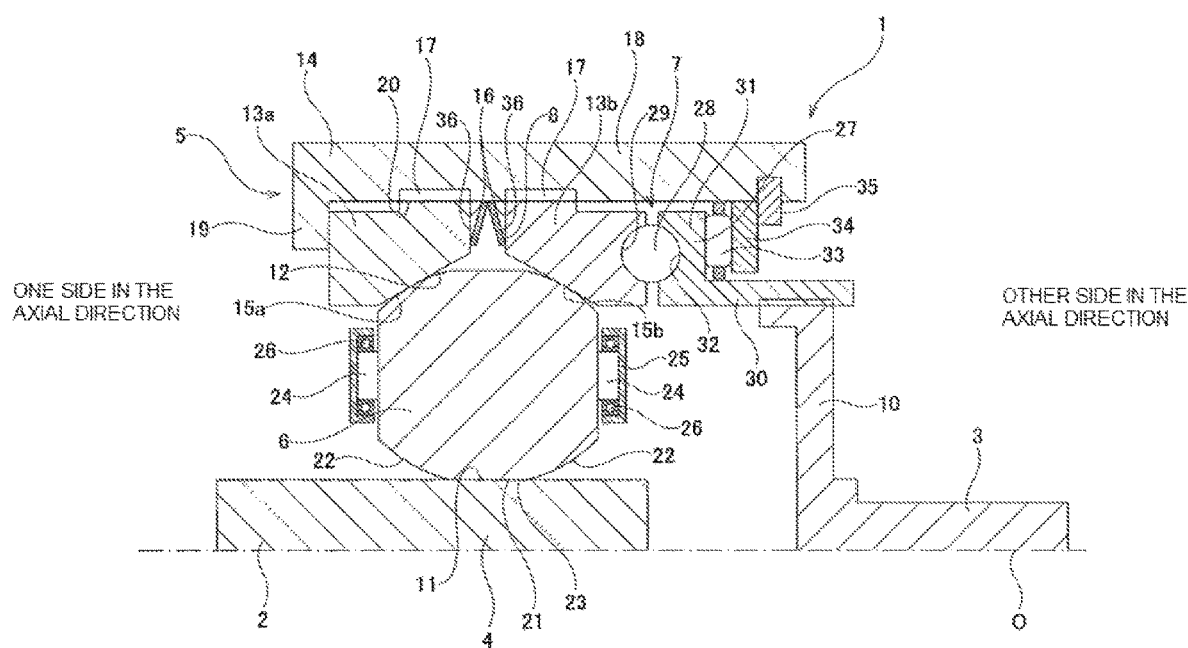
FIG. 1 a schematic cross-sectional view illustrating a frictional roller reducer according to a first example of a first embodiment of the present invention.

FIG. 1 to FIG. 6(C) illustrate a first example of a first embodiment of the present invention. The frictional roller reducer 1 of this example increases the torque of the input shaft 2 and then outputs the torque to the output shaft 3. The frictional roller reducer 1 includes an input shaft 2, an output shaft 3, a sun roller 4, a ring roller 5, a plurality of intermediate rollers 6, a loading cam device 7, and an elastic member 8.

In the following description, the axial direction, the radial direction, and the circumferential direction refer to the axial direction, the radial direction, and the circumferential direction of the input shaft 2 unless stated otherwise. The axial direction, the radial direction, and the circumferential direction of the input shaft 2 coincide with the axial direction, the radial direction, and the circumferential direction of the output shaft 3, the sun roller 4, and the ring roller 5.

Figure 2:
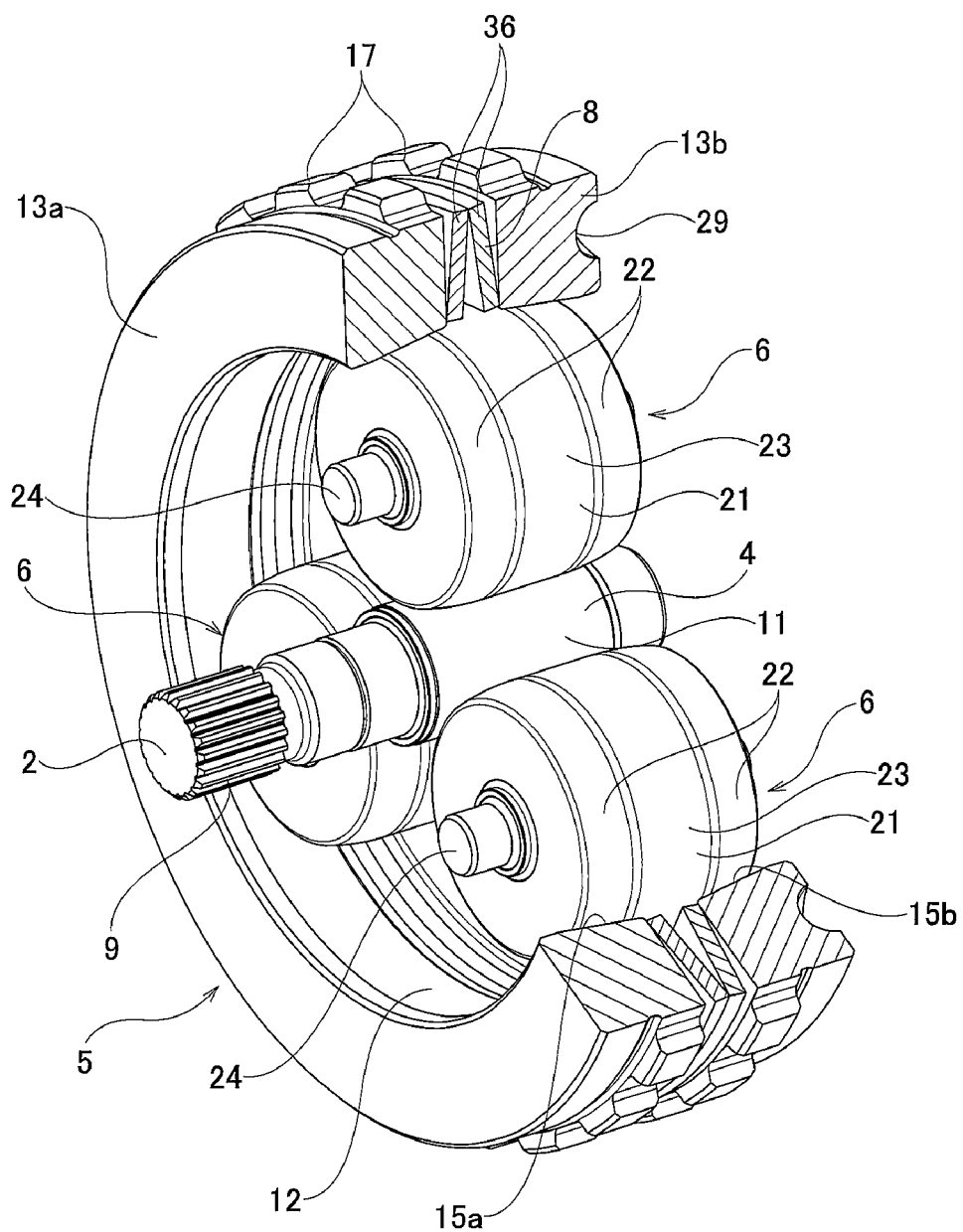
FIG. 2 is a partially cut perspective view illustrating a sun roller, a pair of roller elements of a ring roller, intermediate rollers, and an elastic member taken out from the frictional roller reducer of the first example of the first embodiment.
Figure 3:
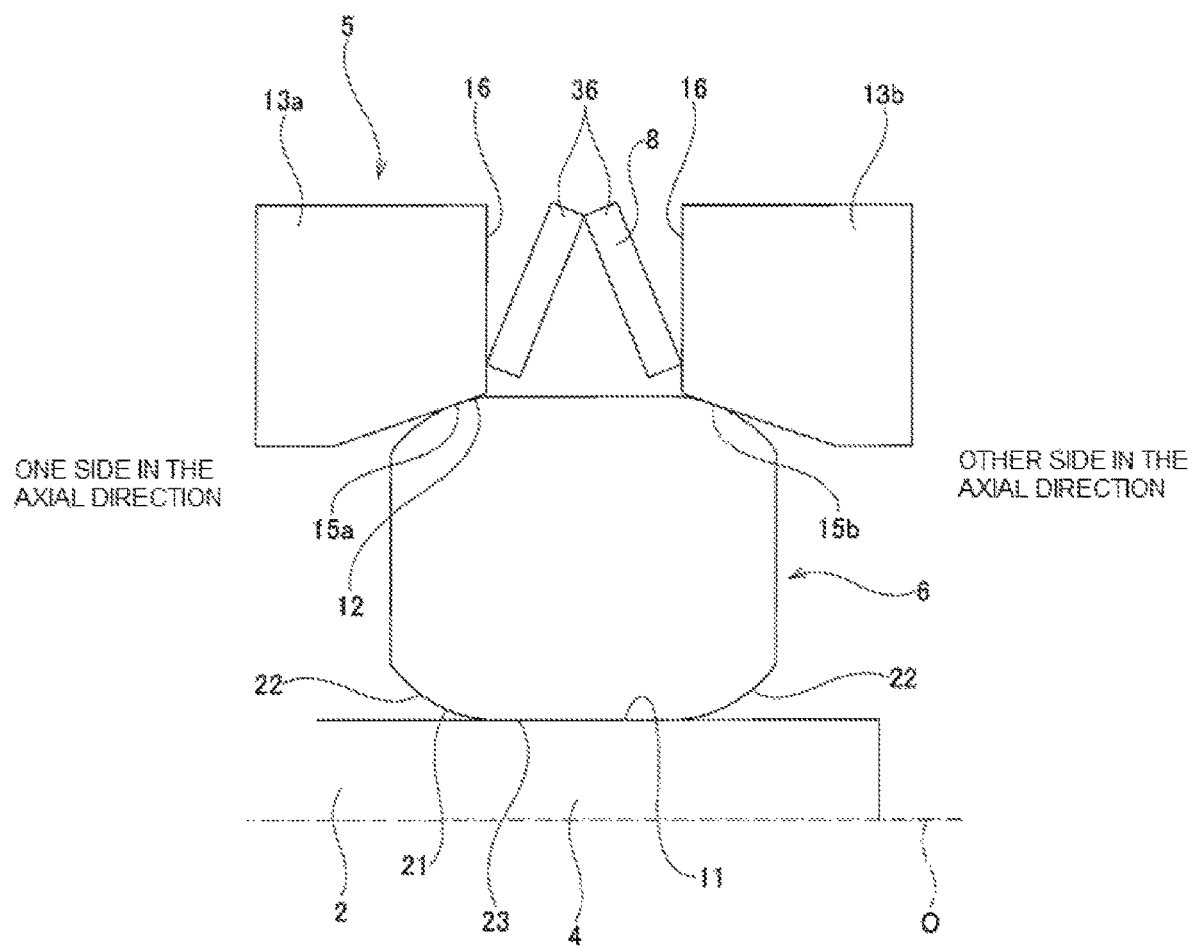
FIG. 3 is a schematic cross-sectional view illustrating the sun roller, the pair of roller elements of the ring roller, the intermediate rollers, and the elastic member taken out from the frictional roller reducer of the first example of the first embodiment.

The input shaft 2 has a male spline portion 9 at an end portion on one side in the axial direction (base end portion; the end portion on the left side in FIG. 2). A female spline portion provided on an output shaft of a drive source such as an electric motor or an engine is spline-engaged with the male spline portion 9. That is, the input shaft 2 is rotationally driven by the drive source.

The output shaft 3 is supported so as to be coaxial with the input shaft 2 and so as to be able to rotate relative to the input shaft 2. The output shaft 3 has a flange portion 10 protruding outward in the radial direction at an end portion on the one side in the axial direction (tip end portion; the end portion on the left side in FIG. 1).

The sun roller 4 has an inner-diameter side rolling contact surface 11 on the outer circumferential surface. In this example, the inner-diameter side rolling contact surface 11 is configured by a cylindrical surface whose outer diameter does not change in the axial direction. The sun roller 4 is provided integrally with the input shaft 2 at an end portion on the other side in the axial direction of the input shaft 2 (tip end portion; the end portion on the right side in FIG. 1 and FIG. 2). However, the sun roller and the input shaft may be configured separately, and the sun roller and the input shaft may be coaxially coupled and fixed to each other.

The ring roller 5 has an outer-diameter side rolling contact surface 12 on the inner circumferential surface, and is arranged around the sun roller 4 so as to be coaxial with the sun roller 4. The ring roller 5 includes a pair of roller elements 13a, 13b and a connecting cylinder 14.

The pair of roller elements 13a, 13b have inclined surface portions 15b on the inner circumferential surface that are inclined in a direction closer to the intermediate rollers 6 in the radial direction, in other words, in a direction in which the inner diameter becomes smaller, as going away from each other in the axial direction. That is, in this example, the outer-diameter side rolling contact surface 12 is configured by the inclined surface portions 15b of the pair of roller elements 13a, 13b. In this example, the inclined surface portions 15a, 15b are configured by conical concave surfaces having a linear generating line (cross-sectional shape).

Moreover, the pair of roller elements 13a, 13b has flat surface portions 16 orthogonal to the respective center axis O at the tip-end surfaces that face each other, that is, at an end surface on the other side in the axial direction of the roller element 13a on the one side in the axial direction and at an end surface on the one side in the axial direction of the roller element 13b on the other side in the axial direction. In this example, the entire tip-end surfaces of the pair of roller elements 13a, 13b are configured by the flat surface portions 16. Furthermore, the pair of roller elements 13a, 13b has element-side engaging concave and convex portions 17, in which concave portions and convex portions are alternately arranged over the entire circumference, on the outer circumferential surfaces of portions situated on the sides closer to each other in the axial direction.

The connecting cylinder 14 has a cylindrical portion 18 and a side plate portion 19 bent inward in the radial direction from an end portion on the one side in the axial direction of the cylindrical portion 18. The cylindrical portion 18 has a cylinder-side engaging concave and convex portion 20, in which concave portions and convex portions are alternately arranged over the entire circumference, on the inner circumferential surface in the range from the end portion on the one side in the axial direction to the intermediate portion.

The ring roller 5 of this example is configured by combining the pair of roller elements 13a, 13b with the connecting cylinder 14 so as to be able to relatively displace in the axial direction and not to be able to relatively rotate. Specifically, of the pair of roller elements 13a, 13b, the roller element 13a on the one side in the axial direction engages the element-side engaging concave and convex portion 17 with a portion on the one side in the axial direction of the cylinder-side engaging concave and convex portion 20 of the connecting cylinder 14, and is prevented from displacing to the one side in the axial direction by abutting an end surface on the one side in the axial direction against a side surface on the other side in the axial direction of the side plate portion 19 of the connecting cylinder 14. On the other hand, the roller element 13b on the other side in the axial direction engages the element-side engaging concave and convex portion 17 with the intermediate portion in the axial direction of the cylinder-side engaging concave and convex portion 20 of the connecting cylinder 14 so as to be able to displace in the axal direction. Therefore, the pair of roller elements 13a, 13b and the connecting cylinder 14 rotate integrally.

Each of the plurality of intermediate rollers 6 has a rolling surface 21 on the outer circumferential surface, which comes in rolling contact with the inner-diameter side rolling contact surface 11 of the sun roller 4 and the outer-diameter side rolling contact surface 12 of the ring roller 5. The rolling surface 21 has a pair of intermediate roller-side inclined surface portions 22 that is arranged on both sides in the axial direction and is inclined in directions in which the outer diameter becomes smaller as going away from each other in the axial direction, and has a connection surface portions 23 that is arranged in the intermediate portion in the axial direction and connects the pair of intermediate roller-side inclined surface portions 22. In this example, each of the pair of intermediate roller-side inclined surface portions 22 is configured by a convex curved surface having an arc-shaped generating line (cross-sectional shape). Moreover, the connection surface portion 23 is configured by a cylindrical surface whose outer diameter does not change in the axial direction. The inner-diameter side rolling contact surface 11 of the sun roller 4 comes in rolling contact with the connection surface portions 23 of the rolling surface 21, and the inclined surface portions 15a, 15b of the outer-diameter side rolling contact surface 12 of the ring roller 5 come in rolling contact with the intermediate roller-side inclined surface portions 22 of the rolling surface 21.

Each of the intermediate rollers 6 is supported by a support member such a housing that does not rotate even in use, so as to be able to rotate about the rotation shaft 24 provided in the center, as well as to be able to displace in the radial direction. That is, each of the intermediate rollers 6 can rotate, but is prevented from revolving about the center axis O of the input shaft 2.

The structure for supporting the intermediate rollers 6 with respect to the support member so as to be able to rotate and be displaced in the radial direction is not specifically limited, and various conventionally known structures can be adopted. Specifically, for example, the rotation shafts 24 of the intermediate rollers 6 can be supported by holders 25 through radial rolling bearings 26 so as to be able to rotate, and the holders 25 can be supported by the support member so as to be able to pivot about pivot shafts located in portions deviated from the center axis of the radial rolling bearings 26 in the circumferential direction.

The loading cam device 7 presses the pair of roller elements 13a, 13b in directions coming closer to each other. That is, in the frictional roller reducer 1 of this example, the loading cam device 7 forms the pressing device. The loading cam device 7 includes the roller element 13b on the other side in the axial direction, a cam disk 27, and a plurality of rolling bodies 28.

The roller element 13b on the other side in the axial direction has a drive-side cam surface 29 on a side surface on the other side in the axial direction, in which the same number of concave portions and convex portions are alternately arranged in the circumferential direction.

The cam disk 27 includes a cylindrical portion 30 and a side plate portion 31 which is bent outward in the radial direction from an end portion on the one side in the axial direction of the cylindrical portion 30. The side plate portion 31 has a driven-side cam surface 32 on a side surface of the one side in the axial direction, in which the same number of concave portions and the convex portions are alternately arranged in the circumferential direction.

The cam disk 27 is supported inside a portion on the other side in the axial direction of the cylindrical portion 18 of the connecting cylinder 14 so as to be able to rotate relative to the connecting cylinder 14 and not to be able to displace to the other side in the axial direction with respect to the connecting cylinder 14. Due to this, a thrust needle bearing 33, a thrust race 34, and a retaining ring 35 are arranged between the cam disk 27 and the cylindrical portion 18 of the connecting cylinder 14. The thrust race 34 is prevented from displacing to the other side in the axial direction by the retaining ring 35 locked to an end portion on the other side in the axial direction of the cylindrical portion 18. The thrust needle bearing 33 is arranged between a side surface on the other side in the axial direction of the cam disk 27 and a side surface on the one side in the axial direction of the thrust race 34.

The cam disk 27 connects the cylindrical portion 30 to the flange portion 10 of the output shaft 3 so as to be able to relatively displace in the axial direction and not to be able to relatively rotate. Accordingly, the output shaft 3 and the cam disk 27 rotate integrally. Specifically, for example, by engaging the female spline portion provided on the inner circumferential surface of the cylindrical portion 30 with the male spline portion provided on the outer circumferential surface of the flange portion 10, the cam disk 27 and the output shaft 3 can be combined so as to be able to relatively displace in the axial direction and not to be able to relatively rotate.

The plurality of rolling bodies 28 is arranged between the drive-side cam surface 29 of the roller element 13b on the other side in the axial direction and the driven-side cam surface 32 of the cam disk 27 so as to be able to roll freely.

The elastic member 8 is formed in a cylindrical shape and is arranged between the flat surface portions 16 of the pair of roller elements 13a, 13b. In this example, the elastic member 8 is configured by combining a pair of disc springs 36 having a conical trapezoidal shape in a substantially V-shaped cross section so that the inner diameter side opens. Specifically, in this example, the pair of disc springs 36 are superposed in opposite directions with respect to the axial direction so that the respective end portions on the large diameter side abut against each other. That is, the elastic member 8 is configured by combining the pair of disc springs 36 in a two-stage series.

When the elastic member 8 is elastically compressed between the flat surface portions 16 of the pair of roller elements 13a, 13b, the elastic member 8 elastically urges the pair of roller elements 13a, 13b in directions going away from each other in the axial direction (applies a force to the pair of roller elements 13a, 13b so as to be away from each other) to be elastically restored. In other words, the elastic member 8 presses the pair of roller elements 13a, 13b in directions going away from the rolling surfaces 21 of the intermediate rollers 6 in the axial direction.

In this example, in the initial state before the loading cam device 7 exerts the pressing force, the elastic member 8 is held between the flat surface portions 16 of the pair of roller elements 13a, 13b in an elastically compressed state. Therefore, the elastic member 8 applies a force to the pair of roller elements 13a, 13b in directions going away from each other even in the initial state.

When the frictional roller reducer 1 of this example is in operation, the sun roller 4 is rotationally driven by rotationally driving the input shaft 2 by a drive source such as an electric motor or an engine. When the sun roller 4 rotates, the intermediate rollers 6 rotate based on the rolling contact between the inner-diameter side rolling contact surface 11 of the sun roller 4 and the connection surface portions 23 of the rolling surfaces 21 of the intermediate rollers 6. When the intermediate rollers 6 rotate, the ring roller rotates about the center axis O of the input shaft 2 based on the rolling contact between the pair of intermediate roller-side inclined surface portions 22 of the rolling surfaces 21 and the pair of inclined surface portions 15a, 15b of the outer-diameter side rolling contact surface 12 of the ring roller 5. The rotation of the ring roller 5 is transmitted to the output shaft 3 through the loading cam device 7.

When the roller element 13b on the other side in the axial direction rotates with the rotation of the ring roller 5, the amount of landing of the rolling bodies 28 of the loading cam device 7 from the bottom of the concave portions on the drive-side cam surface 29 and the amount of landing from the bottom of the concave portions on the driven-side cam surface 32 increase. As a result, the dimension in the axial direction of the loading cam device 7 is increased, and the cam disk 27 is rotationally driven while the pair of roller elements 13a, 13b are pressed in directions going toward each other. That is, at the same time that the roller element 13b on the other side in the axial direction is pressed to the one side in the axial direction, the cam disk 27 is pressed to the other side in the axial direction so that the roller element 13a on the one side in the axial direction is pulled toward the other side in the axial direction through the connecting cylinder 14.

When the pair of roller elements 13a, 13b are pressed in directions going toward each other, of the inclined surface portions 15a, 15b of the outer-diameter side rolling contact surface 12, the inner diameter of the portions that come in rolling contact with the pair of intermediate roller-side inclined surface portions 22 of the rolling surfaces 21 becomes small, and the surface pressure of the traction portions (rolling contact portions) between the outer-diameter side rolling contact surface 12 and the rolling surfaces 21 increases. Furthermore, when the intermediate rollers 6 are pressed inward in the radial direction as this surface pressure increases, the surface pressure of the traction portions between the connection surface portions 23 of the rolling surfaces 21 and the inner-diameter side rolling contact surface 11 also increases. As a result, the torque input from the input shaft 2 to the sun roller 4 is transmitted to the ring roller 5 through the intermediate rollers 6 without causing excessive slipping in each of the traction portions.

The rotation of the cam disk 27 is transmitted from the fitting portion between the cylindrical portion 30 and the flange portion 10 to the output shaft 3, and then it is transmitted to driven portions such as wheels through a drive shaft and the like.

In the frictional roller reducer 1 of this example, the elastic member 8 is held between the flat surface portions 16 of the pair of roller elements 13a, 13b, and the elastic member 8 applies a force to the pair of roller elements 13a, 13b in directions going away from each other. Therefore, the amount of increase in the surface pressure of the traction portions between the rolling surfaces 21 and the inner-diameter side rolling contact surface 11 and the outer-diameter side rolling contact surface 12 due to the loading cam device 7 pressing the pair of roller elements 13a, 13b in directions going toward each other is reduced by the amount of the force applied from the elastic member 8 to the pair of roller elements 13a, 13b in directions going away from each other. In other words, the magnitude of the normal force acting on each of the traction portions is reduced by the amount of the force applied from the elastic member 8 to the pair of roller elements 13a, 13b, and the operating traction coefficient (tangential force/normal force according to the torque transmitted by the sun roller 4, the ring roller 5, and the intermediate rollers 6) representing the actual operating state becomes large.

As the torque transmitted by the frictional roller reducer 1 increases and the torque applied to the ring roller 5 increases, the amount of relative displacement of the pair of roller elements 13a, 13b in directions going toward each other increases, and the amount of compression of the elastic member 8 increases. Therefore, as the torque applied to the ring roller 5 increases, the force applied from the elastic member 8 to the pair of roller elements 13a, 13b in directions going away from each other also increases.

Therefore, in the region where the torque transmitted by the frictional roller reducer 1, that is, the tangential force and the surface pressure acting on the traction portions are small and the maximum traction coefficient $\mu_{max}$ is small, the force applied from the elastic member 8 to the pair of roller elements 13a, 13b in directions going away from each other is suppressed to be small, so that the operating traction coefficient can be suppressed to be relatively small. On the other hand, in the region where the torque transmitted by the frictional roller reducer 1, that is, the tangential force and the surface pressure acting on the traction portions are large and the maximum traction coefficient $\mu_{max}$ is large, the force applied from the elastic member 8 to the pair of roller elements 13a, 13b in directions going away from each other becomes large and the magnitude of the normal force acting on the traction portions becomes small accordingly. Therefore, the operating traction coefficient can be made relatively large. In short, with the frictional roller reducer 1 of this example, the operating traction coefficient can be adjusted to an appropriate size regardless of the magnitude of the transmitted torque, and therefore the transmission efficiency of the frictional roller reducer 1 can be well ensured.

In the frictional roller reducer 1 of this example, the pressing device that presses the pair of roller elements 13a, 13b in directions going away from the rolling surfaces 21 of the intermediate rollers 6 is configured by the loading cam device 7. That is, as described above, a structure that is capable of adjusting the operating traction coefficient to an appropriate size is achieved without including an actuator such as a hydraulic pump or an electric motor. Therefore, it is possible to prevent the frictional roller reducer 1 from becoming large and complicated.

Figure 4:
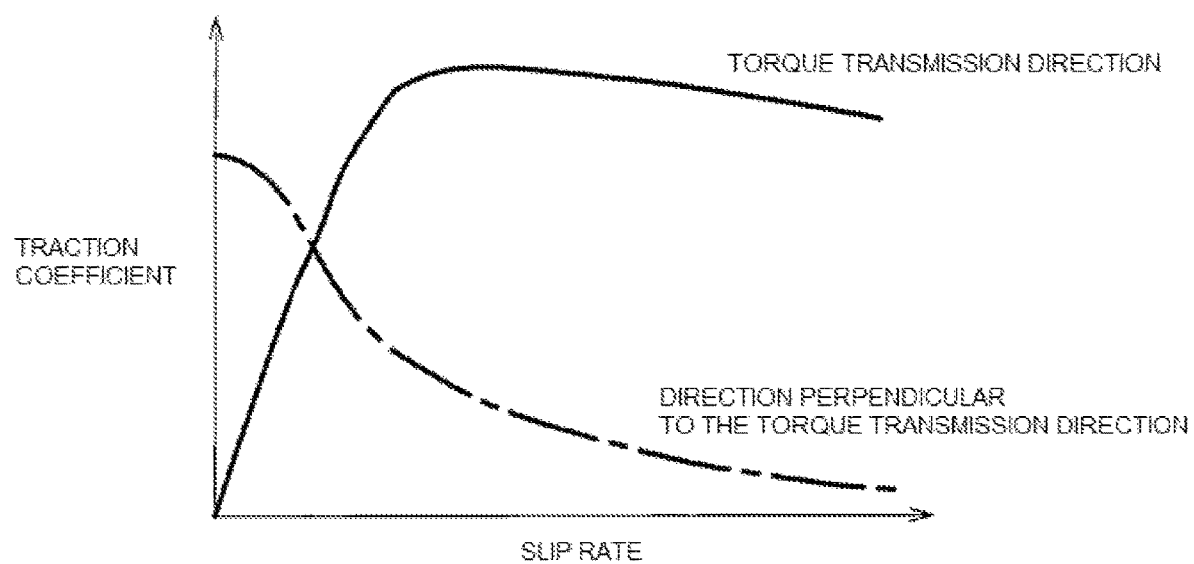
FIG. 4 is a graph illustrating the relationship between the slip ratio with respect to the torque transmission direction and the direction perpendicular to the torque transmission direction when skew occurs, and the traction coefficient.

When skew in which the intermediate rollers 6 rotate while the rotation shafts 24 of the intermediate rollers 6 is inclined with respect to the center axis O of the input shaft 2 occurs, as illustrated in FIG. 4, as the traction coefficient (=tangential force/normal force) with respect to the torque transmission direction becomes larger, the traction coefficient (=skew force/normal force) with respect to the direction perpendicular to the torque transmission direction becomes smaller.

In the frictional roller reducer 1 of this example, based on the elastic member 8 trying to be elastically restored, the normal force acting on the traction portions can be suppressed to be small and the traction coefficient in relation to the torque transmission direction can be made large, and therefore the traction coefficient in relation to the direction perpendicular to the torque transmission direction can be suppressed to be relatively small. Especially, in the frictional roller reducer 1 of this example, the operating traction coefficient can be made large during high torque transmission in which the amount of elastic deformation of each component and the attitude variation of the intermediate rollers 6 tend to be large, and therefore the accelerating increase in the pressing force by the loading cam device 7 due to the occurrence of skew in the intermediate rollers 6 can be effectively prevented.

Furthermore, in the frictional roller reducer 1 of this example, with the occurrence of skew, one roller element 13a (13b) of the pair of roller elements 13a, 13b displaces toward the side of the other roller element 13b (13a), and when the pressing force of the inclined surface portion 15a (15b) of the one roller element 13a (13b) against the intermediate roller-side inclined surface portions 22 increases, the other roller element 13b (13a) is pressed in a direction going away from the one roller element 13a (13b) by the roller element 13a (13b) through the elastic member 8. Thus, the pressing force of the inclined surface portion 15b (15a) of the other roller element 13b (13a) against the intermediate roller-side inclined surface portions 22 decreases. As a result, the torque transmitted through the traction portion between the inclined surface portion 15a (15b) of the one roller element 13a (13b) and the intermediate roller-side inclined surface portions 22 becomes larger than the torque transmitted through the traction portion between the inclined surface portion 15b (15a) of the other roller element 13b (13a) and the intermediate roller-side inclined surface portions 22. Therefore, the traction coefficient in relation to the torque transmission direction in the traction portion between the inclined surface portion 15a (15b) of the one roller element 13a (13b) and the intermediate roller-side inclined surface portions 22 can be increased, and the traction coefficient in relation to the direction perpendicular to the torque transmission direction can be suppressed to be relatively small. From this aspect as well, it is possible to effectively prevent the accelerating increase in the pressing force due to the occurrence of skew of the intermediate rollers 6.

Moreover, in the frictional roller reducer 1 of this example, each of the rolling surfaces 21 is configured by the pair of intermediate roller-side inclined surface portions 22 that are arranged on both side portions in the axial direction and come in rolling contact with the inclined surface portions 15a, 15b of the outer-diameter side rolling contact surface 12, and the connection surface portion 23 that is arranged in the intermediate portion in the axial direction and comes in rolling contact with the inner-diameter side rolling contact surface 11. Therefore, while maintaining good torque transmission efficiency by the frictional roller reducer 1, it is possible to easily adjust the magnitude of the force applied to the pair of roller elements 13a, 13b by the elastic member 8. The reason for this will be explained with reference to FIGS. 5(A) and 5(B).

The force applied to the pair of roller elements 13a, 13b by the elastic member 8, that is, the magnitude of the elasticity of the elastic member 8 can be adjusted by adjusting the distance $d_1$ between the flat surface portions 16 of the pair of roller elements 13a, 13b. When it is desired to increase the distance $d_1$, it is also necessary to increase the axial distance $d_2$ between the contact points P between the inclined surface portions 15a, 15b of the pair of roller elements 13a, 13b and the rolling surfaces 21 of the intermediate rollers 6.

Figure 5A:
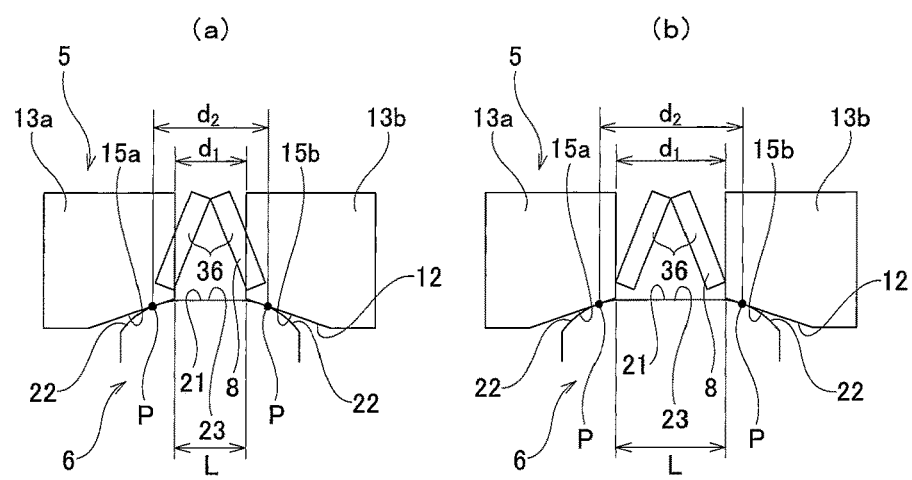
FIGS. 5(A) and 5(B) are enlarged cross-sectional views for explaining the effect of the frictional roller reducer of the first example of the first embodiment.
Figure 5B:
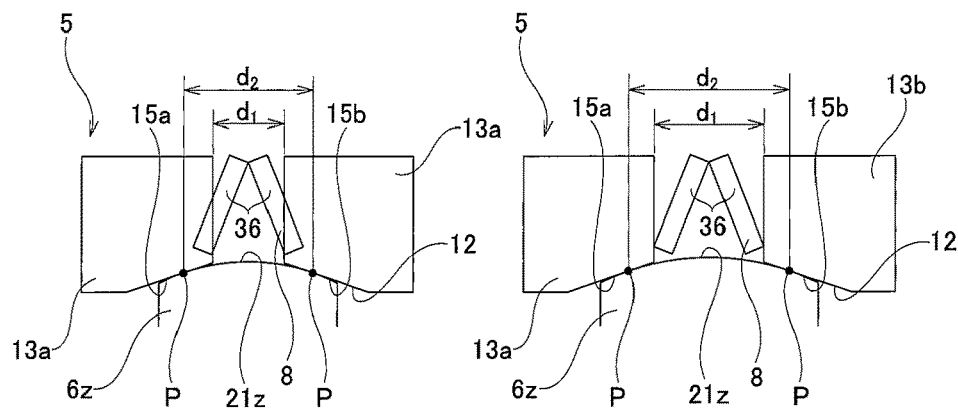

As in the comparative example illustrated in FIG. 5(B), in a structure in which the rolling surface 21z of an intermediate roller 6z is configured by a convex curved surface having a single arc-shaped generating line, when it is desired to increase the axial distance $d_2$ between the contact points P between the inclined surface portions 15a, 15b and the rolling surface 21z, as illustrated in FIG. 5(B)(a) to FIG. 5(B)(b), it is necessary to increase the radius of curvature of the generating line of the rolling surface 21z. However, when the radius of curvature of the generating line of the rolling surface 21z is increased, the area of the contact ellipses existing in the rolling contact portions between the inclined surface portions 15a, 15b and the rolling surface 21z becomes large, and the loss due to slipping at the rolling contact portions increases, so that the torque transmission efficiency may decrease.

On the other hand, in the frictional roller reducer 1 of this example, as illustrated in FIG. 5(A)(a) to FIG. 5(A)(b), by increasing the dimension in the axial direction L of the connection surface portions 23 of the rolling surface 21, the axial distance $d_2$ between the contact points P between the inclined surface portions 15a, 15b and the rolling surface 21 (intermediate roller-side inclined surface portions 22) can be increased while keeping the radius of curvature of the generating line of the intermediate roller-side inclined surface portions 22 that come in rolling contact with the inclined surface portions 15a, 15b. That is, even when the axial distance $d_2$ is increased in order to adjust the force applied to the pair of roller elements 13a, 13b by the elastic member 8, it is possible to prevent the area of the contact ellipses existing in the rolling contact portions between the inclined surface portions 15b and the rolling surface 21 from becoming large, and thus to prevent a decrease in torque transmission efficiency of the frictional roller reducer 1.

Figure 6A:
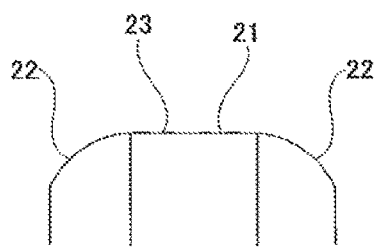
FIG. 6(A) to FIG. 6(C) are views illustrating three examples of the shape of a rolling surface of the respective intermediate rollers.
Figure 6B:
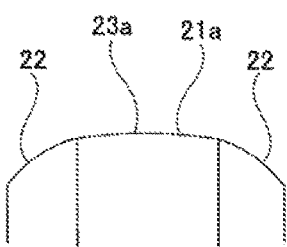
Figure 6C:
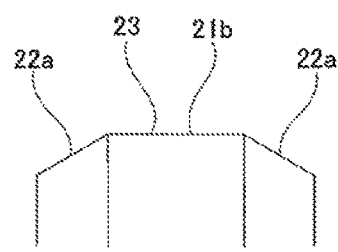

In this example, as illustrated in FIG. 6(A), the rolling surface 21 includes a pair of intermediate roller-side inclined surface portions 22 having arc-shaped generating lines and a connection surface portions 23 which is a cylindrical surface whose outer diameter does not change in the axial direction. However, as illustrated in FIG. 6(B), the rolling surface 21a can also be configured by a pair of intermediate roller-side inclined surface portions 22 having arc-shaped generating lines and a connection surface portions 23a having an arc-shaped generating line. In this case, the radius of curvature of the generating line of the connection surface portions 23a becomes larger than the radius of curvature of the generating lines of the intermediate roller-side inclined surface portions 22. Alternatively, as illustrated in FIG. 6(C), the rolling surface 21b can also be configured by a pair of intermediate roller-side inclined surface portions 22a having linear generating lines inclined in directions in which the outer diameter becomes smaller as going away from each other in the axial direction and a connection surface portions 23 which is a cylindrical surface whose outer diameter does not change in the axial direction.

However, in a case of implementing the present invention, the rolling surfaces of the intermediate rollers can also be configured by a convex curved surface having an arc-shaped generating line. In this case, the inner-diameter side rolling contact surface provided on the outer circumferential surface of the sun roller can be formed as a concave curved surface having an arc-shaped generating line.

Further, in this example, the elastic member 8 arranged between the pair of roller elements 13a, 13b is configured by a pair of disc springs 36, however, in a case of implementing the present invention, the elastic member is not limited to the disc springs, but can be configured by various elastic members as long as it can apply a force to the pair of roller elements in directions going away from each other due to compression. The force exerted by the elastic member due to compression may or may not be proportional to the amount of compression. The elastic member preferably generates a force such that the operating traction coefficient does not exceed the maximum traction coefficient and is as close as possible to the maximum traction coefficient.

Second Example to Fourth Example of First Embodiment

In a case of implementing the present invention, when the elastic member is configured by disc springs, the number and/or combination of the disc springs is appropriately determined according to the magnitude of the elasticity required for the elastic member. However, when the elastic member is configured by disc springs, it is preferable to keep the number of the disc springs as small as possible from the viewpoint of suppressing the influence of the hysteresis of the spring characteristics to be small.

Figure 7A:
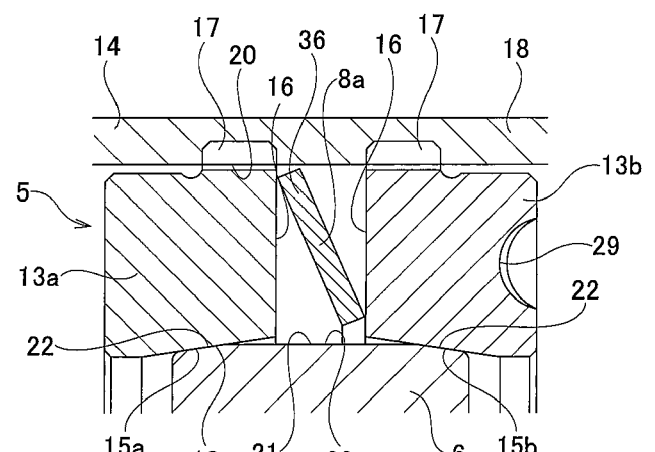
FIG. 7(A) to FIG. 7(C) are enlarged cross-sectional views illustrating a second example to a fourth example of the first embodiment.

In a second example of the first embodiment illustrated in FIG. 7(A), the elastic member 8a is configured by one disc spring 36.

Figure 7B:
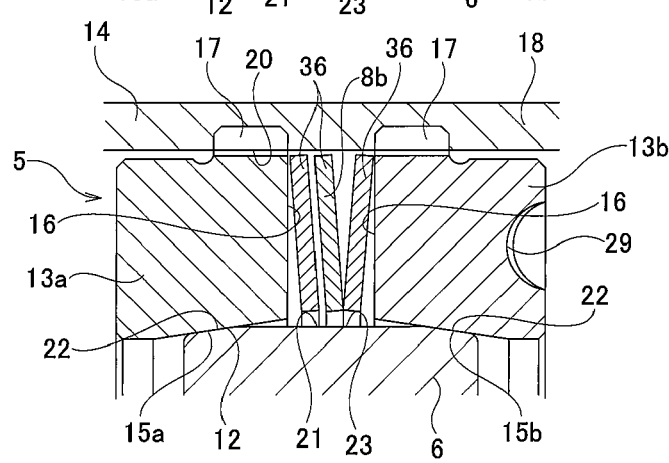

In a third example of the first embodiment illustrated in FIG. 7(B), the elastic member 8b is configured by stacking two-disc springs 36 of three disc springs 36 in the same direction and stacking the remaining one disc spring 36 in the opposite direction.

Figure 7C:
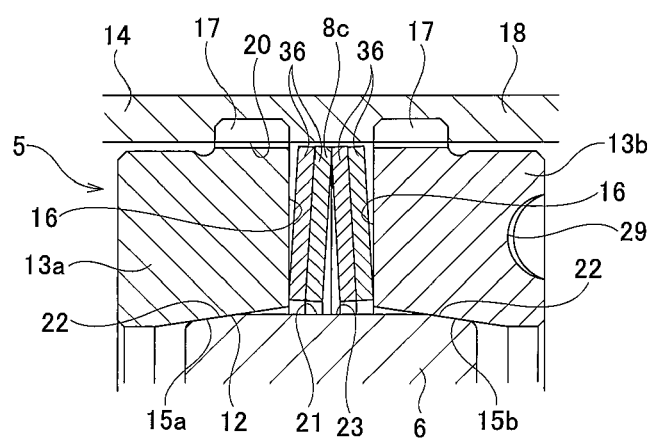

In a fourth example of the first embodiment illustrated in FIG. 7(C), the elastic member 8c is configured by combining each two-disc springs 36 of four disc springs 36 in the same direction and stacking them in opposite directions, that is, forming a two-disc parallel, two-stage series combination.

Fifth Example of First Embodiment

Figure 8:
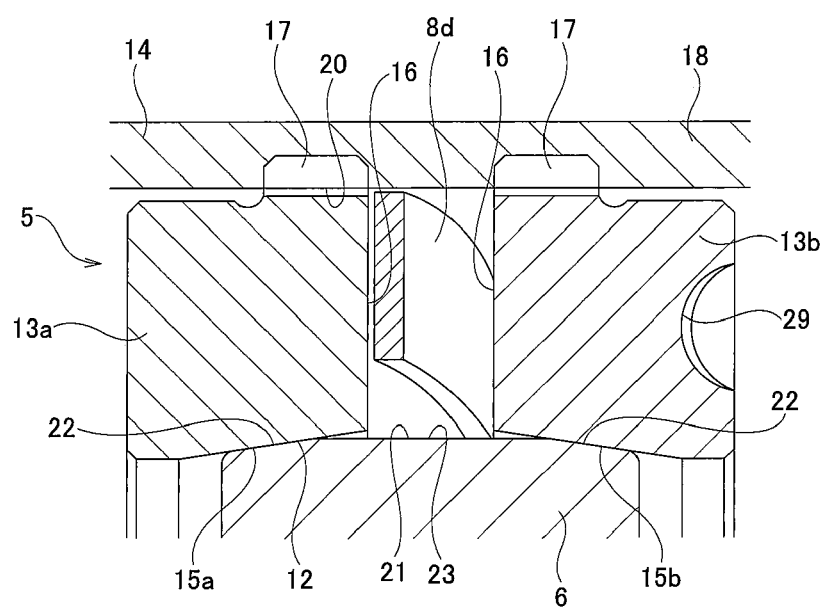
FIG. 8 is an enlarged cross-sectional view illustrating a frictional roller reducer of a fifth example of the first embodiment.

FIG. 8 illustrates a fifth example of the first embodiment of the present invention. In this example, the elastic member 8d arranged between the tip-end surfaces (flat surface portions 16) of the pair of roller elements 13a, 13b of the ring roller 5 is configured by a wave washer. The configuration and operational effects of the other parts are the same as those of the first example of the first embodiment.

Sixth Example of First Embodiment

Figure 9:
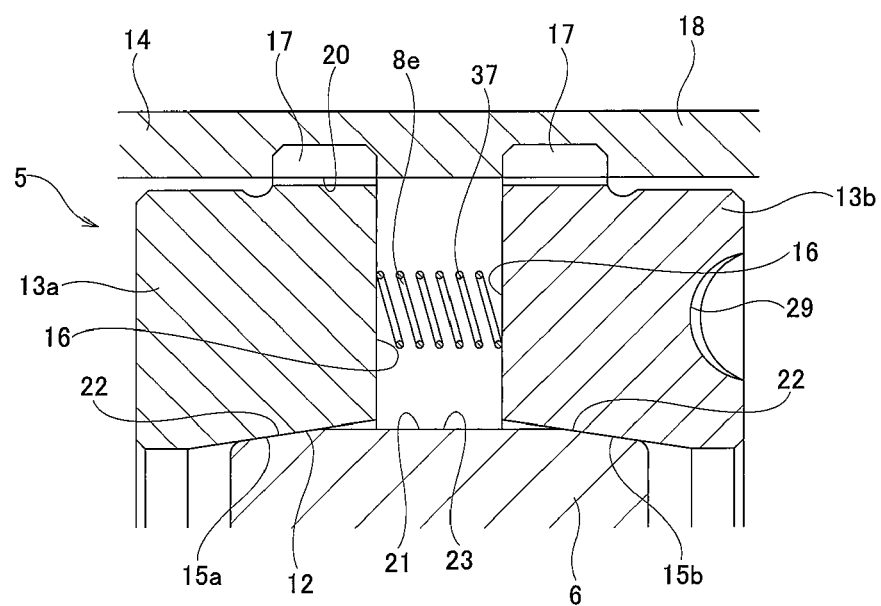
FIG. 9 is an enlarged cross-sectional view illustrating a frictional roller reducer of a sixth example of the first embodiment.

FIG. 9 illustrates a sixth example of the first embodiment of the present invention. In this example, the elastic member 8e arranged between the tip-end surfaces (flat surface portions 16) of the pair of roller elements 13a, 13b of the ring roller 5 is configured by a torsion coil spring 37. One torsion coil spring 37 may be arranged between tip-end surfaces of the pair of roller elements 13a, 13b, or a plurality of torsion coil springs 37 may be arranged between the tip-end surfaces of the pair of roller elements 13a, 13b. When a plurality of torsion coil springs 37 are provided, for example, they can be arranged at equal intervals in the circumferential direction between the tip-end surfaces of the pair of roller elements 13a, 13b, that is, they can be arranged in parallel. And/or, a plurality of torsion coil springs 37 can be arranged so as to be superposed in the axial direction, that is, they can be arranged in series.

In any case, the torsion coil spring 37 is arranged between the tip-end surfaces of the pair of roller elements 13a, 13b so that the center axis is parallel to the center axis of the ring roller 5. As a result, the elastic restoring force of the torsion coil spring 37 acts on the roller elements 13a, 13b in the axial direction. The configuration and operational effects of the other parts are the same as those of the first example of the first embodiment.

Seventh Example and Eighth Example of First Embodiment

Figure 10A:
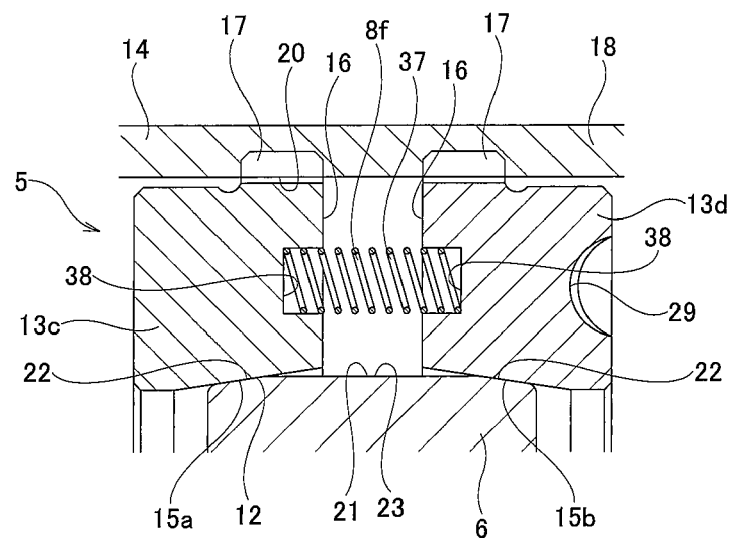
FIG. 10(A) and FIG. 10(B) are enlarged cross-sectional views illustrating a seventh example and an eighth example of the first embodiment.

FIG. 10(A) illustrates a seventh example of the first embodiment of the present invention. The elastic member 8f of this example includes a plurality of torsion coil springs 37. In this example, support concave portions 38 that are respectively concave in the axial direction are provided at a plurality of locations uniformly spaced in the circumferential direction of the tip-end surfaces of the pair of roller elements 13c, 13d of the ring roller 5a that face each other. Each of the torsion coil springs 37 has both end portions in the axial direction inserted inside the support concave portions 38.

According to this example, even when the friction acting between the end surfaces in the axial direction of the torsion coil springs 37 and the tip-end surfaces of the roller elements 13c, 13d becomes small, it is possible to prevent the installation positions of the torsion coil springs 37 from shifting. The configuration and operational effects of the other parts are the same as those of the first and third examples of the first embodiment.

Figure 10B:
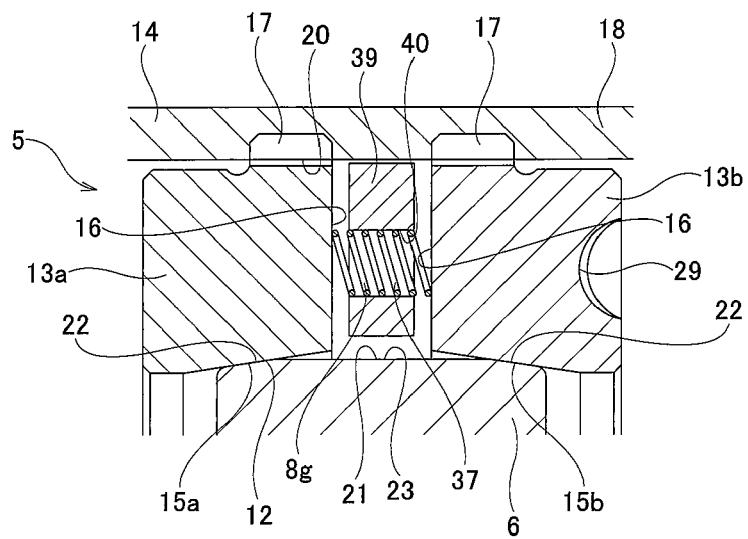

FIG. 10(B) illustrates an eighth example of the first embodiment of the present invention. The elastic member 8g of this example includes a plurality of torsion coil springs 37. The frictional roller reducer 1 of this example has a retainer 39 for holding the plurality of torsion coil springs 37. The retainer 39 has a hollow circular plate shape, and has retaining holes 40 respectively penetrating in the axial direction at a plurality of locations uniformly spaced in the circumferential direction. The intermediate portion in the axial direction of each of the torsion coil springs 37 is inserted inside a retaining hole 40.

In the case of this example as well, when the friction acting between the end surfaces in the axial direction of the torsion coil springs 37 and the tip-end surfaces of the roller elements 13a, 13b becomes small, it is possible to prevent the installation position of the torsion coil springs 37 from shifting. Moreover, by simply replacing the retainer 39, the position of the elastic member 8g in the radial direction can be easily adjusted. The configuration and operational effects of the other parts are the same as those of the first and third examples of the first embodiment.

Ninth Example of First Embodiment

Figure 11:
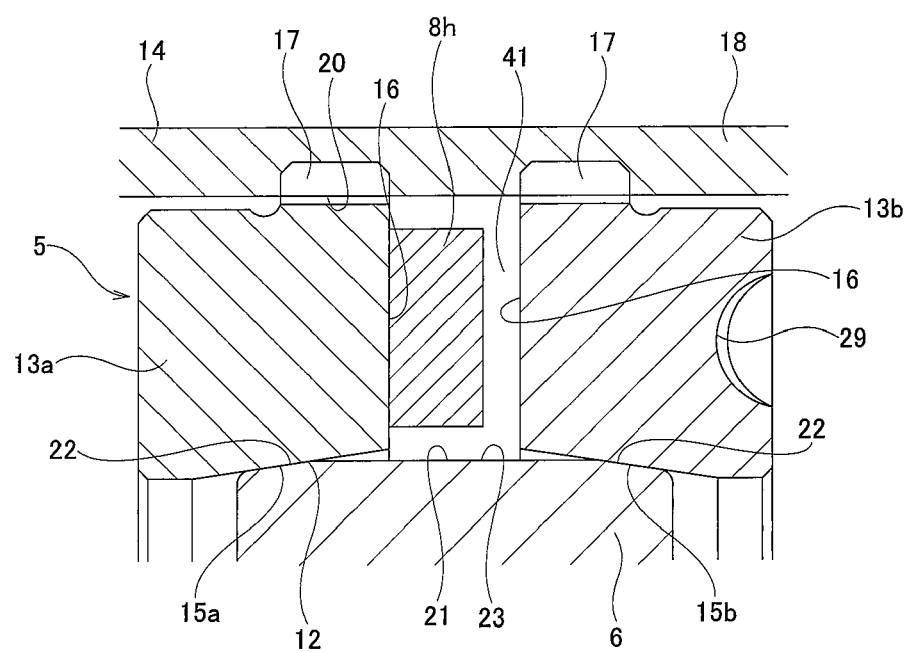
FIG. 11 is an enlarged cross-sectional view illustrating a frictional roller reducer of a ninth example of the first embodiment.

FIG. 11 illustrates a ninth example of the first embodiment of the present invention. In this example, in the initial state before the loading cam device 7 (see FIG. 1) exerts pressing force, a gap 41 is provided between the elastic member 8h and the roller element 13b on the other side in the axial direction of the pair of roller elements 13a, 13b of the ring roller 5.

In this example, in the initial state, since a gap 41 exists between the elastic member 8h and the roller element 13b on the other side in the axial direction, in a region where the torque transmitted by the frictional roller reducer 1 is small, a force in directions going away from each other based on the elastic restoration of the elastic member 8h does not act on the pair of roller elements 13a, 13b. Therefore, in a low torque region where the torque transmitted by the frictional roller reducer 1 is small and the surface pressure of the traction portion is small, it is possible to prevent the traction coefficient from becoming unnecessarily small, and thus it is possible to prevent the occurrence of gross slipping more reliably. The configuration and operational effects of the other parts are the same as those of the first example of the first embodiment.

First Example of Second Embodiment

Figure 12:
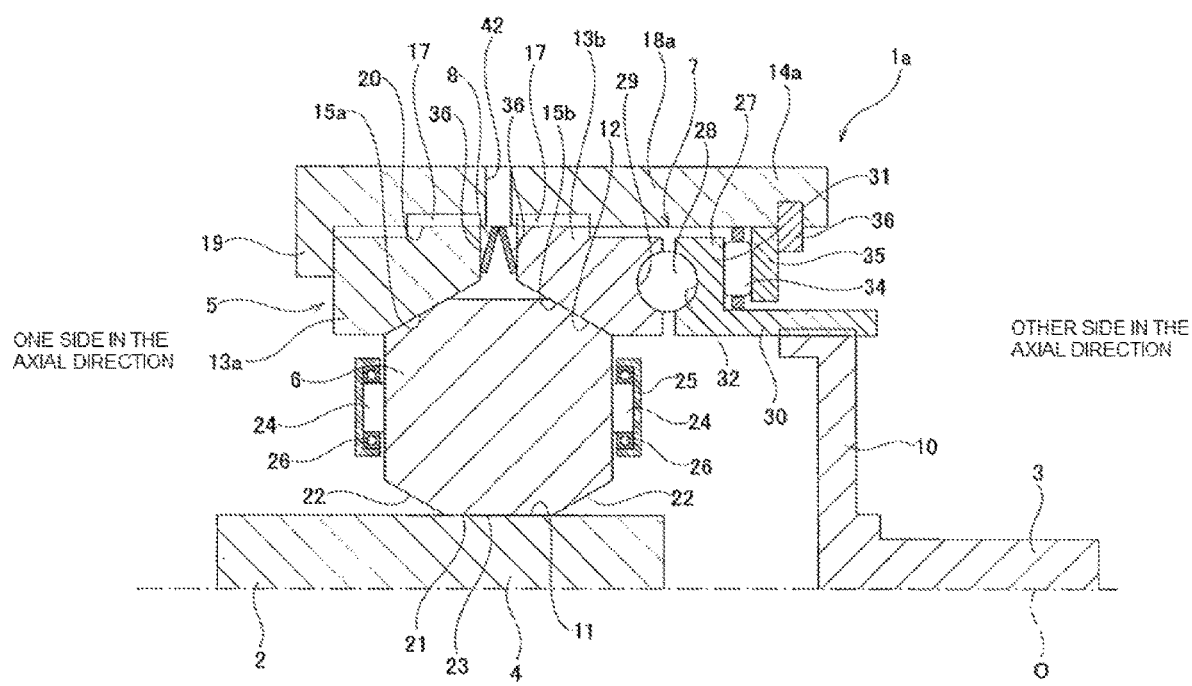
FIG. 12 is a schematic cross-sectional view of a frictional roller reducer according to a first example of a second embodiment of the present invention.
Figure 13:
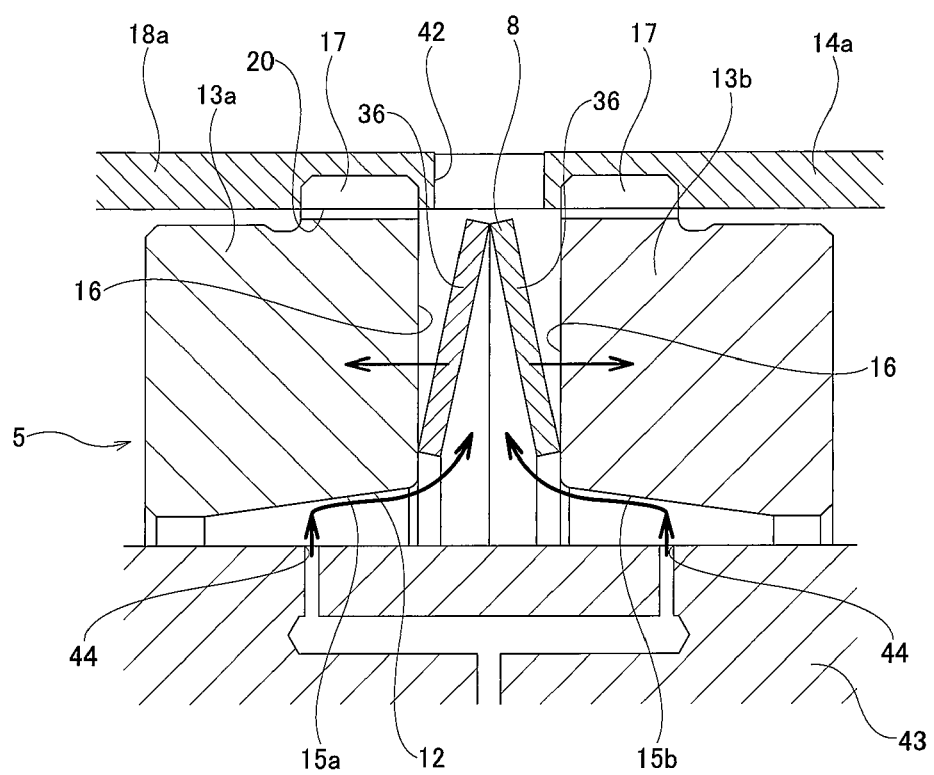
FIG. 13 is a schematic cross-sectional view illustrating the frictional roller reducer of the first example of the second embodiment.

FIG. 12 and FIG. 13 illustrate a first example of a second embodiment of the present invention. In the frictional roller reducer 1a of this example, the ring roller 5b is configured by combining a pair of roller elements 13a, 13b with a connecting cylinder 14a so as to be able to relatively displace in the axial direction and not to be able to relatively rotate. The connecting cylinder 14a has a cylindrical portion 18a and a side plate portion 19 bent inward in the radial direction from an end portion on one side in the axial direction of the cylindrical portion 18a. In this example, the cylindrical portion 18a has an opening section 42 penetrating in the radial direction at one or a plurality of locations in the circumferential direction of the portion located on the outer side in the radial direction of an elastic member 8. In this example, the opening section 42 is located between the flat surface portions 16 of the pair of roller elements 13a, 13b in relation to the axial direction. The opening section 42 forms an oil discharge hole for discharging lubricating oil existing in a space on the inner side in the radial direction of the cylindrical portion 18a.

The frictional roller reducer 1a of this example has oil supply holes 44 at a plurality of locations in the circumferential direction where a support member (carrier) 43, which supports the intermediate rollers 6 so as to be able to respectively rotate about the rotation shaft 24 and to displace in the radial direction, face the inclined surface portions 15a, 15b of the pair of roller elements 13a, 13b. When the frictional roller reducer 1a is in operation, lubricating oil (traction oil) is discharged from the oil supply holes 44. The lubricating oil discharged from the oil supply holes 44 is supplied to the traction portions between the rolling surfaces 21 of the intermediate rollers 6 and the inner-diameter side rolling contact surface 11 of the sun roller 4 and/or the outer-diameter side rolling contact surface 12 of the ring roller 5. As a result, the traction portions are lubricated and cooled at the same time.

Similar to the elastic member 8 of the frictional roller reducer 1 according to the first example of the first embodiment, the elastic member 8 is configured by combining a pair of disc springs 36 having a conical trapezoidal shape in a substantially V-shaped cross section so that the inner diameter side opens. Specifically, the pair of disc springs 36 are superposed in opposite directions with respect to the axial direction so that the respective end portions on the large diameter side abut against each other. That is, the elastic member 8 is configured by combining the pair of disc springs 36 in a two-stage series.

In the frictional roller reducer 1 of this example, the elastic member 8 is configured by combining the pair of disc springs 36 in a substantially V-shaped cross section so that the inner diameter side opens. Therefore, even when the elasticity exerted by the elastic member 8 is 0 or small, the elastic member 8 can be stabilized, and it is possible to prevent the occurrence of wear and noise between the elastic member 8 and the pair of roller elements 13a, 13b.

That is, the lubricating oil discharged from the oil supply holes 44 provided in the support member 43 is supplied to the traction portions between the inclined surface portions 15a, 15b of the pair of roller elements 13a, 13b of the ring roller 5 and the rolling surfaces 21 of the intermediate rollers 6. When the pair of roller elements 13a, 13b rotate, the lubricating oil flows positively toward the end portions on the large diameter side of the inclined surface portions 15a, 15b of the pair of roller elements 13a, 13b, and is sent between the pair of disc springs 36 by centrifugal force. Then, the pair of disc springs 36 are expanded so as to expand the dimension in the axial direction, and the end portions on the small diameter side of the pair of disc springs 36 are pressed against the tip-end surfaces (flat surface portions 16) of the pair of roller elements 13a, 13b.

Therefore, even when the elastic member 8 is not elastically deformed since the torque transmitted by the frictional roller reducer 1a is small so that the change in the dimension in the axial direction of the loading cam device 7 is small, or when the amount of elastic deformation of the elastic member 8 is small so that the force of the pair of disc springs 36 for pressing the end portions on the small diameter side against the tip-end surfaces of the pair of roller elements 13a, 13b based on the elasticity of the elastic member 8 is small, the end portions on the small diameter side of the pair of disc springs 36 can be pressed against the tip-end surfaces of the pair of roller elements 13a, 13b. As a result, the elastic member 8 can be stabilized, and it is possible to prevent the occurrence of wear and noise between the pair of disc springs 36 and the pair of roller elements 13a, 13b.

The lubricating oil sent between the pair of disc springs 36 leaks or exudes outward in the radial direction from the abutting portion between the end portions on the large diameter side of the pair of disc springs 36, and is discharged through the opening section 42 provided in the connecting cylinder 14a. The configuration and operational effects of the other parts are the same as those of the first example of the first embodiment.

Second Example of Second Embodiment

Figure 14:
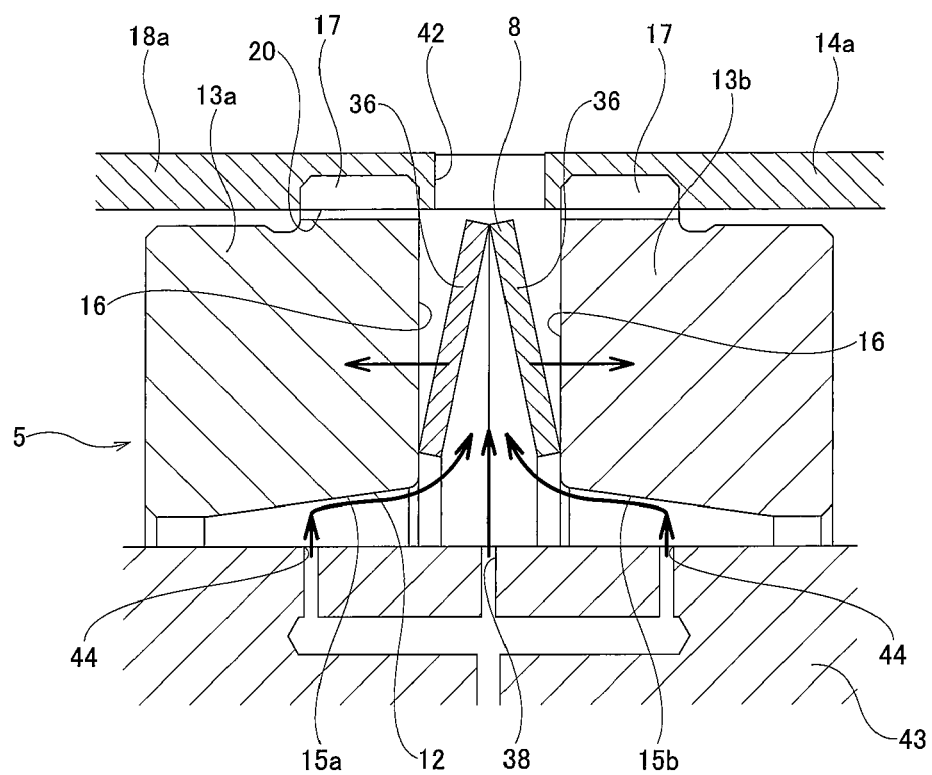
FIG. 14 is a schematic cross-sectional view illustrating a frictional roller reducer of a second example of the second embodiment.

FIG. 14 illustrates a second example of the second embodiment of the present invention. This example is a modification of the first example of the second embodiment. In this example, oil supply holes 44 for discharging the lubricating oil provided in the support member 43 are provided in a portion facing the space where the elastic member 8 is arranged between the tip-end surfaces (flat surface portions 16) of the pair of roller elements 13a, 13b, as well as in portions facing the inclined surface portions 15a, 15b of the pair of roller elements 13a, 13b of the ring roller 5.

According to this example, of the oil supply holes 44 provided in the support member 43, the lubricating oil can be directly sent between the pair of disc springs 36 by the oil supply hole 44 provided in the portion facing the space where the elastic member 8 is arranged. As a result, the end portions on the small diameter side of the pair of disc springs 36 can be quickly pressed against the tip-end surfaces of the pair of roller elements 13a, 13b immediately after the start of operation of the frictional roller reducer 1. The configuration and operational effects of the other parts are the same as those of the first and fifth examples of the first embodiment.

First Example of Third Embodiment

Figure 15:
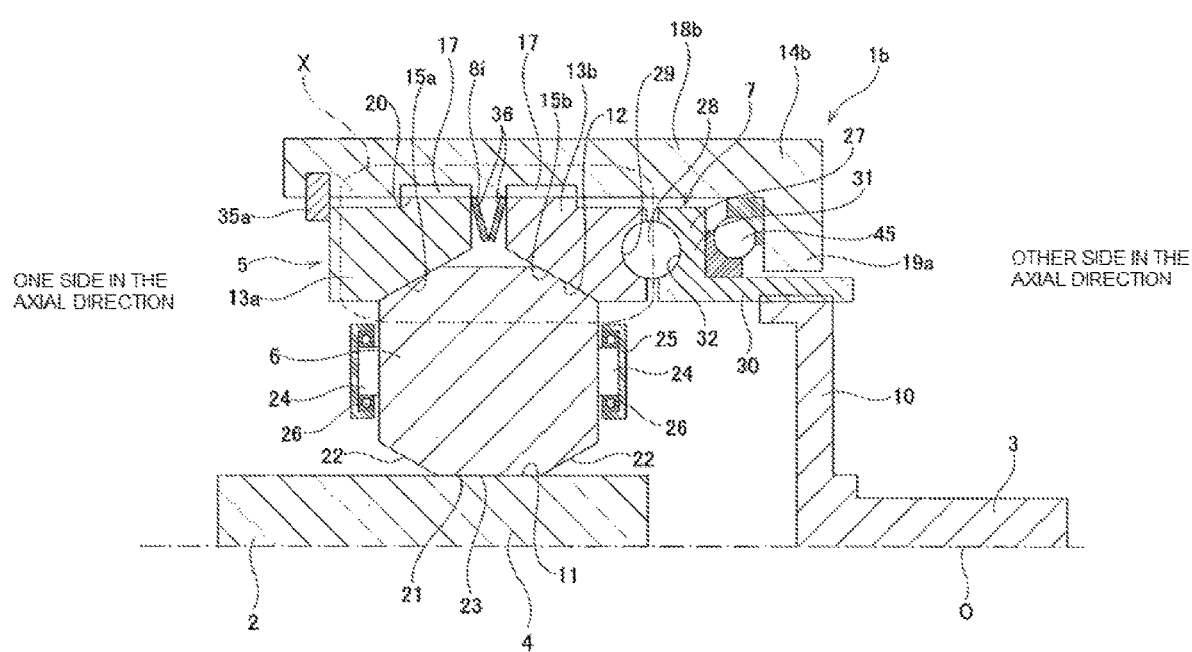
FIG. 15 is a schematic cross-sectional view of a frictional roller reducer of a first example of a third embodiment of the present invention.
Figure 16:
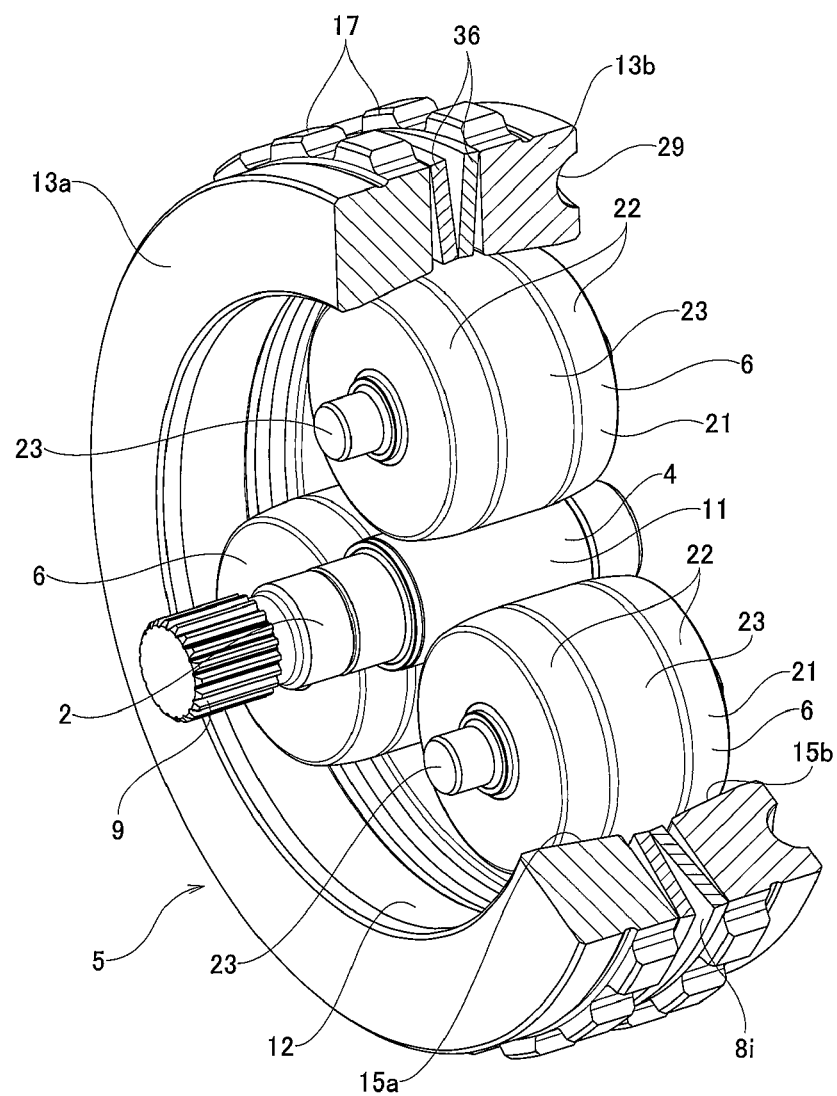
FIG. 16 is a partially cut perspective view of a sun roller, a pair of roller elements of a ring roller, intermediate rollers, and an elastic member taken out from the frictional roller reducer of the first example of the third embodiment.
Figure 17:
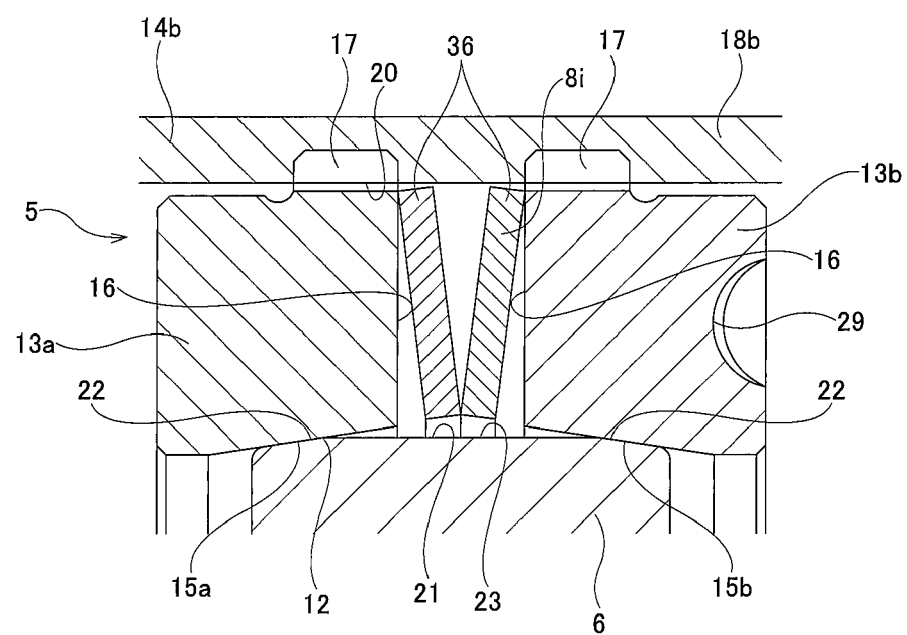
FIG. 17 is an enlarged view of part X in FIG. 15.
Figure 18:
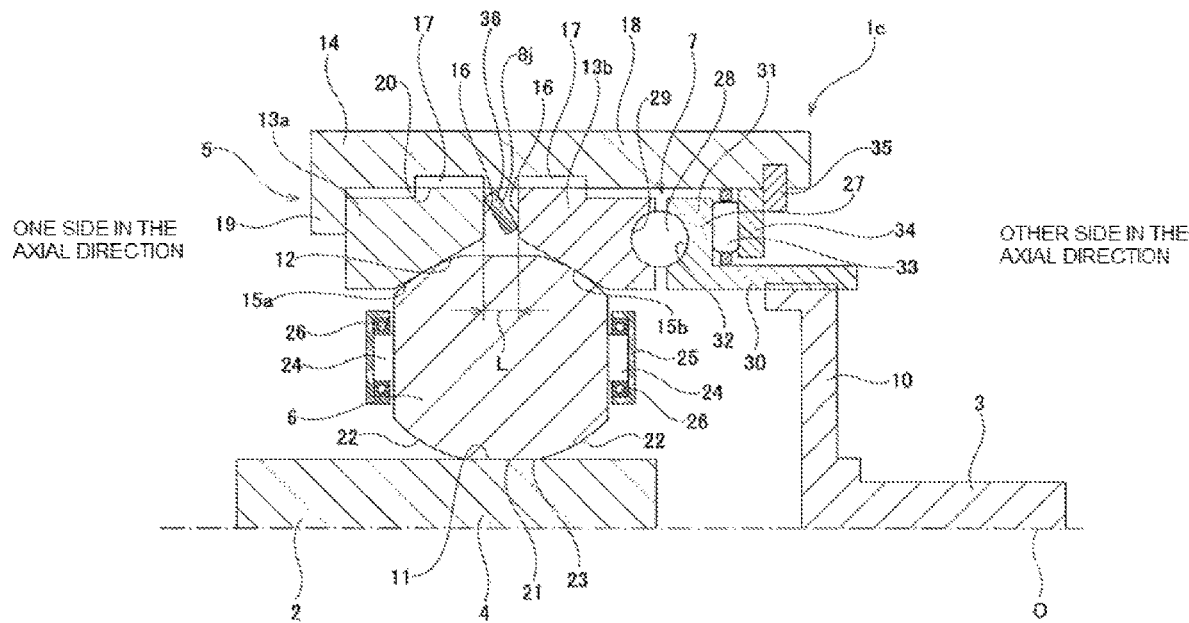
FIG. 18 is a schematic cross-sectional view of a frictional roller reducer of a first example of a fourth embodiment of the present invention.
Figure 19:
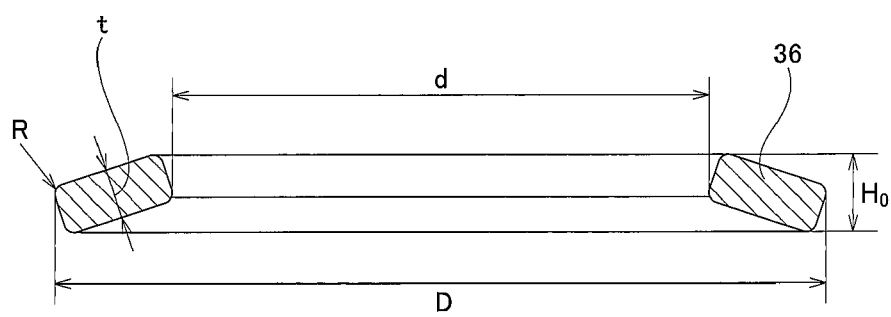
FIG. 19 is an isolated cross-sectional view of an elastic member in a free state take out from the frictional roller reducer of the first example of the fourth embodiment.

FIG. 15 to FIG. 17 illustrate a first example of a third embodiment of the present invention. In the frictional roller reducer 1b of this example, the ring roller 5c is configured by combining a pair of roller elements 13a, 13b with a connecting cylinder 14b so as to be able to relatively displace in the axial direction and not to be able to relatively rotate.

The connecting cylinder 14b has a cylindrical portion 18b and a side plate portion 19a bent inward in the radial direction from an end portion on the other side in the axial direction of the cylindrical portion 18b. The cylindrical portion 18b has a cylinder-side engaging concave and convex portion 20 formed by alternately arranging concave portions and convex portions over the entire circumference on the inner circumferential surface in a range from the portion on one side in the axial direction to the intermediate portion.

In this example, of the pair of roller elements 13a, 13b, the roller element 13a on the one side in the axial direction engages the element-side engaging concave and convex portion 17 with a portion on the one side in the axial direction of the cylinder-side engaging concave and convex portion 20 of the connecting cylinder 14b so as to be able to displace in the axial direction, and is prevented from displacing to the one side in the axial direction by the retaining ring 35a locked to the inner circumferential surface of an end portion on the one side in the axial direction of the connecting cylinder 14b. On the other hand, the roller element 13b on the other side in the axial direction engages the element-side engaging concave and convex portion 17 with the intermediate portion in the axial direction of the cylinder-side engaging concave and convex portion 20 of the connecting cylinder 14b so as to be able to displace in the axal direction. Therefore, the pair of roller elements 13a, 13b and the connecting cylinder 14b rotate integrally.

In this example, the cam disk 27 of the loading cam device 7 is internally fitted and supported by an angular contact ball bearing 45 at a portion on the other side in the axial direction of the cylindrical portion 18b of the connecting cylinder 14b so as to be able to relatively rotate with respect to the connecting cylinder 14b and not to be able to displace toward the other side in the axial direction with respect to the connecting cylinder 14b. That is, the outer ring of the angular contact ball bearing 45 fits the outer circumferential surface inside the inner circumferential surface of the end portion on the other side in the axial direction of the cylindrical portion 18b of the connecting cylinder 14b, and abuts a side surface on the other side in the axial direction against a side surface on the one side in the axial direction of the side plate portion 19a. Also, the inner ring of the angular contact ball bearing 45 fits the inner circumferential surface around the outer circumferential surface of an end portion of the one side in the axial direction of the cylindrical portion 30 of the cam disk 27, and abuts a side surface on the one side in the axial direction against a side surface on the other side in the axial direction of the side plate portion 31.

In the frictional roller reducer 1b of this example, the elastic member 8i is configured by combining a pair of disc springs 36 having a conical trapezoidal shape in a substantially V-shaped cross section so that the outer diameter side opens. Therefore, of the pair of disc springs 36, the end portions on the large diameter side come into contact with the tip-end surfaces (flat surface portions 16) of the pair of roller elements 13a, 13b. Specifically, in this example, the pair of disc springs 36 are superposed in opposite directions with respect to the axial direction so that the end portion on the small diameter side abuts against each other. That is, the elastic member 8i is configured by combining the pair of disc springs 36 in a two-stage series.

With the frictional roller reducer 1b of this example, it is possible to suppress the occurrence of wear at the contact portions between the elastic member 8i and the pair of roller elements 13a, 13b.

That is, when the frictional roller reducer 1b is in operation, the portions of the pair of roller elements 13a, 13b that are in rolling contact with the intermediate rollers 6 are pressed outward in the radial direction and elastically deformed. The elastically deformed portions of the pair of roller elements 13a, 13b moves in the circumferential direction with the revolution movement of the intermediate rollers 6. When the pair of roller elements 13a, 13b are elastically deformed periodically in this way, the tip-end surfaces of the pair of roller elements 13a, 13b and the elastic member 8i may rub against each other so as to cause fretting wear.

In this example, the end portions on the large diameter side of the pair of disc springs 36 are brought into contact with the tip-end surfaces of the pair of roller elements 13a, 13b by combining the elastic member 8i in a substantially V-shaped cross section so that the outer diameter side of the pair of disc springs 36 opens. As a result, with the frictional roller reducer 1b of this example, compared to the case where the end portions on the small diameter side of the pair of disc springs are brought into contact with the tip-end surfaces of the pair of roller elements, the contact area of the contact portions between the tip-end surfaces of the pair of roller elements 13a, 13b and the elastic member 8i can be increased, and the contact surface pressure can be reduced. Therefore, with the frictional roller reducer 1b of this example, it is possible to prevent fretting wear occurring at the contact portions between the elastic member 8i and the pair of roller elements 13a, 13b. The configuration and operational effects of the other parts are the same as those of the first example of the first embodiment.

First Example of Fourth Embodiment

FIG. 18 to FIG. 21(D) illustrate a first example of a fourth embodiment of the present invention. In the frictional roller reducer 1c of this example, the elastic member 8j is configured by one disc spring 36. The disc spring 36 satisfies the relationship represented by the following formula (1) when the thickness is t(mm) and the total deflection amount is $h_0$(mm).

$$h_0/t \leq 1.0 \quad (1)$$

When the height (free height) in the free state before arranging the disc spring 36 between the roller elements 13a, 13b is $H_0$(mm), the total deflection amount $h_0$ can be represented by the following formula (2).

$$h_0 = H_0 - t \quad (2)$$

The lower limit of $h_0/t$, which is the ratio of the total deflection amount $h_0$ with respect to the thickness t of the disc spring 36 is not particularly limited as long as it is larger than 0 and the disc spring 36 can be elastically deformed (functions as a spring) as the loading cam device 7 exerts pressing force. However, the total deflection amount $h_0$ needs to be equal to or greater than the difference (cam stroke) between the space L between the flat surface portions 16 of the pair of roller elements 13a, 13b in the initial state before the loading cam device 7 exerts the pressing force and the space L when the pressing force exerted by the loading cam device 7 is maximum. Considering such circumstances, the lower limit of $h_0/t$ is about 0.5.

In the frictional roller reducer 1c of this example, the ratio $h_0/t$ of the total deflection amount $h_0$ with respect to the thickness t of the disc spring 36 of the elastic member 8j is set to 1.0 or less. Therefore, while reliably preventing the occurrence of gross slipping in the region where the transmission torque of the frictional roller reducer 1c is medium and the occurrence of skew in the region where the transmission torque is large, the transmission efficiency of the frictional roller reducer 1c can be well secured. The reason for this will be explained with reference to FIG. 20 and FIG. 21(D).

When the outer diameter of the disc spring 36 of the elastic member 8*j* in the free state is D(mm), the inner diameter is d(mm), the chamfering radius of the corner portion is R(mm), the longitudinal elastic modulus of the material of the disc spring 36 is E(N/mm²), Poisson's ratio thereof is v, and the deflection amount thereof is δ, the spring load P of the disc spring 36 is represented by the following formula (3).

$$P = \frac{D-d}{(D-d)-3R} \frac{4E}{1-v^2} \frac{t^3}{C_1 D^2} \delta \left[ \left( \frac{h_0}{t} - \frac{\delta}{t} \right) \left( \frac{h_0}{t} - \frac{\delta}{2t} \right) + 1 \right] \quad (3)$$

Here, $C_1$ in the formula (3) is represented by the following formula (4) when α=D/d.

$$C_1 = \frac{1}{\pi} \frac{\left( \frac{\alpha-1}{\alpha} \right)^2}{\frac{\alpha+1}{\alpha-1} - \frac{2}{\ln \alpha}} \quad (4)$$

Since the outer diameter D and the inner diameter d of the disc spring 36 are limited by the size of the frictional roller reducer 1*c*, the degree of freedom of adjustment is limited. For example, in the case of the frictional roller reducer 1*c* used in a drive system of an electric vehicle, the outer diameter of the ring roller 5 (roller elements 13*a*, 13*b* of the ring roller 5) is about 150 mm to 200 mm. The outer diameter D of the disc spring 36 needs to be about the same as or less than the outer diameter of the ring roller 5, and the inner diameter d of the disc spring 36 needs to be larger than the inner diameter of the end portions on the large diameter side of the roller elements 13*a*, 13*b*. Moreover, since the longitudinal elastic modulus E and the Poisson's ratio v are determined by the material of the disc spring 36, the degree of freedom of adjustment is low. Therefore, in the frictional roller reducer 1*c* of this example, by adjusting the thickness t of the disc spring 36 and the total deflection amount $h_0$, the relationship between the deflection amount δ of the disc spring 36 and the force P applied to the pair of roller elements 13*a*, 13*b* by the elastic member 8*j* (spring load of the disc spring 36) is adjusted.

Figure 20:
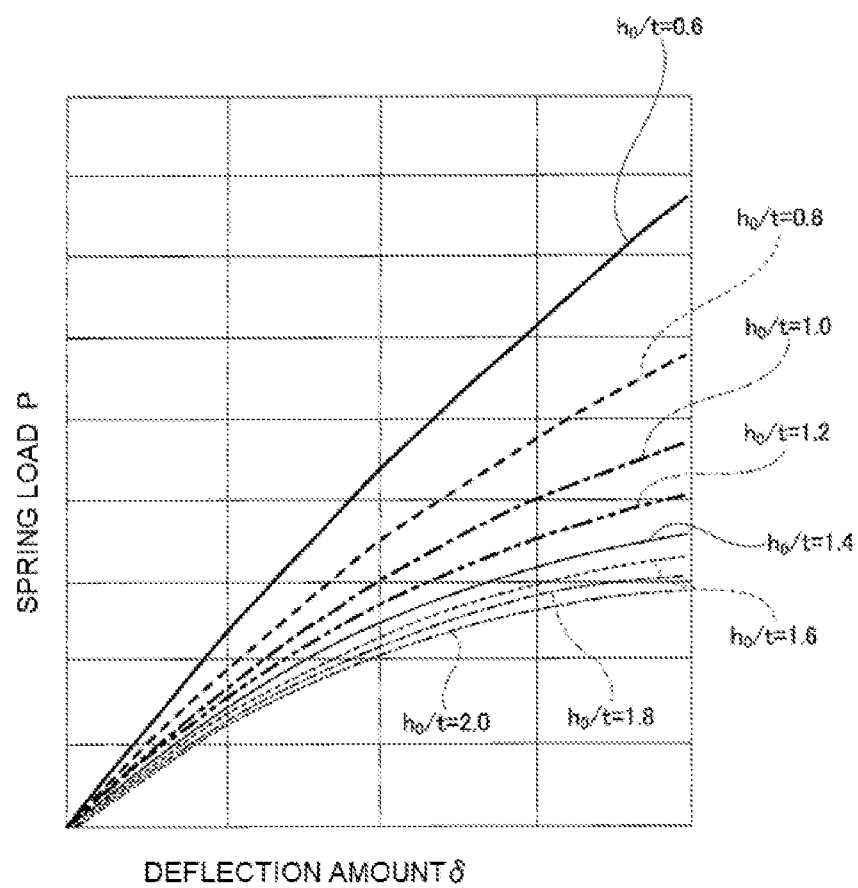
FIG. 20 is a graph illustrating the relationship between the deflection amount □ and the spring load P of disc springs in the first example of the fourth embodiment.

FIG. 20 is a graph showing the relationship between the deflection amount δ of the disc spring 36 and the spring load P for each ratio $h_0/t$ of the total deflection amount δ with respect to the thickness t.

Figure 21A:
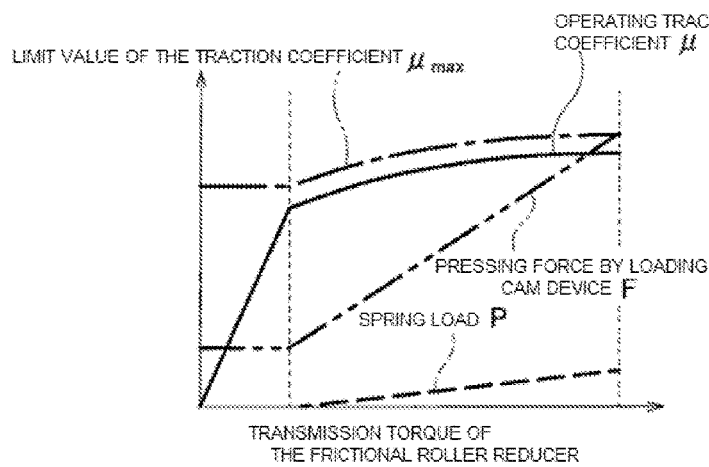
FIGS. 21(A)-21(D) are graphs illustrating the relationship between the torque transmitted by the frictional roller reducer, the spring load P, the operating traction coefficient μ, the maximum traction coefficient $\mu_{max}$, and the pressing force F by the loading cam device in the first example of the fourth embodiment.
Figure 21B:
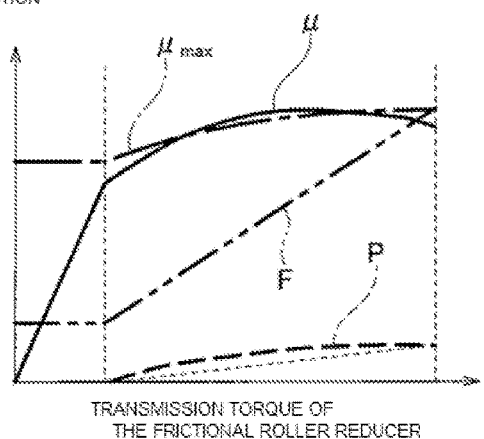
Figure 21C:
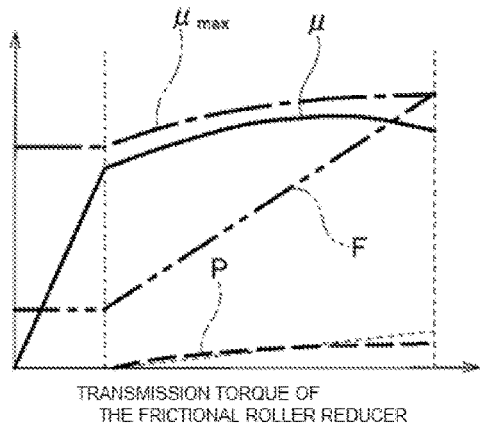

As is clear from FIG. 20, when $h_0/t$ is larger than 1.0, the amount of increase in the spring load P decreases as the deflection amount δ increases. That is, when $h_0/t$ is larger than 1.0, the rate of increase of the spring load P of the disc spring 36 decreases in a region where the nonlinearity of the spring characteristics of the disc spring 36 becomes strong and the transmission torque of the frictional roller reducer 1 is large. When a disc spring 36 having a strong nonlinearity of spring characteristics is used as the elastic member 8*j* and the transmission efficiency is attempted to be well ensured even in the region where the transmission torque of the frictional roller reducer 1 is large, as shown in FIG. 21(B), the surface pressure of the traction portions between the rolling surfaces 21, and the inner-diameter side rolling contact surface 11 and the outer-diameter side rolling contact surface 12 becomes insufficient in the region where the transmission torque of the frictional roller reducer 1 is medium, and the operating traction coefficient μ, may be greater than the maximum traction coefficient $μ_{max}$. As a result, gross slipping may occur. Alternatively, when a disc spring 36 having a strong nonlinearity of spring characteristics is used as the elastic member 8*j*, and when the operating traction coefficient ρ, is made not to exceed the maximum traction coefficient $μ_{max}$ regardless of the transmission torque of the frictional roller reducer 1*c*, as shown in FIG. 21(C), the difference (margin) between the maximum traction coefficient and the operating traction coefficient increases in the region where the transmission torque of the frictional roller reducer 1*c* is large, and thus the transmission efficiency may decrease, or the effect of preventing an accelerating increase in the pressing force due to the occurrence of skew of the intermediate rollers 6 may deteriorate.

Figure 21D:
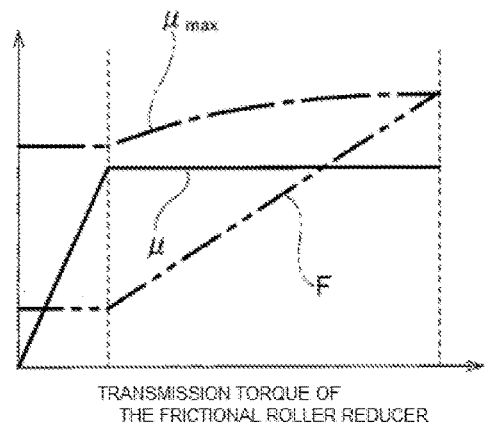
Figure 55:
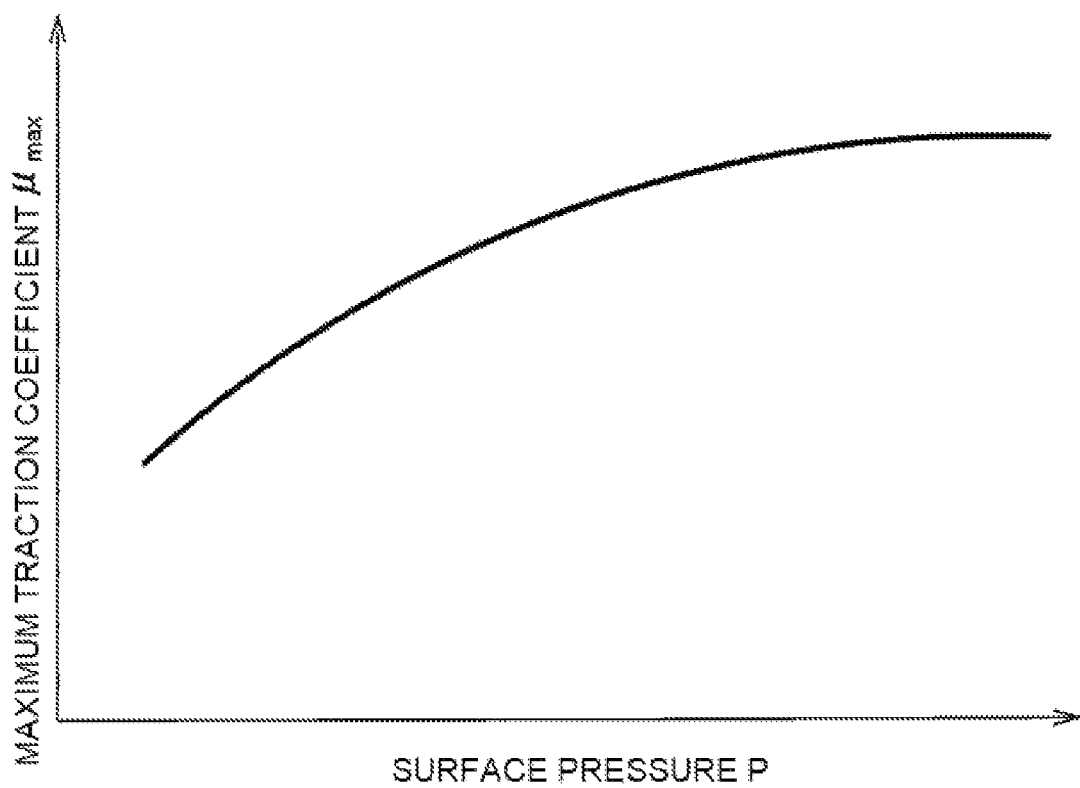
FIG. 55 is a graph illustrating the relationship between the surface pressure of the traction portion and the maximum traction coefficient.

If no elastic member is provided between the pair of roller elements of the ring roller, as illustrated in FIG. 21(D), the operating traction coefficient μ becomes constant since the loading cam device exerts pressing force F proportional to the transmission torque of the frictional roller reducer. On the other hand, as illustrated in FIG. 55, the maximum traction coefficient $μ_{max}$ increases as the surface pressure of the traction portions increases. Therefore, as the transmission torque of the frictional roller reducer increases, the difference (margin) between the maximum traction coefficient $μ_{max}$ and the operating traction coefficient μ increases, so that the transmission efficiency may decrease, or the effect of preventing an accelerating increase in the pressing force due to the occurrence of skew of the intermediate rollers may deteriorate.

On the other hand, in this example, since $h_0/t$ is set to 1.0 or less, the spring characteristics of the disc spring 36 can be made substantially linear as shown in FIG. 20. When a disc spring 36 having substantially linear spring characteristics is used as the elastic member 8*j*, as shown in FIG. 21(A), while preventing the occurrence of gross slipping due to insufficient surface pressure in the traction portions and the operating traction coefficient becoming larger than the maximum traction coefficient in the region where the transmission torque of the frictional roller reducer 1*c* is medium, it is possible to prevent the surface pressure of the traction portions from becoming excessive in the region where the transmission torque of the frictional roller reducer 1*c* is large, so that the transmission efficiency can be well ensured. The configuration and operational effects of the other parts are the same as those of the first example of the first embodiment.

First Example of Fifth Embodiment

Figure 22:
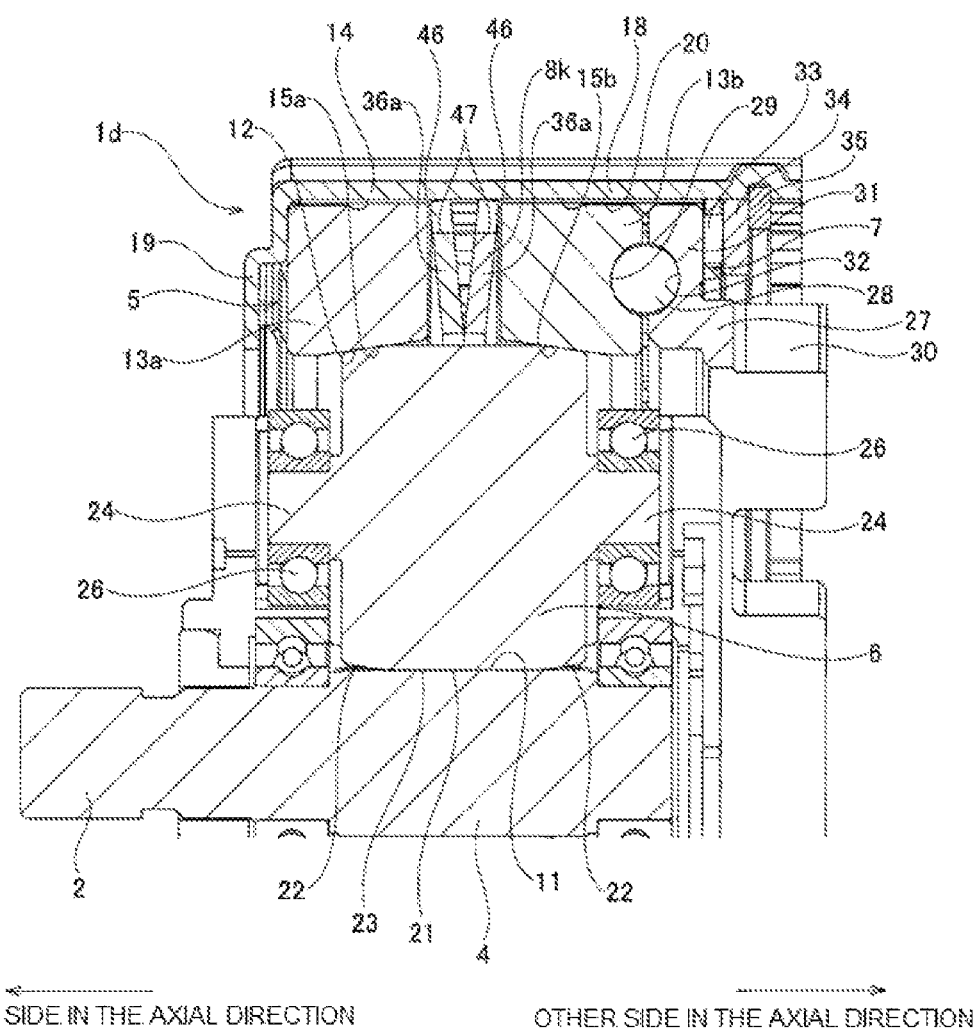
FIG. 22 is a cross-sectional view illustrating a frictional roller reducer of a first example of a fifth embodiment of the present invention.
Figure 23:
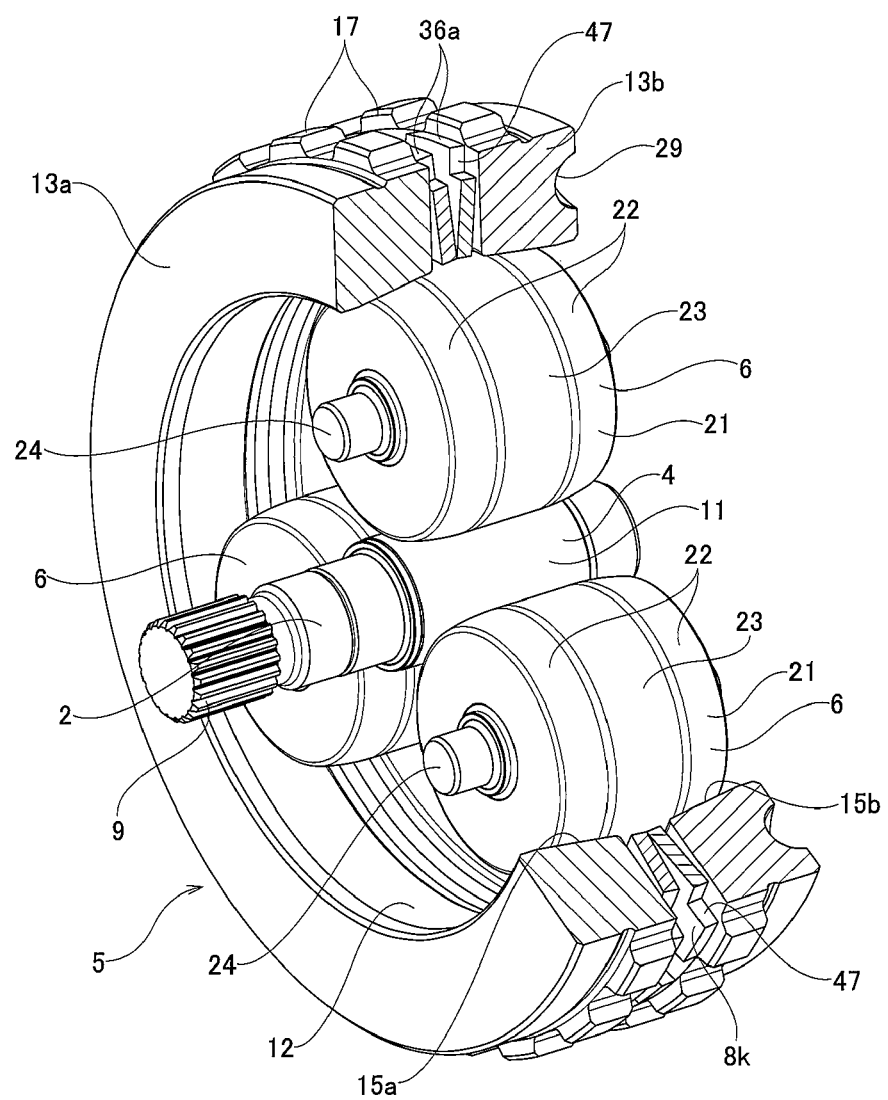
FIG. 23 is a partially cut perspective view of a sun roller, a pair of roller elements of a ring roller, intermediate rollers, and an elastic member taken out from the frictional roller reducer of the first example of the fifth embodiment.
Figure 24:
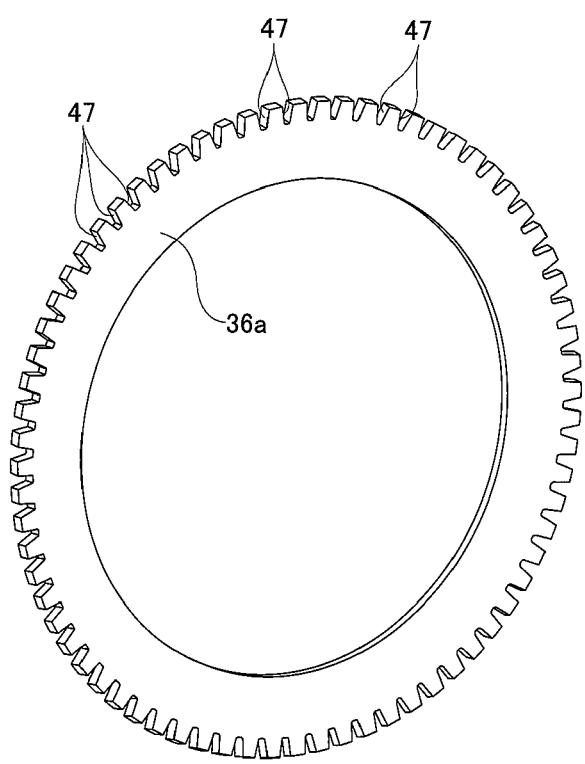
FIG. 24 is an isolated perspective view of one of a pair of disc springs of an elastic member taken out from the frictional roller reducer of the first example of the fifth embodiment.

FIG. 22 to FIG. 24 illustrate a first example of a fifth embodiment of the present invention. The frictional roller reducer 1*d* of this example includes an elastic member 8*k* that elastically urges the pair of roller elements 13*a*, 13*b* in directions going away from each other between the tip-end surfaces (flat surface portions 16) of the pair of roller elements 13*a*, 13*b*.

The frictional roller reducer 1*d* of this example includes oil discharge passages 46 that communicate the radial inner side and the radial outer side of the facing space existing between the pair of roller elements 13*a*, 13*b*. Due to this, in this example, each of the disc springs 36*a* has notches 47 at a plurality of locations uniformly spaced in the circumferential direction of the outer circumferential edge. In other words, each of the disc springs 36*a* has gear-shaped concave and convex portions on the outer circumferential edge.

The elastic member 8*k* is configured by superposing two-disc springs 36*a* in opposite directions with respect to the axial direction so that the respective end portions on the small diameter side abut against each other. That is, the elastic member 8k is configured by combining the disc springs 36a in a two-stage series. In a state where the elastic member 8k is arranged between the tip-end surfaces of the pair of roller elements 13a, 13b, the radial inner side and the radial outer side of the facing space existing between the pair of roller elements 13a, 13b including the elastic member 8k are communicated by the notches 47 provided in each of the disc springs 36a. That is, in this example, the notches 47 form the oil discharge passages 46 that communicate the radial inner side and the radial outer side of the facing space existing between the pair of roller elements 13a, 13b including the elastic member 8k. In other words, the oil discharge passages 46 are formed respectively between the disc spring 36a on one side in the axial direction and the roller element 13a on the one side in the axial direction, and between the disc spring 36a on the other side in the axial direction and the roller element 13b on the other side in the axial direction.

As described above, in the frictional roller reducer 1d of this example, the notches 47 are provided at a plurality of locations uniformly spaced in the circumferential direction of the outer circumferential edge of the two-disc springs 36a of the elastic member 8k, and the notches 47 form the oil discharge passages 46 that communicate the radial inner side and the radial outer side of the facing space existing between the pair of roller elements 13a, 13b including the elastic member 8k. As a result, it is possible to prevent the lubricating oil from staying inside the spaces existing on the radial inner side of the elastic member 8k and surrounded by the inner circumferential surfaces of the elastic member 8k, the side surfaces in the axial direction of the pair of roller elements 13a, 13b facing each other, and the rolling surfaces 21 of the intermediate rollers 6.

That is, when the frictional roller reducer includes an elastic member and does not include oil discharge passages that communicate the radial inner side and the radial outer side of the facing space existing between the pair of roller elements, the lubricating oil stays in the space existing on the radial inner side of the elastic member. When the lubricating oil stays in the space, the stirring resistance increases and the rotational resistance of the intermediate rollers increases, so that the efficiency of the frictional roller reducer may deteriorate.

On the other hand, since the frictional roller reducer 1d of this example includes oil discharge passages 46 that communicate the radial inner side and the radial outer side of the facing space existing between the pair of roller elements 13a, 13b including the elastic member 8k, the lubricating oil existing on the radial inner side of the facing space can be smoothly discharged to the radial outer side of the facing space. Due to this, it is possible to prevent the lubricating oil from staying on the radial inner side of the facing space, and it is possible to prevent an increase in the rotational resistance of the intermediate rollers 6 due to an increase in the stirring resistance of the lubricating oil. As a result, the efficiency of the frictional roller reducer 1d can be prevented from deteriorating. The configuration and operational effects of the other parts are the same as those of the first example of the first embodiment.

Second Example of Fifth Embodiment

Figure 25:
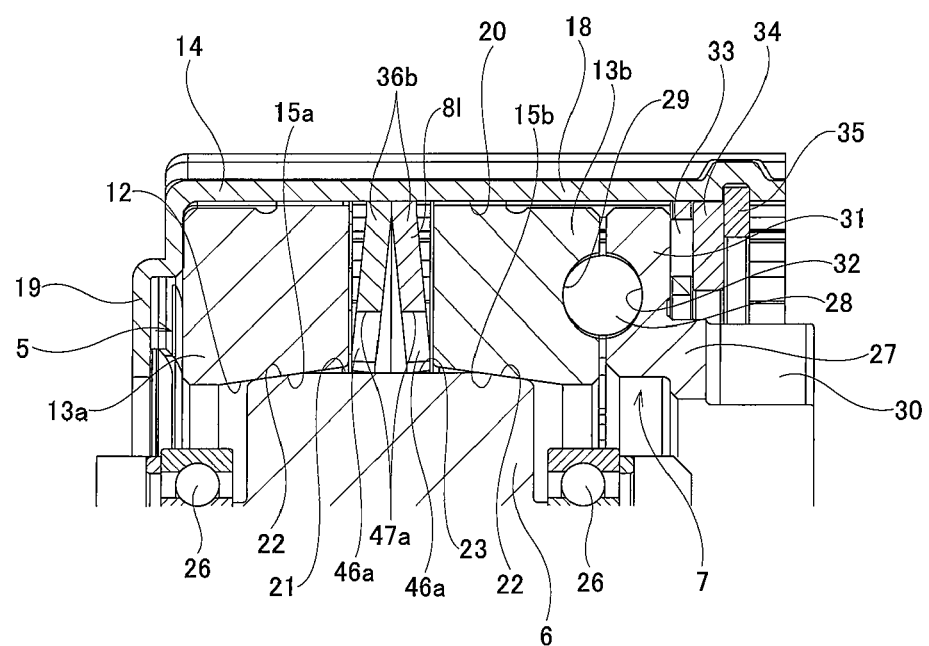
FIG. 25 is an enlarged cross-sectional view illustrating a frictional roller reducer of a second example of the fifth embodiment.
Figure 26:
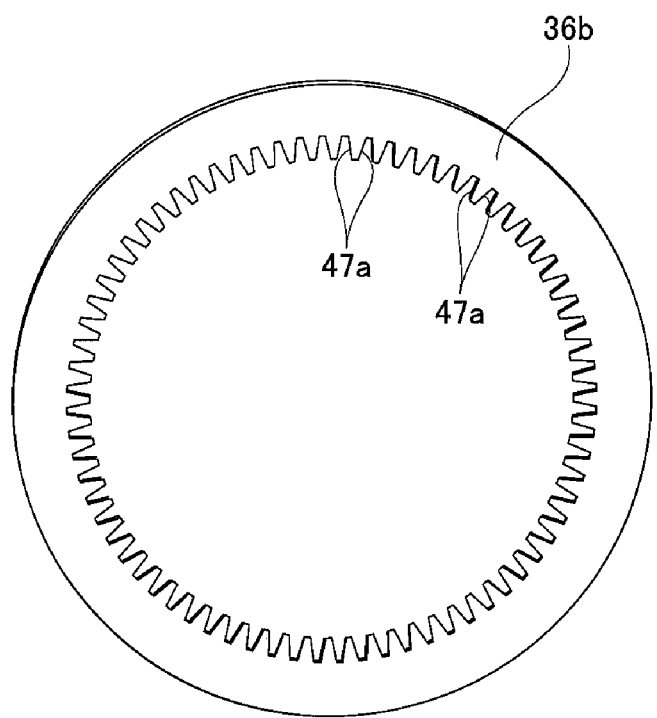
FIG. 26 is an isolated perspective view of one of a pair of disc springs of an elastic member taken out from the frictional roller reducer of the second example of the fifth embodiment.

FIG. 25 and FIG. 26 illustrate a second example of the fifth embodiment of the present invention. In this example, the elastic member 8l arranged between the tip-end surfaces of the pair of roller elements 13a, 13b include two-disc springs 36b respectively having a conical trapezoidal shape. Each of the disc springs 36b has notches 47a at a plurality of locations uniformly spaced in the circumferential direction of the inner circumferential edge. In other words, each of the disc springs 36b has gear-shaped concave and convex portions on the inner circumferential edge.

The elastic member 8l is configured by superposing two-disc springs 36b in opposite directions with respect to the axial direction so that the respective end portions on the large diameter side abut against each other, that is, the elastic member 8k is configured by combining the disc springs 36b in a two-stage series. In a state where the elastic member 8l is arranged between the tip-end surfaces of the pair of roller elements 13a, 13b, the radial inner side and the radial outer side of the facing space existing between the pair of roller elements 13a, 13b including the elastic member 8l are communicated with each other by the notches 47a provided in each of the disc springs 36b. That is, in this example, the notches 47a form the oil discharge passages 46a which communicate the radial inner side and the radial outer side of the facing space existing between the pair of roller elements 13a, 13b including the elastic member 8l. In other words, the oil discharge passages 46a are formed respectively in a portion between a disc spring 36b on one side in the axial direction and the roller element 13a on the one side in the axial direction, and in a portion between the disc spring 36b on the other side in the axial direction and the roller element 13b on the other side in the axial direction.

In this example as well, the lubricating oil existing on the radial inner side of the facing space can be smoothly discharged to the radial outer side of the facing space through the oil discharge passages 46a. Due to this, it is possible to prevent the lubricating oil from staying on the radial inner side of the facing space, and it is possible to prevent an increase in the rotational resistance of the intermediate rollers 6 due to an increase in the stirring resistance of the lubricating oil. The configuration and operational effects of the other parts are the same as those of the first example of the first embodiment and the first example of the fifth embodiment.

Third Example of Fifth Embodiment

Figure 27:
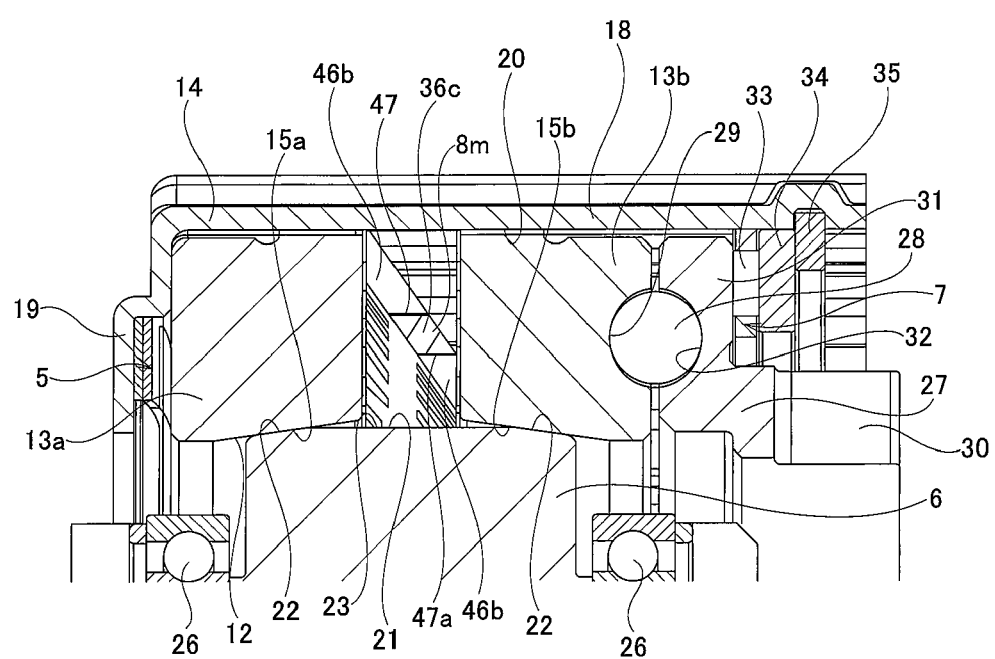
FIG. 27 is an enlarged cross-sectional view illustrating a frictional roller reducer of a third example of the fifth embodiment.
Figure 28:
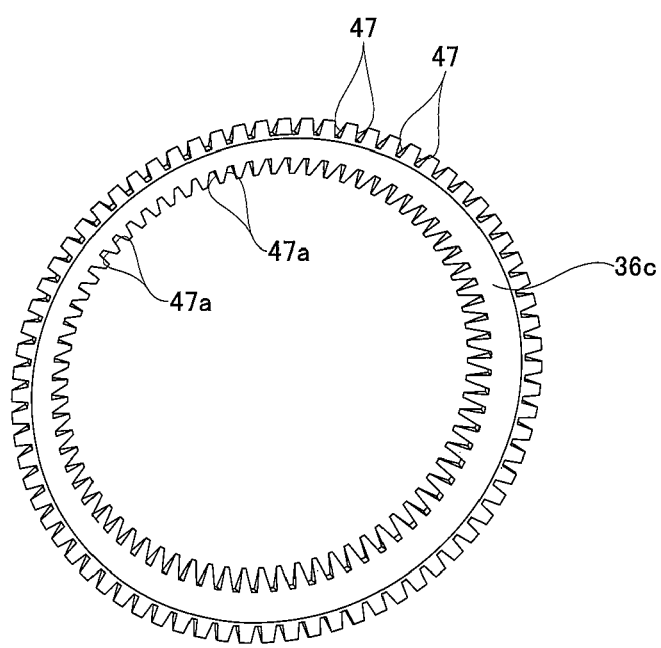
FIG. 28 is an isolated perspective view of a disc spring of an elastic member of the third example of the fifth embodiment.

FIG. 27 and FIG. 28 illustrate a third example of the fifth embodiment of the present invention. In this example, the elastic member 8m arranged between the tip-end surfaces of the pair of roller elements 13a, 13b is configured by one disc spring 36c having a conical trapezoidal shape. The disc spring 36c has notches 47 at a plurality of locations uniformly spaced in the circumferential direction of the outer circumferential edge and notches 47a at a plurality of locations uniformly spaced in the circumferential direction of the inner circumferential edge. In other words, the disc spring 36c has gear-shaped concave and convex portions on the outer circumferential edge and also gear-shaped concave and convex portions on the inner circumferential edge.

In a state where the elastic member 8m is arranged between the tip-end surfaces of the pair of roller elements 13a, 13b, the radial inner side and the radial outer side of the facing space existing between the pair of roller elements 13a, 13b are communicated with each other by the notches 47, 47a provided in the disc spring 36c. That is, in this example, the notches 47, 47a form the oil discharge passages 46a which communicate the radial inner side and the radial outer side of the facing space existing between the pair of roller elements 13a, 13b including the elastic member 8m.

In this example, the lubricating oil existing on the radial inner side of the facing space can be discharged to the radial outer side of the facing space through the oil discharge passages 46b configured by the notches 47, 47a. Due to this, the effect of discharging the lubricating oil can be improved compared with the structure of the first example of the fifth embodiment. The configuration and operational effects of the other parts are the same as those of the first example of the first embodiment and the first example of the fifth embodiment.

Fourth Example of Fifth Embodiment

Figure 29:
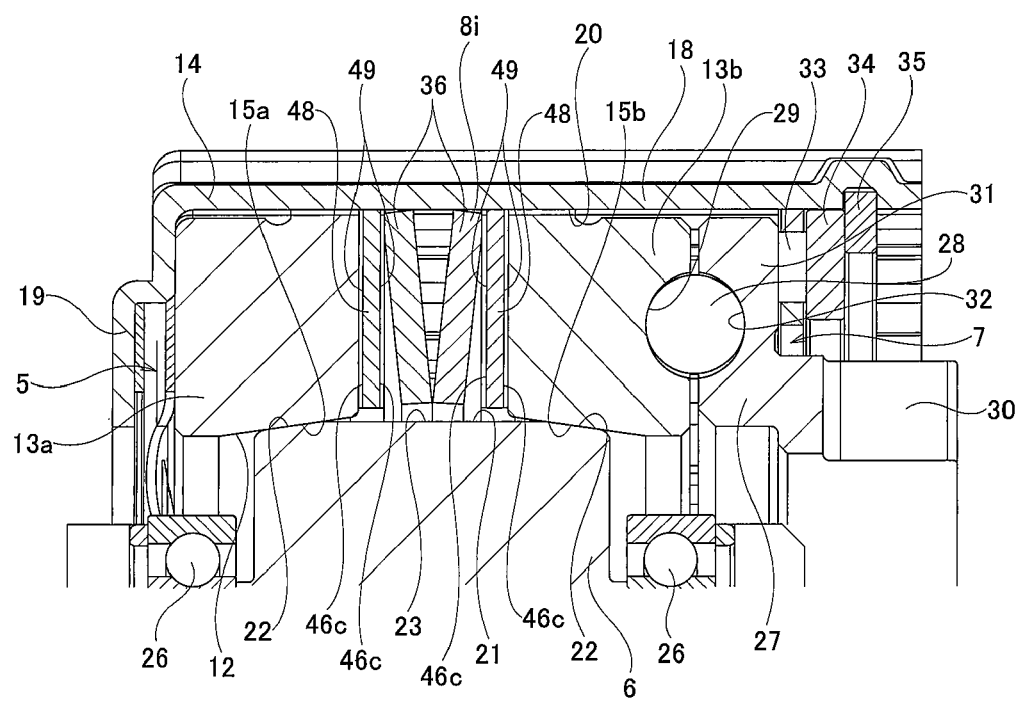
FIG. 29 is an enlarged cross-sectional view illustrating a frictional roller reducer of a fourth example of the fifth embodiment.
Figure 30:
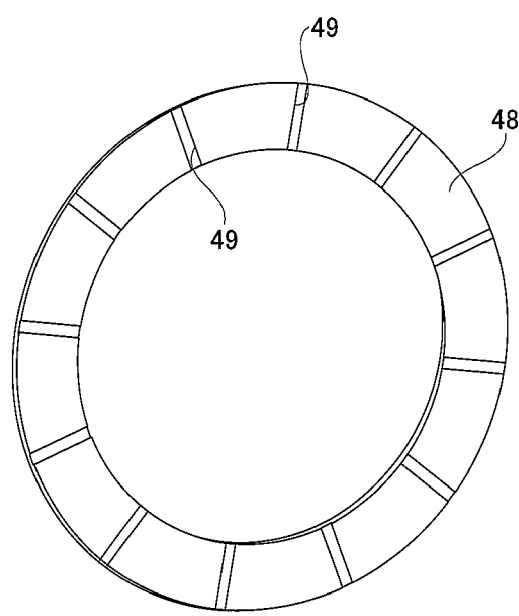
FIG. 30 is an isolated perspective view of a shim plate take out from the frictional roller reducer of the fourth example of the fifth embodiment.

FIG. 29 and FIG. 30 illustrate a fourth example of the fifth embodiment of the present invention. In this example, the elastic member 8i arranged between the tip-end surfaces of the pair of roller elements 13a, 13b includes two-disc springs 36 having a conical trapezoidal shape. The elastic member 8i is configured by superposing two-disc springs 36 so that the respective end portions on the small diameter side abut against each other, that is, the elastic member 8i is configured by combining the disc springs 36 in a two-stage series. Here, each of the disc springs 36 does not have notches on either the outer circumferential edge or the inner circumferential edge.

In this example, a hollow circular plate-shaped shim plate 48 is held between the tip-end surfaces of the pair of roller elements 13a, 13b and end portions on the large diameter side of each of the disc springs 36 respectively. Each of the shim plate 48 has concave grooves 49 at a plurality of locations uniformly spaced in the circumferential direction on side surfaces on both sides in the axial direction facing the disc springs 36. That is, the concave grooves 49 are open to each of the side surfaces in the axial direction and the outer circumferential edge and the inner circumferential edge of the shim plates 48.

In this example, the radial inner side and the radial outer side of the facing space existing between the pair of roller elements 13a, 13b are communicated with each other by the concave grooves 49 provided in each of the shim plates 48. That is, in this example, the concave grooves 49 form the oil discharge passages 46c which communicate the radial inner side and the radial outer side of the facing space existing between the pair of roller elements 13a, 13b including the elastic member 8i. In other words, the oil discharge passages 46c are respectively formed between the shim plate 48 on one side in the axial direction and the roller element 13a on the one side in the axial direction and between the shim plate 48 on the one side in the axial direction and the disc spring 36 on the one side in the axial direction, and also between the shim plate 48 on the other side in the axial direction and the roller element 13b on the other side in the axial direction and between the shim plate 48 on the other side in the axial direction and the disc spring 36 on the other side in the axial direction. In this example, the lubricating oil existing on the radial inner side of the facing space can be smoothly discharged to the radial outer side of the facing space through the oil discharge passages 46c configured by the concave grooves 49.

Instead of the concave grooves, ridges extending in the radial direction can be formed at a plurality of locations in the circumferential direction on the side surfaces in the axial direction of the shim plates. In this case, oil discharge passages are formed by the portions between the ridges adjacent to each other in the circumferential direction. Therefore, the cross-sectional area of the oil discharge passages can be increased, and the effect of discharging the lubricating oil can be improved. The configuration and operational effects of the other parts are the same as those of the first example of the first embodiment and the first example of the fifth embodiment.

Fifth Example of Fifth Embodiment

Figure 31:
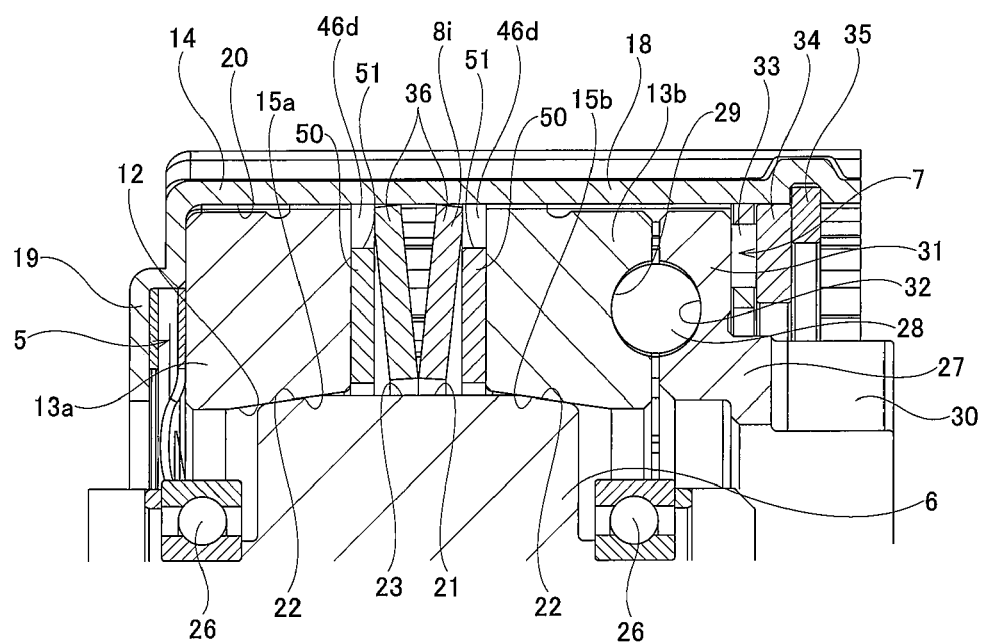
FIG. 31 is an enlarged cross-sectional view illustrating a frictional roller reducer of a fifth example of the fifth embodiment.
Figure 32:
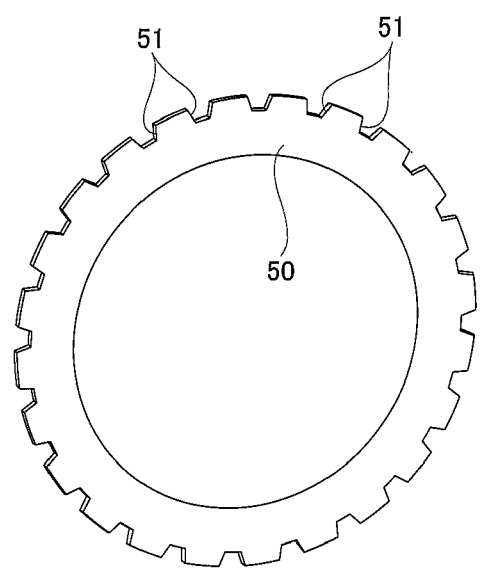
FIG. 32 is an isolated perspective view of a lock washer taken out from the frictional roller reducer of the fifth example of the fifth embodiment.

FIG. 31 and FIG. 32 illustrate a fifth example of the fifth embodiment of the present invention. In this example, an elastic member 8i, that is configured by superposing two-disc springs 36 so that the respective end portions on the small diameter side abut against each other, is arranged between the tip-end surfaces of the pair of roller elements 13a, 13b.

In this example, a hollow circular plate-shaped lock washer 50 is held between the tip-end surfaces of the pair of roller elements 13a, 13b and each of end portions on the large diameter side of the disc springs 36 respectively. Each of the lock washers 50 has notches 51 at a plurality of locations in the circumferential direction of the outer circumferential edge. In other words, the lock washer 50 has gear-shaped concave and convex portions on the outer circumferential edge.

In this example, the radial inner side and the radial outer side of the facing space existing between the pair of roller elements 13a, 13b are communicated with each other by the notches 51 provided in each of the lock washer 50. That is, in this example, the notches 51 form the oil discharge passages 46d which communicate the radial inner side and the radial outer side of the facing space existing between the pair of roller elements 13a, 13b including the elastic member 8i. In other words, the oil discharge passages 46d are formed respectively between the lock washer 50 on one side in the axial direction and the disc spring 36 on the one side in the axial direction, and between the lock washer 50 on the other side in the axial direction and the disc spring 36 on the other side in the axial direction. In this example, the lubricating oil existing on the radial inner side of the facing space can be smoothly discharged to the radial outer side of the facing space though the oil discharge passages 46d configured by the notches 51. The configuration and operational effects of the other parts are the same as those of the first example of the first embodiment and the first example of the fifth embodiment.

Sixth Example of Fifth Embodiment

Figure 33:
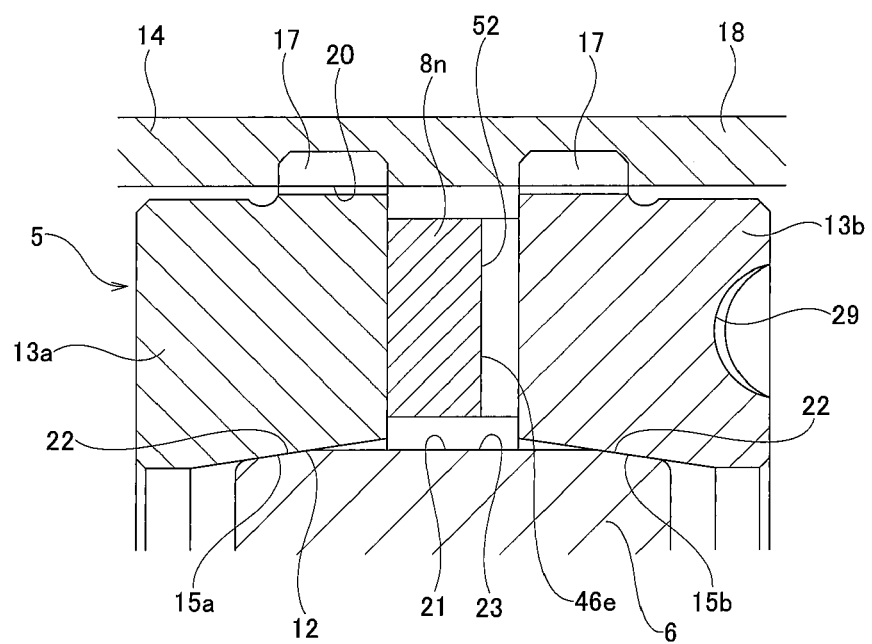
FIG. 33 is an enlarged cross-sectional view illustrating a frictional roller reducer of a sixth example of the fifth embodiment.

FIG. 33 illustrates a sixth example of the fifth embodiment of the present invention. In this example, the elastic member 8n arranged between the tip-end surfaces of the pair of roller elements 13a, 13b has a cylindrical shape, and is made of an elastic material such as an elastomer such as rubber. The elastic member 8n has concave grooves 52 extending over the radial direction at a plurality of locations in the circumferential direction on a side surface on the other side in the axial direction. That is, the concave grooves 52 are open to the side surface on the other side in the axial direction and to the outer circumferential surface and the inner circumferential surface of the elastic member 8n.

In this example, the radial inner side and the radial outer side of the facing space existing between the pair of roller elements 13a, 13b and in which the elastic member 8n is arranged are communicated by the concave grooves 52 provided on the side surface on the other side in the axial direction of the elastic member 8n. That is, in this example, the oil discharge passages 46e are configured by the concave grooves 52. Therefore, the lubricating oil existing on the radial inner side of the facing space can be smoothly discharged to the radial outer side of the facing space through the oil discharge passages 46e. The configuration and operational effects of the other parts are the same as those of the first example of the first embodiment and the first example of the fifth embodiment.

Seventh Example of Fifth Embodiment

Figure 34:
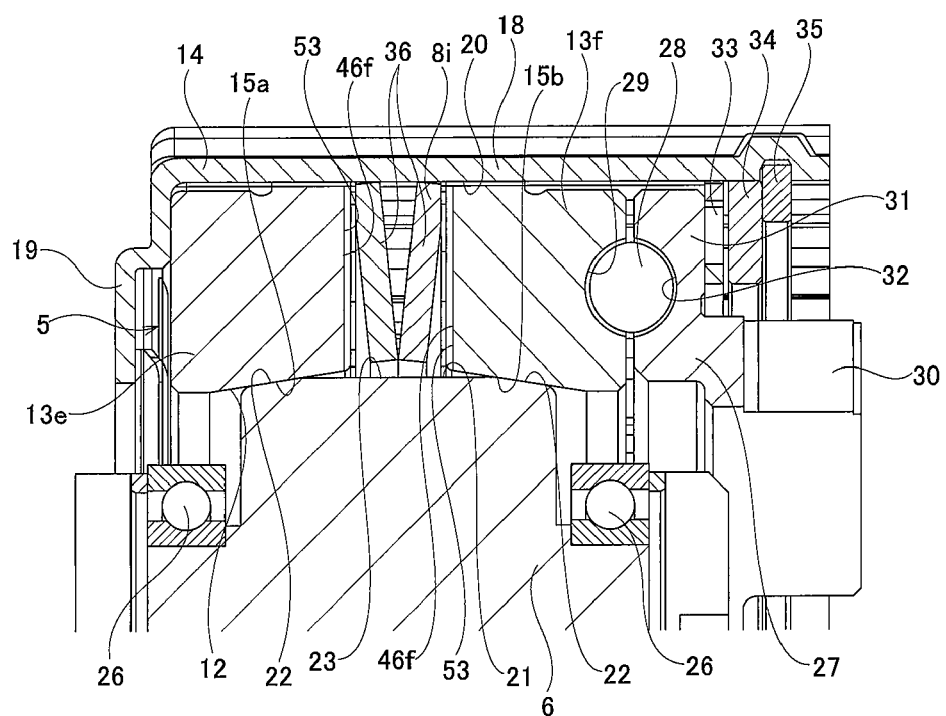
FIG. 34 is an enlarged cross-sectional view illustrating a frictional roller reducer of a seventh example of the fifth embodiment.
Figure 35:
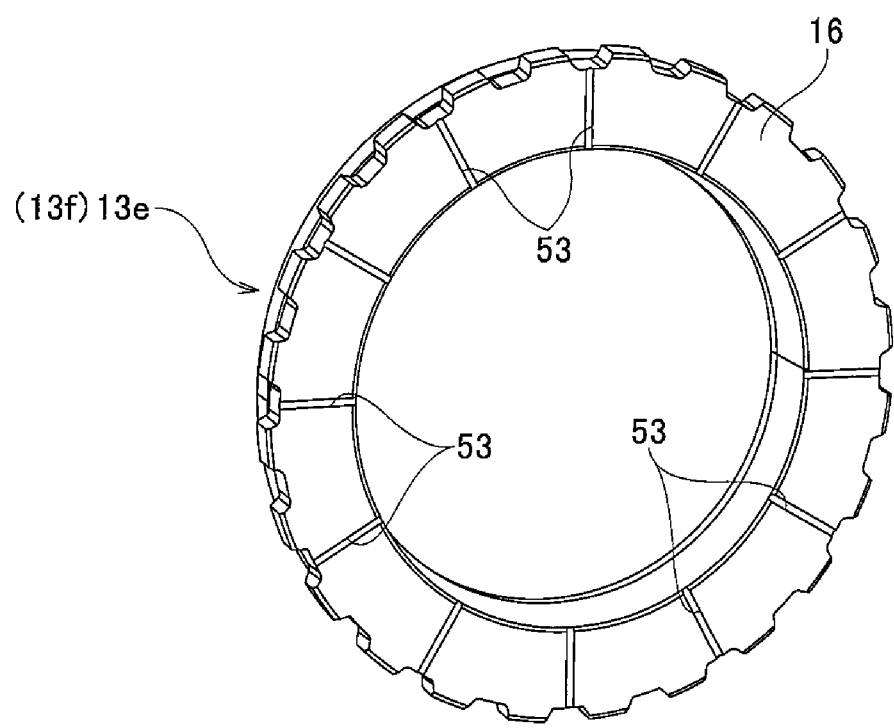
FIG. 35 is an isolated perspective view of one of roller elements taken out from the frictional roller reducer of the seventh example of the fifth embodiment.

FIG. 34 and FIG. 35 illustrate a seventh example of the fifth embodiment of the present invention. In this example, the pair of roller elements 13e, 13f have concave grooves 53 extending over the radial direction at a plurality of locations uniformly spaced in the circumferential direction on the tip-end surfaces (flat surface portions 16) that face each other. That is, the concave grooves 53 are open to the tip-end surfaces and the outer circumferential surface and the inner circumferential surface of the roller elements 13e, 13f. In this example, the concave grooves 53 have an arc-shaped cross-sectional shape.

An elastic member 8i configured by two-disc springs 36 having a conical trapezoidal shape is held between the pair of roller elements 13e, 13f. The elastic member 8i is configured by superposing the two-disc springs 36 so that the respective end portions on the small diameter side abut against each other, that is, the elastic member 8i is configured by combining the disc springs 36 in a two-stage series. Each of the disc springs 36 does not have notches on neither the outer circumferential edge nor the inner circumferential edge.

In this example, the radial inner side and the radial outer side of the facing space existing between the pair of roller elements 13e, 13f and in which the elastic member 8i is arranged are communicated with each other by the concave grooves 53 provided on the tip-end surfaces of the pair of roller elements 13e, 13f. That is, in this example, the concave grooves 53 form oil discharge passages 46f. Therefore, the lubricating oil existing on the radial inner side of the facing space can be smoothly discharged to the radial outer side of the facing space through the oil discharge passages 46f.

Moreover, in this example, the cross-sectional shape of the concave grooves 53 is made to be an arc shape. Therefore, when torque is transmitted by the frictional roller reducer 1, it is possible to prevent stress from concentrating on the portions of the roller elements 13e, 13f where the concave grooves 53 are formed. The configuration and operational effects of the other parts are the same as those of the first example of the first embodiment and the first example of the fifth embodiment.

Eighth Example of Fifth Embodiment

Figure 36:
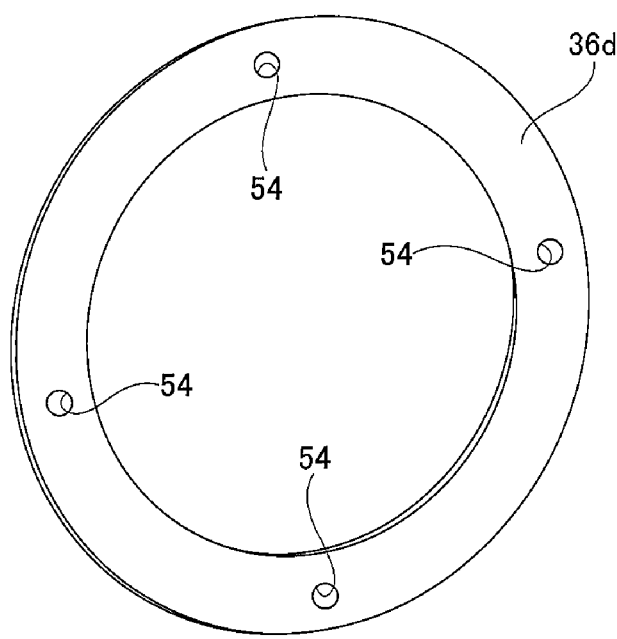
FIG. 36 is an isolated perspective view of one of a pair of disc springs of an elastic member taken out from a frictional roller reducer of an eighth example of the fifth embodiment.
Figure 37:
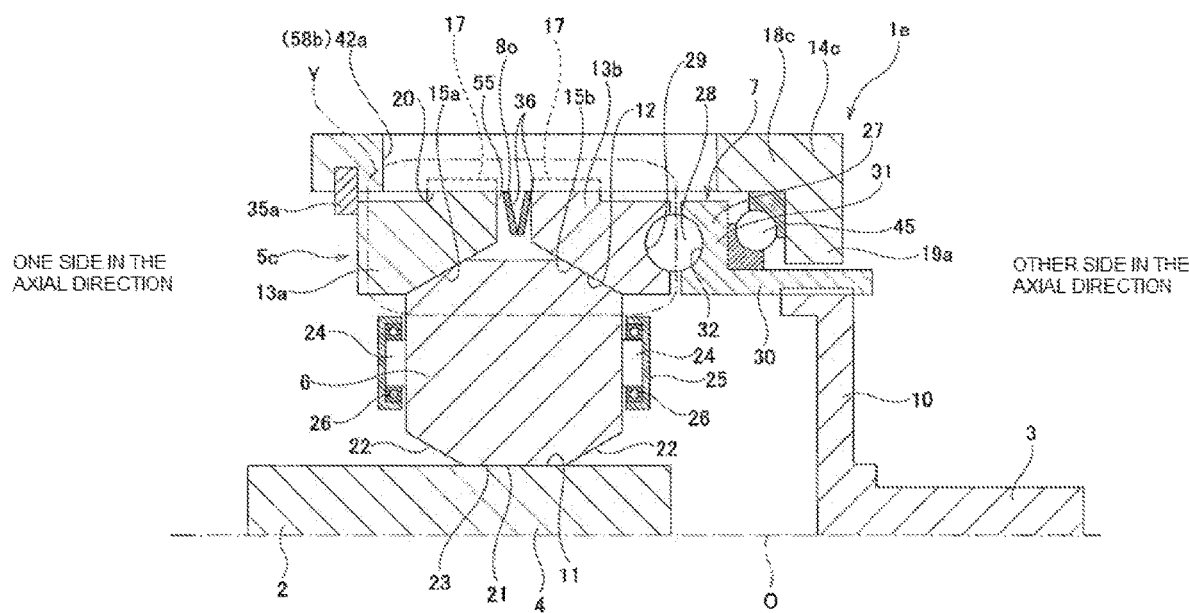
FIG. 37 is a schematic cross-sectional view of a frictional roller reducer of a first example of the sixth embodiment.
Figure 38:
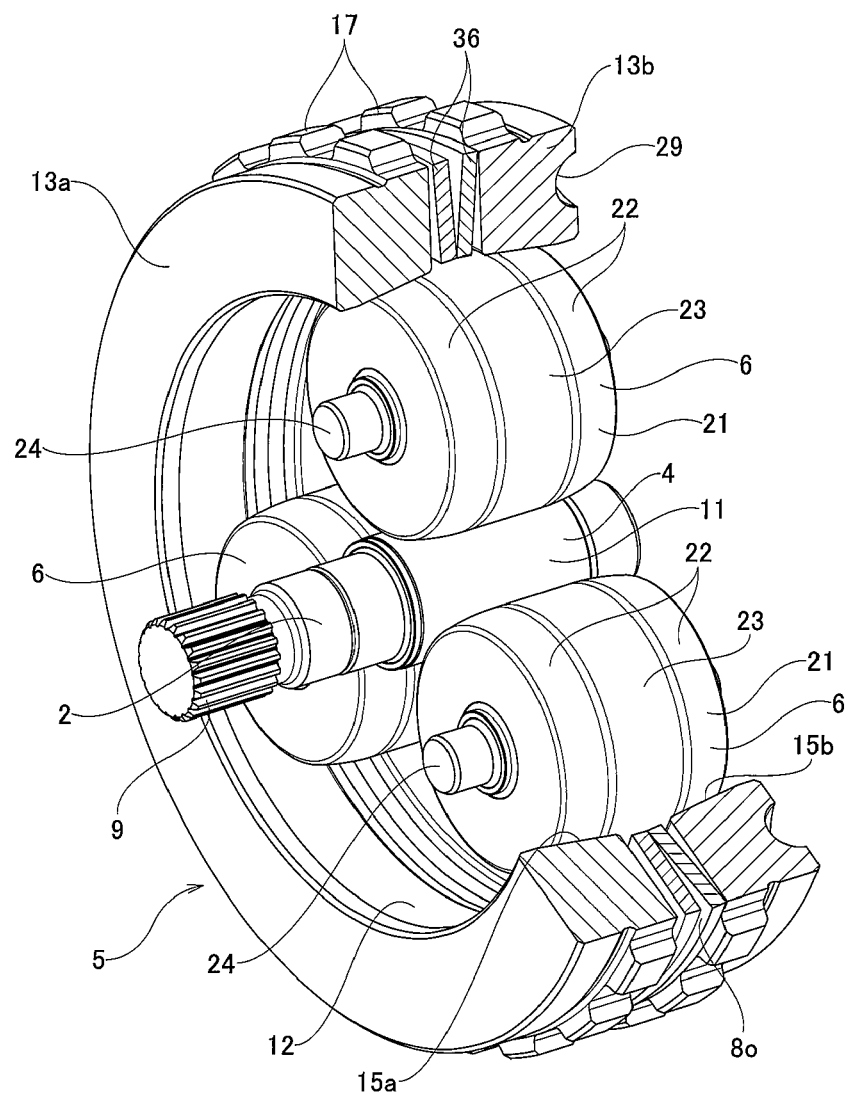
FIG. 38 is a partially cut perspective view of a sun roller, a pair of roller elements of a ring roller, intermediate rollers, and an elastic member taken out from a frictional roller reducer of the first example of the sixth embodiment.

FIG. 36 is an eighth example of the fifth embodiment of the present invention. In this example, the elastic member arranged between the tip-end surfaces of the pair of roller elements 13a, 13b (see FIG. 22 and FIG. 23) is configured by two-disc springs 36d respectively having a conical trapezoidal shape and superposed in opposite directions with respect to the axial direction. Each of the disc springs 36d has through holes 54 respectively penetrating at a plurality of locations in the circumferential direction (four locations in the illustrated example) of the intermediate portion in the radial direction. That is, in a state where the elastic member is arranged between the tip-end surfaces of the pair of roller elements 13a, 13b, the radial inner side and the radial outer side of the facing space existing between the pair of roller elements 13a, 13b and in which the elastic member is arranged are communicated with each other by the through holes 54 provided in each of the disc springs 36d. That is, in this example, the through holes 54 form the oil discharge passages that communicate the radial inner side and the radial outer side of the facing space existing between the pair of roller elements 13a, 13b including the elastic member. The configuration and operational effects of the other parts are the same as those of the first example of the first embodiment and the first example of the fifth embodiment.

In case of implementing the frictional roller reducer according to the present embodiment, various configurations can be adopted as long as the oil discharge passages that communicate the radial inner side and the radial outer side of the facing space existing between the pair of roller elements and in which the elastic member is arranged can be ensured.

For example, as illustrated in FIG. 8 illustrating the fifth example of the first embodiment, an elastic member 8d which is a wave washer can be held between the tip-end surfaces (flat surface portions 16) of the pair of roller elements 13a, 13b. The wave washer has a corrugated shape with respect to the circumferential direction. That is, in a state where the wave washer is arranged between the tip-end surfaces of the pair of roller elements 13a, 13b, oil discharge passages which communicate the radial inner side and the radial outer side of the facing space existing between the pair of roller elements 13a, 13b are formed at a plurality of locations in the circumferential direction between the side surfaces in the axial direction of the elastic member 8d and the tip-end surfaces of the pair of roller elements 13a, 13b.

Alternatively, as illustrated in FIG. 9 illustrating the sixth example of the first embodiment, the elastic member 8e configured by a torsion coil spring 37 can be held between the tip-end surfaces (flat surface portions 16) of the pair of roller elements 13a, 13b. The torsion coil spring 37 is configured by winding a metal wire in a spiral shape. Therefore, in a state where the torsion coil spring 37 is arranged between the tip-end surfaces of the pair of roller elements 13a, 13b, gaps between portions adjacent to each other in the axial direction of the metal wire of the torsion coil spring 37 form the oil discharge passages that communicate the radial inner side and the radial outer side of the facing space existing between the pair of roller elements 13a, 13b.

First Example of Sixth Embodiment

FIG. 37 to FIG. 44 shows a first example of a sixth embodiment of the present invention. The frictional roller reducer of this embodiment has an elastic member that elastically urges the pair of roller elements in directions going away from the rolling surfaces of the intermediate rollers. In the loading cam device, a preload spring may be installed in a compressed state between the roller elements and the cam disk. The preload spring elastically presses the roller elements and the cam disk in directions going away from each other. Therefore, in the loading cam device including the preload spring, since the pressing force based on the elasticity of the preload spring is exerted in the preload region from a state before torque is input to the input shaft to a state where the amount of landing of the rolling bodies from the bottom of the concave portions on the drive-side cam surface and the bottom of the concave portions on the driven-side cam surface increases to some extent, it is possible to apply the minimum required surface pressure to the traction portions immediately after the start of operation of the frictional roller reducer (immediately after the start of torque input to the input shaft).

As illustrated in FIG. 55 described above, the maximum traction coefficient $\mu_{max}$ becomes larger when the torque transmitted by the frictional roller reducer is large and the surface pressure P of the traction portions becomes larger. Conversely, the maximum traction coefficient $\mu_{max}$ becomes smaller when the torque transmitted by the frictional roller reducer is small and the surface pressure P of the traction portions becomes smaller. Therefore, in the region where the torque transmitted by the frictional roller reducer is small, when the force applied to the pair of roller elements by the elastic member to elastically urges the pair of roller elements in directions going away from the rolling surfaces of the intermediate rollers becomes excessive, the surface pressure P of the traction portions may become insufficient and gross slipping may occur.

Figure 43:
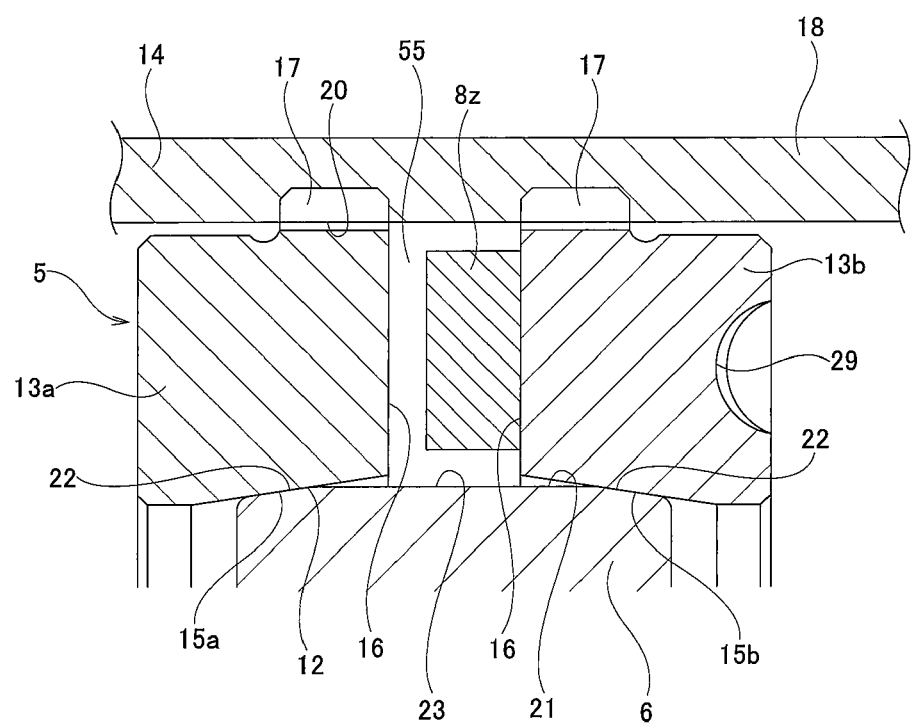
FIG. 43 is an enlarged cross-sectional view illustrating an example of a structure in which a gap is provided between the roller elements and the elastic member.
Figure 44:
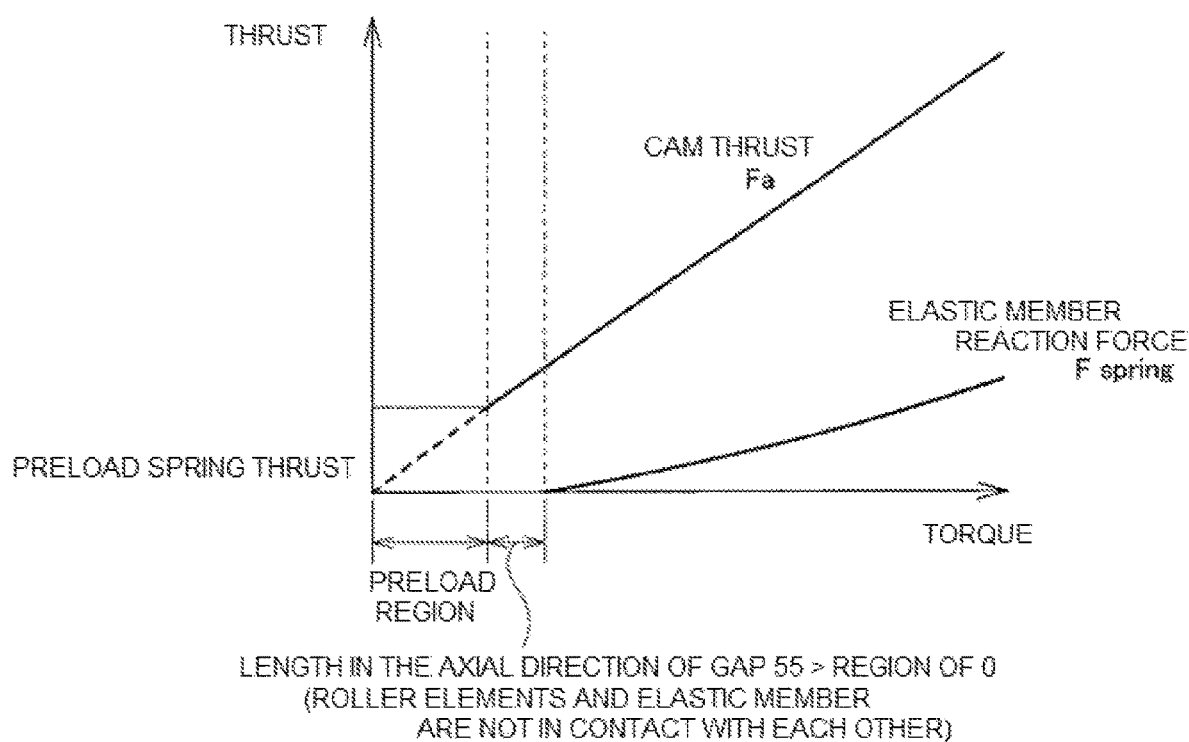
FIG. 44 is a graph illustrating the relationship between the transmission torque in the frictional roller reducer, the thrust of the loading cam device, and the reaction force (elastic restoring force) of the elastic member in the first example of the sixth embodiment.

In order to reliably prevent the occurrence of gross slipping in the region where the torque transmitted by the frictional roller reducer is small, for example, as illustrated in FIG. 43, it is considered to provide a gap 55 between the elastic member 8z and one roller element 13a of the pair of roller elements 13a, 13b. When the gap 55 is provided, as illustrated in FIG. 44, in the region where the torque transmitted by the frictional roller reducer is small, the elastic member 8z does not apply a force to the pair of roller elements 13a, 13b in directions going away from each other based on the elastic restoration of the elastic member 8z. Therefore, in the region where the torque transmitted by the frictional roller reducer is small and the surface pressure of the traction portions is small, it is possible to prevent the maximum traction coefficient $\mu_{max}$ from becoming unnecessarily small, and it is possible to reliably prevent the occurrence of gross slipping.

As the torque transmitted by the frictional roller reducer becomes larger, the gap 55 becomes smaller. When the gap 55 disappears and the roller element 13a and the elastic member 8z come into contact with each other so that the elastic member 8z starts to elastic deform, the elastic member 8z starts to apply a force to the pair of roller elements 13a, 13b in directions going away from each other. As illustrated in FIG. 44, the force applied to the pair of roller elements 13a, 13b by the elastic member 8z becomes larger as the torque transmitted by the frictional roller reducer becomes larger.

However, if the gap 55 is made too large, the elastic member 8z may be largely displaced between the pair of roller elements 13a, 13b so as to cause noise and wear. And/or, when the torque transmitted by the frictional roller reducer becomes large, the force applied to the pair of roller elements 13a, 13b by the elastic member 8z cannot be made to a desired magnitude, and the efficiency of the frictional roller reducer may deteriorate, or damage such as seizure may occur. Due to this, it is necessary to accurately regulate the size of the gap 55 in the initial state before the torque is input to the input shaft.

If it is possible to prevent the occurrence of gross slipping in the region where the torque transmitted by the frictional roller reducer is small, it is not necessarily required to provide a gap 55. That is, in the initial state, the elastic member can be held between the tip-end surfaces of the pair of roller elements in a state where the elastic member is not compressed or is slightly compressed. In other words, in the initial state, the end portions of the elastic member can be brought into contact with the tip-end surfaces of the pair of roller elements in a state where the elastic member is not compressed or is slightly compressed. Even in this case, in order to obtain a desired magnitude of the force applied to the pair of roller elements by the elastic member when the torque transmitted by the frictional roller reducer becomes large, it is necessary to accurately regulate the distance between the tip-end surfaces of the pair of roller elements and the contact state between the tip-end surfaces of the pair of roller elements and the elastic member in the initial state.

Figure 54:
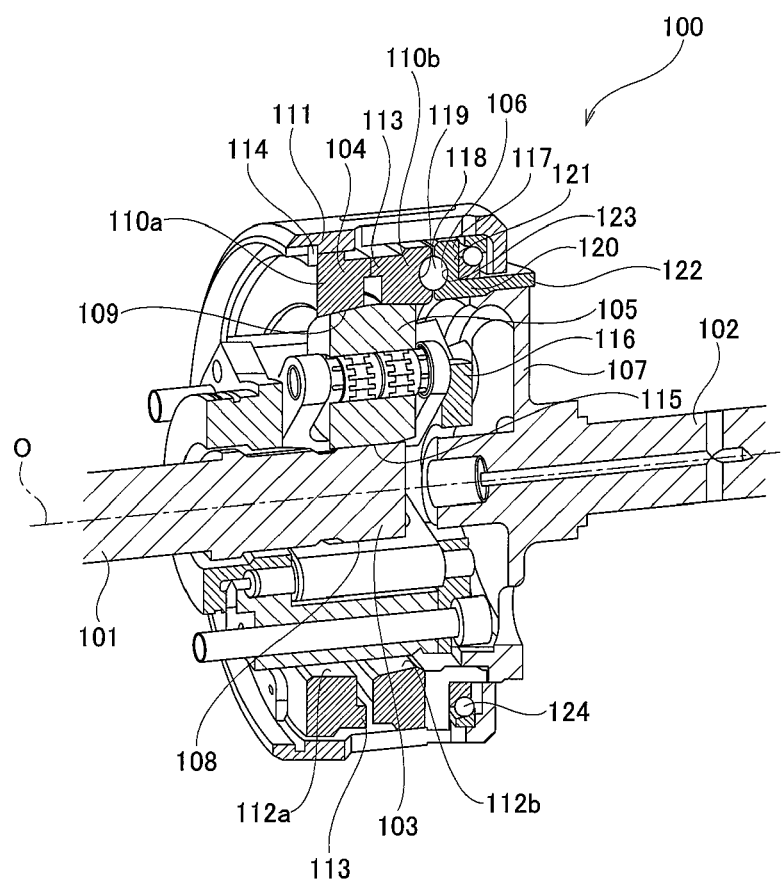
FIG. 54 is a cross-sectional perspective view illustrating an example of a conventional structure of a frictional roller reducer.

In the conventional frictional roller reducer 100 illustrated in FIG. 54, the perimeter of the pair of roller elements 110a, 110b is covered with the connecting cylinder 111 in the assembled state. Due to this, after the sun roller 103, the pair of roller elements 110a, 110b, and the plurality of intermediate rollers 105 are arranged on the radial inner side of the connecting cylinder 111, the tip-end surfaces of the pair of roller elements 110a, 110b cannot be visually confirmed from the outside. Therefore, in the conventional frictional roller reducer 100, it is difficult to accurately regulate the distance between the tip-end surfaces of the pair of roller elements and the contact state between the tip-end surfaces of the pair of roller elements and the elastic member.

An object of this embodiment is to provides a frictional roller reducer that is capable of visually confirming the tip-end surfaces of the pair of roller elements from the outside even after arranging the sun roller, the pair of roller elements, and the plurality of intermediate rollers on the radial inner side of the connecting cylinder.

In the frictional roller reducer 1e of this example, the ring roller 5c is configured by combining a pair of roller elements 13a, 13b with a connecting cylinder 14c so as to be able to relatively displace in the axial direction and not to be able to relatively rotate. The connecting cylinder 14c has a cylindrical portion 18c and a side plate portion 19a bent inward in the radial direction from an end portion on the other side in the axial direction of the cylindrical portion 18a.

Figure 39:
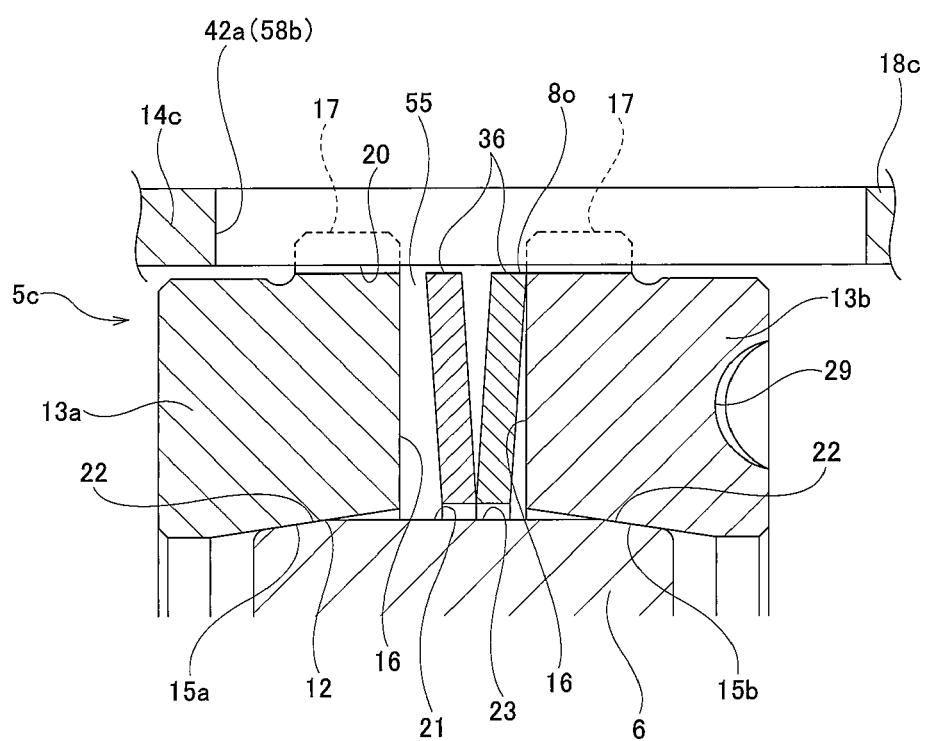
FIG. 39 is an enlarged view of part Yin FIG. 38.
Figure 40:
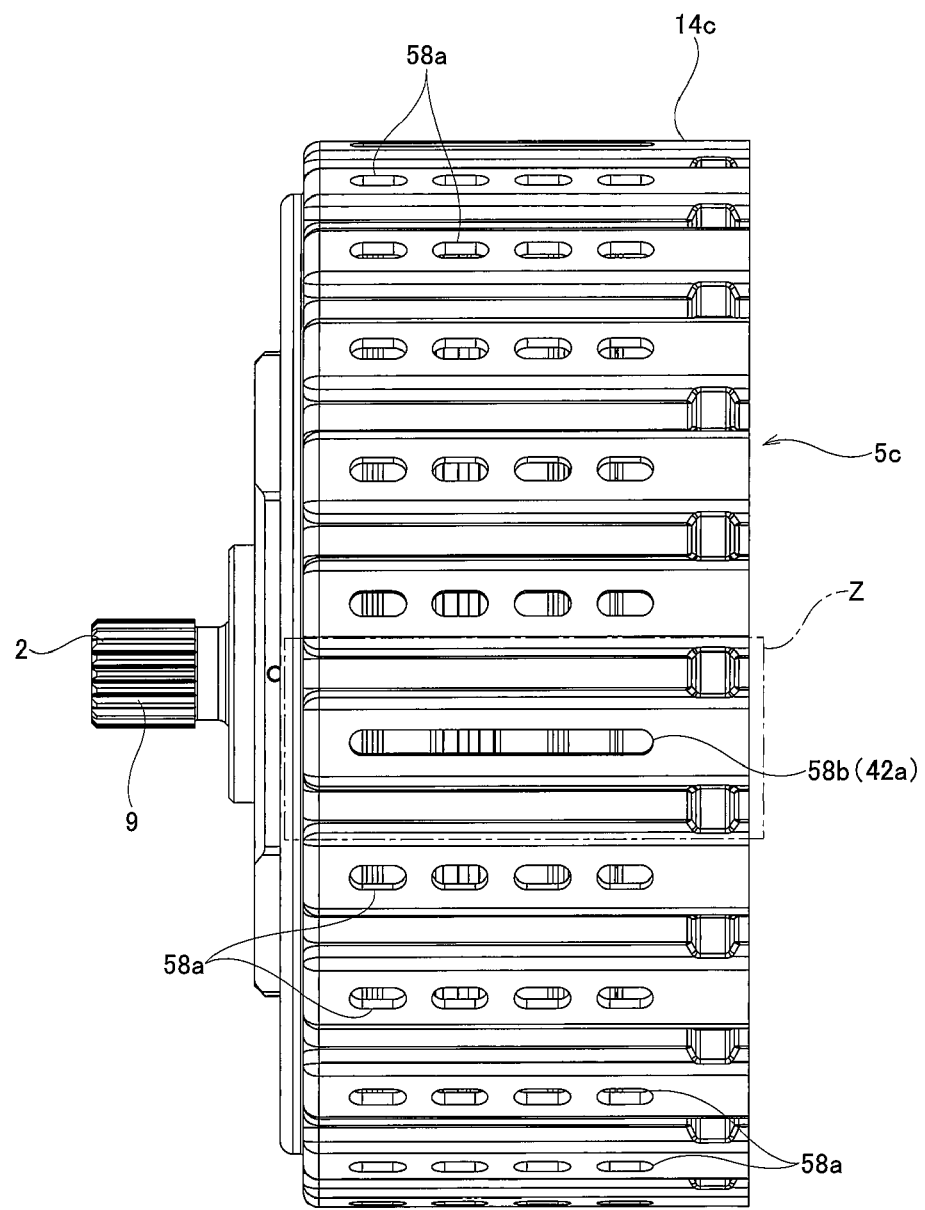
FIG. 40 is a side view of the frictional roller reducer of the first example of the sixth embodiment as seen from outside in the radial direction.
Figure 41:
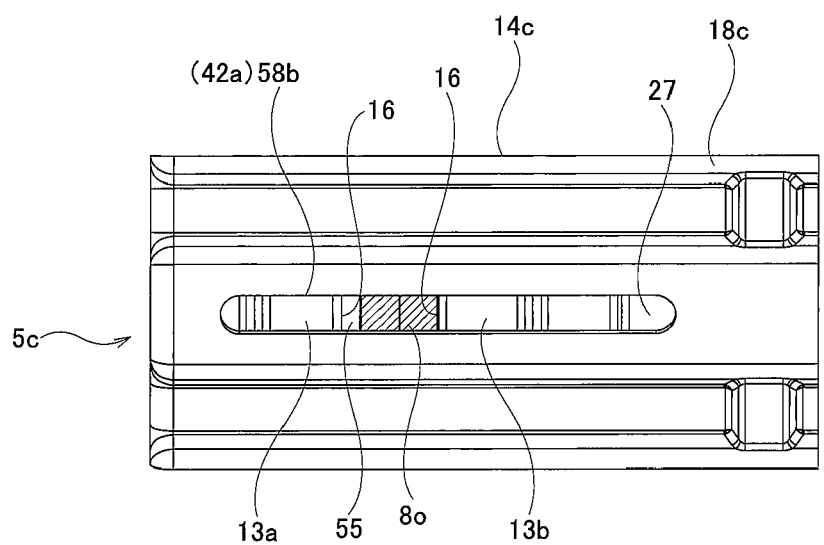
FIG. 41 is an enlarged view of part Z in FIG. 40.
Figure 42:
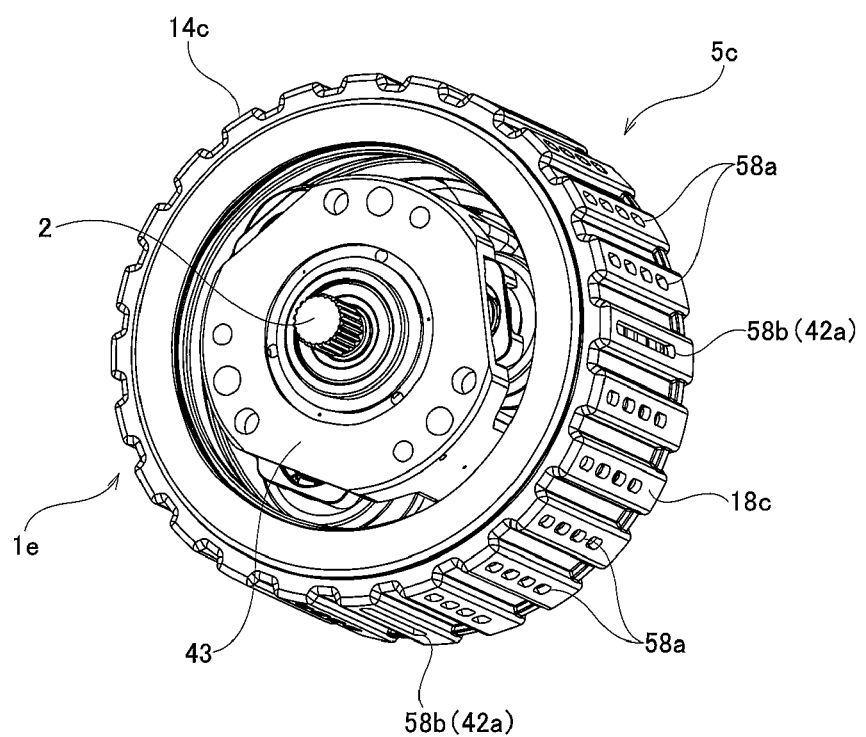
FIG. 42 is a perspective view illustrating the frictional roller reducer of the first example of the sixth embodiment.

The elastic member 8o is arranged between the tip-end surfaces of the pair of roller elements 13a, 13b, that is, as illustrated in FIG. 39, between the flat surface portions 16 facing each other. In this example, the elastic member 8o is configured by combining the pair of disc springs 36 in a substantially V-shaped cross section so that the outer diameter side of the pair of disc springs 36 opens.

In this example, the elastic member 8o is not elastically compressed in the initial state before the loading cam device 7 exerts the pressing force based on the increase in the amount of landing of the rolling bodies 28 from the bottom of the concave portions on the drive-side cam surface 29 and the bottom of the concave portions on the driven-side cam surface 32. Specifically, as illustrated in FIG. 39, a gap 55 is provided between the end portion on the one side in the axial direction of the elastic member 8o and the flat surface portion 16 of the roller element 13a on the one side in the axial direction, and the end portion on the other side in the axial direction of the elastic member 8o is in contact with the flat surface portion 16 of the roller element 13b on the other side in the axial direction.

It is also possible to bring the end portion on the one side in the axial direction of the elastic member 8o into contact with the flat surface portion 16 of the roller element 13a on the one side in the axial direction, and to provide a gap between the end portion on the other side in the axial direction of the elastic member 8o and the flat surface portion 16 of the roller element 13b on the other side in the axial direction. Alternatively, a gap can be respectively provided between the end portions on both sides in the axial direction of the elastic member 8o and the flat surface portions 16 of the roller elements 13a, 13b. In any case, by providing a gap 55 between the elastic member 8o and the roller elements 13a, 13b, a force from the elastic member 8o to the pair of roller elements 13a, 13b in directions going away from each other is made not to act in the initial state.

Further, in this example, the connecting cylinder 14c has opening sections 42a in which the tip-end surfaces (flat surface portions 16) of the pair of roller elements 13a, 13b facing each other can be visually seen. That is, as illustrated in FIG. 39 to FIG. 42, the cylindrical portion 18c of the connecting cylinder 14c is formed by arranging concave portions 56 and convex portions 57 extending in the axial direction alternately in the circumferential direction so that a plurality of oil discharge holes 58a, 58b are provided in each of the convex portions 57 so as to penetrate the cylindrical portion 18c in the radial direction.

Each of the oil discharge holes 58a, 58b has an oval opening shape extending in the axial direction. The length of the oil discharge holes 58b in the axial direction is longer than the length of the oil discharge holes 58a in the axial direction. Moreover, the shape and size of the plurality of oil discharge holes 58a are equal among all the oil discharge holes 58a.

The oil discharge holes 58a, 58b are holes for discharging lubricating oil from the inside of the connecting cylinder 14c in order to circulate the lubricating oil such as traction oil supplied to portions where the parts such as the traction portions of the frictional roller reducer 1 come into contact with each other. The lubricating oil discharged from the oil discharge holes 58a, 58b is temporarily stored in an oil pan (not shown) and then supplied to the inside of the connecting cylinder 14c again.

The oil discharge holes 58b are provided at a plurality of locations uniformly spaced in the circumferential direction (four to five locations in this example) of the cylindrical portion 18c. The length of the oil discharge holes 58b is longer than the distance L between the flat surface portions 16 of the pair of roller elements 13a, 13b in the initial state.

In this example, the oil discharge holes 58b form the opening sections 42a through which the tip-end surfaces (flat surface portions 16) of the pair of roller elements 13a, 13b facing each other can be visually seen. That is, the opening sections 42a (oil discharge holes 58b) have a size (length in the axial direction and width in the circumferential direction) that allows to confirm the contact state between the elastic member 8o and the roller elements 13a, 13b. In this example, the opening sections 42a (oil discharge holes 58b) have length in the axial direction that is longer than the distance L between the flat surface portions 16 of the pair of roller elements 13a, 13b. The opening sections 42a have a size that includes the space between the pair of roller elements 13a, 13b. In other words, the tip-end surface (flat surface portion 16) of the roller element 13a on the one side in the axial direction is located on the other side in the axial direction with respect to an end portion on the one side in the axial direction of each of the opening sections 42a, and the tip-end surface (flat surface portion 16) of the roller element 13b on the other side in the axial direction is located on the one side in the axial direction with respect to an end portion on the other side in the axial direction of each of the opening sections 42a. In this example, the end portions on the other side in the axial direction of the opening sections 42a are located radially outside the intermediate portion in the axial direction of the cam disk 27. That is, a portion on the one side in the axial direction of the cam disk 27 can be visually seen through the opening sections 42a.

In this embodiment, the "contact state" includes not only a state in which the elastic member 8o and the roller elements 13a, 13b are in contact with each other, but also a state in which the elastic member 8o is arranged with a gap 55 with respect to at least one of the pair of roller elements 13a, 13b, in other words, a state in which at least one of the roller elements and the elastic member 8o face each other through a gap 55. Moreover, to be able to visually see the tip-end surfaces (flat surface portions 16) of the pair of roller elements 13a, 13b facing each other does not mean that the entire tip-end surfaces of the roller elements 13a, 13b can be visually seen, but it means that portions of the tip-end surfaces of the roller elements 13a, 13b that face the opening sections 42a, in other words, the range located inside the opening sections 42a can be visually seen.

The oil discharge holes 58a are provided at a plurality of locations (four locations in this example) uniformly spaced in the axial direction of each of the convex portions 57 of the cylindrical portion 18c other than the convex portions 57 where the oil discharge holes 58b are provided.

In the frictional roller reducer 1e of this example, the connecting cylinder 14c that supports the pair of roller elements 13a, 13b so as to be able to relatively displace in the axial direction and not to be able to relatively rotate has opening sections 42a (oil discharge holes 58b) through which the tip-end surfaces (flat surface portions 16) of the pair of roller elements 13a, 13b facing each other can be visually seen. As a result, even after arranging the sun roller 4, the pair of roller elements 13a, 13b, and the plurality of intermediate rollers 6 on the radial inner side of the connecting cylinder 14c, the tip-end surfaces of the pair of roller elements 13a, 13b and the elastic member 8o arranged between the tip-end surfaces can be visually confirmed.

Therefore, after assembling the frictional roller reducer 1e, it is possible to insert a measuring instrument such as a caliper between the tip-end surfaces of the pair of roller elements 13a, 13b facing each other from the opening sections 42a so as to measure the distance in the axial direction between the tip-end surfaces and to confirm the position of the elastic member 8o. As a result, the distance in the axial direction between the tip-end surfaces of the pair of roller elements 13a, 13b facing each other and the size of the gap 55 can be accurately regulated, and in the initial state, the elastic member 8o can be appropriately arranged between the tip-end surfaces of the pair of roller elements 13a, 13b facing each other.

Moreover, the opening sections 42a have a size that allows to confirm the contact state between the elastic member 8o and the roller elements 13a, 13b. Therefore, in this example, after assembling the frictional roller reducer 1e, it is possible to confirm the contact state between the elastic member 8 and the roller elements 13a, 13b through the opening sections 42a, as well as to confirm whether or not the elastic member 8o has been assembled or properly assembled.

In this example, the opening sections 42a for enabling the tip-end surfaces of the pair of roller elements 13a, 13b facing each other to be visually seen are configured by the oil discharge holes 58b. Therefore, it is not necessary to provide opening sections in the cylindrical portion 18c of the connecting cylinder 14c only to make the tip-end surfaces of the pair of roller elements 13a, 13b facing each other to be visually seen.

However, in the case that the oil discharge holes for discharging the lubricating oil inside the connecting cylinder are not provided in the cylindrical portion of the connecting cylinder, it is possible to provide an opening section in the cylindrical portion for the tip-end surfaces of the pair of roller elements facing each other to be visually seen.

In this example, since the opening sections 42a (oil discharge holes 58b) are provided at a plurality of locations uniformly spaced in the circumferential direction of the cylindrical portion 18c, after arranging the sun roller 4, the pair of roller elements 13a, 13b, and the plurality of intermediate rollers 6 on the radial inner side of the connecting cylinder 14c, the distance between the tip-end surfaces of the pair of roller elements 13a, 13b can be measured at a plurality of locations in the circumferential direction. Therefore, it is possible to confirm the parallelism between the tip-end surfaces of the pair of roller elements 13a, 13b.

In this example, since the gap 55 is provided between the elastic member 8o and the roller element 13a on the one side in the axial direction, the force to the pair of roller elements 13a, 13b in directions going away from each other based on the elastic restoration of the elastic member 8o does not act in the region where the torque transmitted by the frictional roller reducer 1e is small. Therefore, in the region where the torque transmitted by the frictional roller reducer 1e is small and the surface pressure of the traction portions is small, it is possible to prevent the traction coefficient from becoming unnecessarily small, and it is possible to prevent the occurrence of gross slipping more reliably.

In this example, although a structure in which the gap 55 is provided between the elastic member 8o and the roller element 13a on the one side in the axial direction is explained, the frictional roller reducer according to the present embodiment can also be applied to a structure in which the elastic member is held between the tip-end surfaces of the pair of roller elements in a state where the elastic member is not compressed or is slightly compressed in the initial state. Even in this case, the distance between the tip-end surfaces of the pair of roller elements and the contact state between the tip-end surfaces of the pair of roller elements and the elastic member can be accurately regulated in the initial state, and the force applied to the pair of roller elements by the elastic member can be made to a desired magnitude when the torque transmitted by the frictional roller reducer becomes large.

Second to Fourth Examples of Sixth Embodiment

Figure 45:
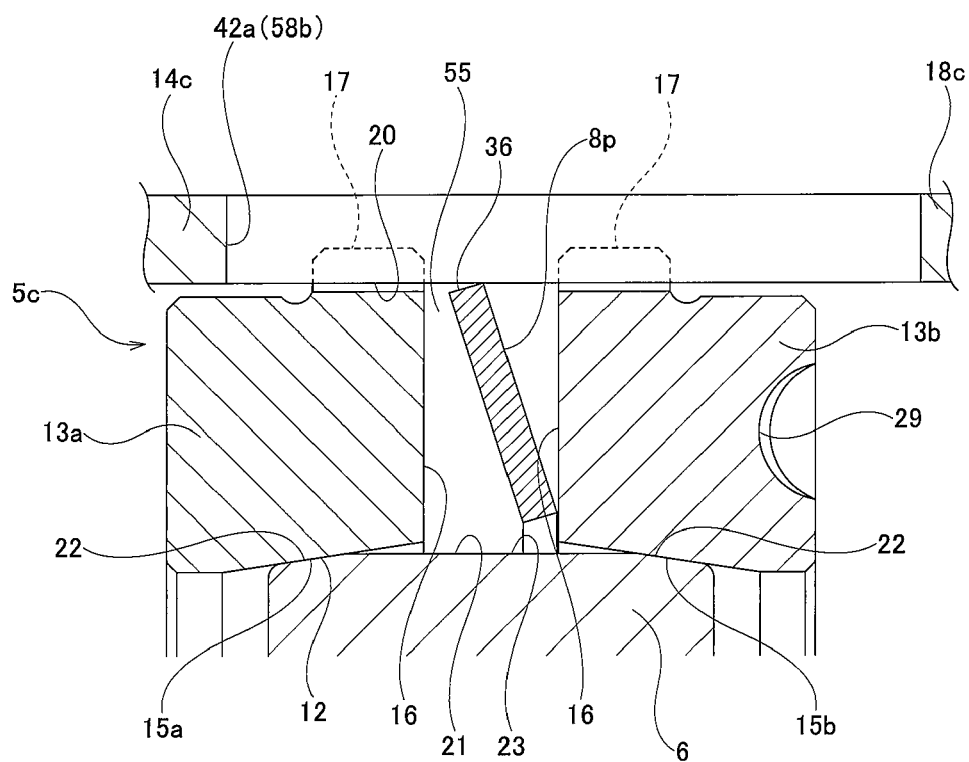
FIG. 45 is an enlarged cross-sectional view illustrating a second example of the sixth embodiment.
Figure 46:
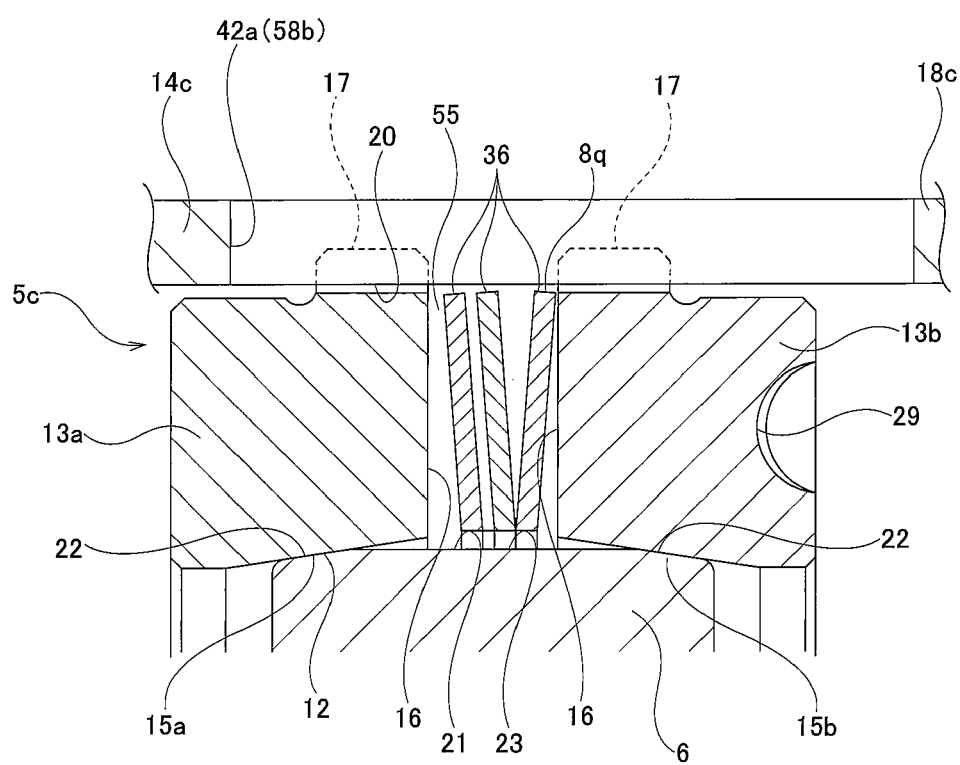
FIG. 46 is an enlarged cross-sectional view illustrating a third example of the sixth embodiment.
Figure 47:
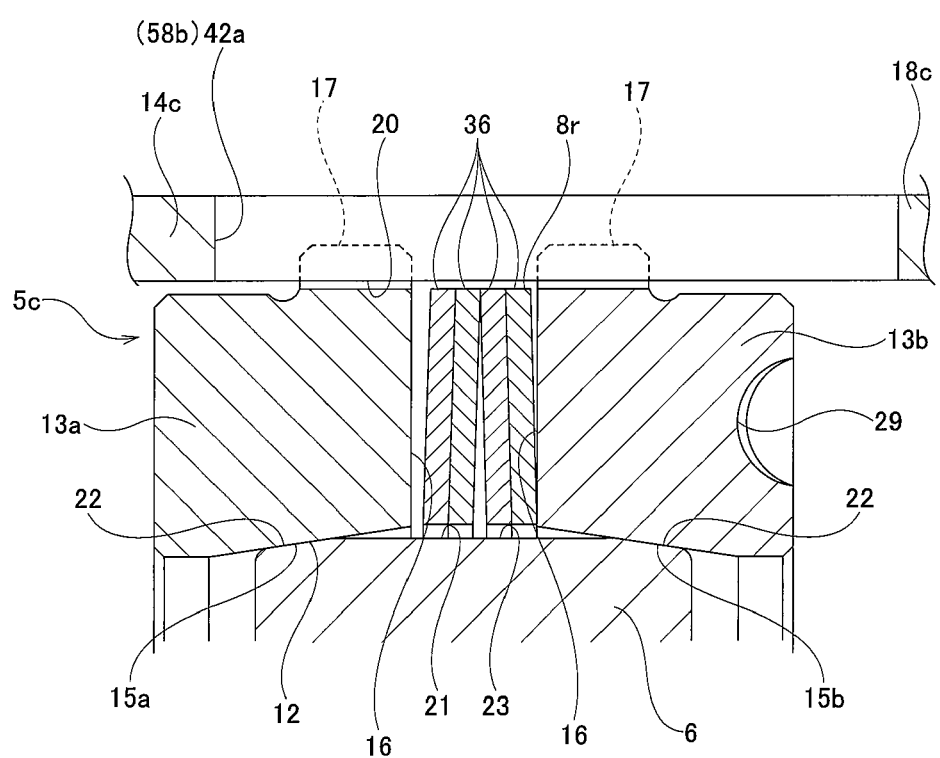
FIG. 47 is an enlarged cross-sectional view illustrating a fourth example of the sixth embodiment.

When the elastic member is configured by disc springs in this embodiment, for example, as illustrated in FIG. 45 to FIG. 47, the number and/or combination method of the disc spring can be appropriately determined according to the magnitude of the elasticity required for the elastic member. However, when the elastic member is configured by disc springs, it is preferable to keep the number of disc springs as small as possible from the viewpoint of suppressing the influence of the hysteresis of the spring characteristics to be small.

In a second example of the sixth embodiment illustrated in FIG. the elastic member 8p is configured by one disc spring 36. Further, a gap is provided between an end portion on one side in the axial direction of the elastic member 8p and the tip-end surface (flat surface portion 16) of the roller element 13a on the one side in the axial direction, and an end portion on the other side in the axial direction of the elastic member 8p is brought into contact with the tip-end surface (flat surface portion 16) of the roller element 13b on the other side in the axial direction.

In a third example of the sixth embodiment illustrated in FIG. 46, the elastic member 8q is configured by superposing two-disc springs 36 of the three disc spring 36 in the same direction and superposing the remaining one disc spring 36 in the opposite direction. Moreover, a gap 55 is provided between an end portion on one side in the axial direction of the elastic member 8q and the tip-end surface (flat surface portion 16) of the roller element 13a on the one side in the axial direction, and an end portion on the other side in the axial direction of the elastic member 8q is brought into contact with the tip-end surface (flat surface portion 16) of the roller element 13b on the other side in the axial direction.

In a fourth example of the sixth embodiment illustrated in FIG. 47, the elastic member 8r is configured by combining each two-disc springs 36 of the four disc spring 36 in the same direction and superposing these in opposite directions, that is, by combining two pieces in parallel and in a two-stage series. Moreover, a gap 55 is provided between an end portion on one side in the axial direction of the elastic member 8r and the tip-end surface (flat surface portion 16) of the roller element 13a on the one side in the axial direction, and an end portion on the other side in the axial direction of the elastic member 8r is brought into contact with the tip-end surface (flat surface portion 16) of the roller element 13b on the other side in the axial direction.

Also in the second to fourth example of the sixth embodiment, the elastic member can be held between the tip-end surfaces of the pair of roller elements in a state where the elastic member is not compressed or is slightly compressed in the initial state. Even in this case, the distance between the tip-end surfaces of the pair of roller elements and the contact state between the tip-end surfaces of the pair of roller elements and the elastic member can be accurately regulated in the initial state, and the force applied to the pair of roller elements by the elastic member can be made to a desired magnitude when the torque transmitted by the frictional roller reducer becomes large.

Fifth Example to Eighth Example of Sixth Embodiment

FIG. 48 to FIG. 51 illustrate examples in which the elastic member is configured by a member other than disc springs.

Figure 48:
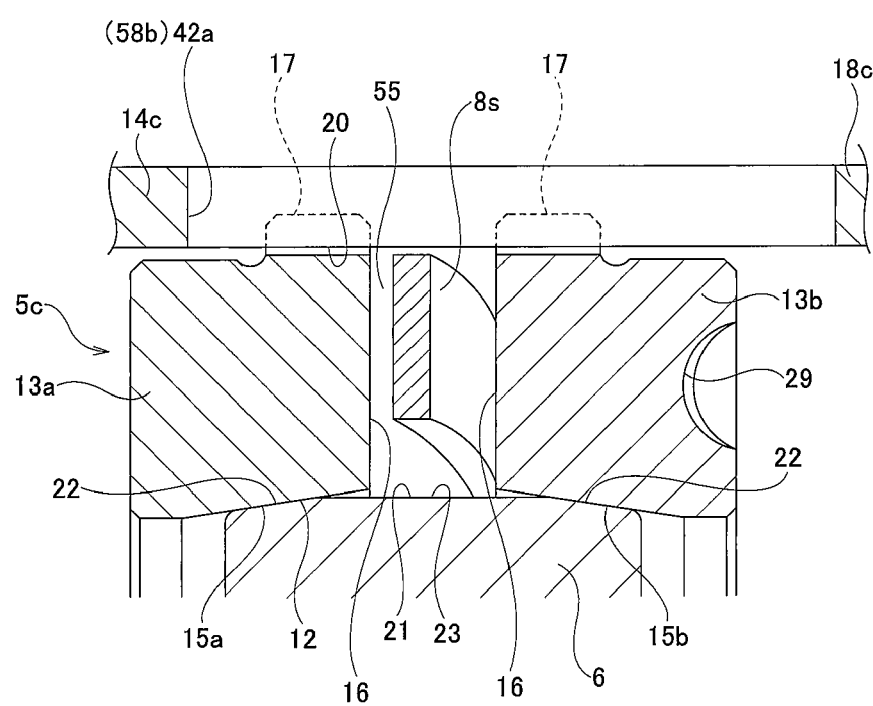
FIG. 48 is an enlarged cross-sectional view illustrating a fifth example of the sixth embodiment.

In a fifth example of the sixth embodiment illustrated in FIG. 48, the elastic member 8s is configured by a wave washer. Moreover, a gap 55 is provided between an end portion on one side in the axial direction of the elastic member 8s and the tip-end surface (flat surface portion 16) of the roller element 13a on the one side in the axial direction, and an end portion on the other side in the axial direction of the elastic member 8s is brought into contact with the tip-end surface (flat surface portion 16) of the roller element 13b on the other side in the axial direction.

Figure 49:
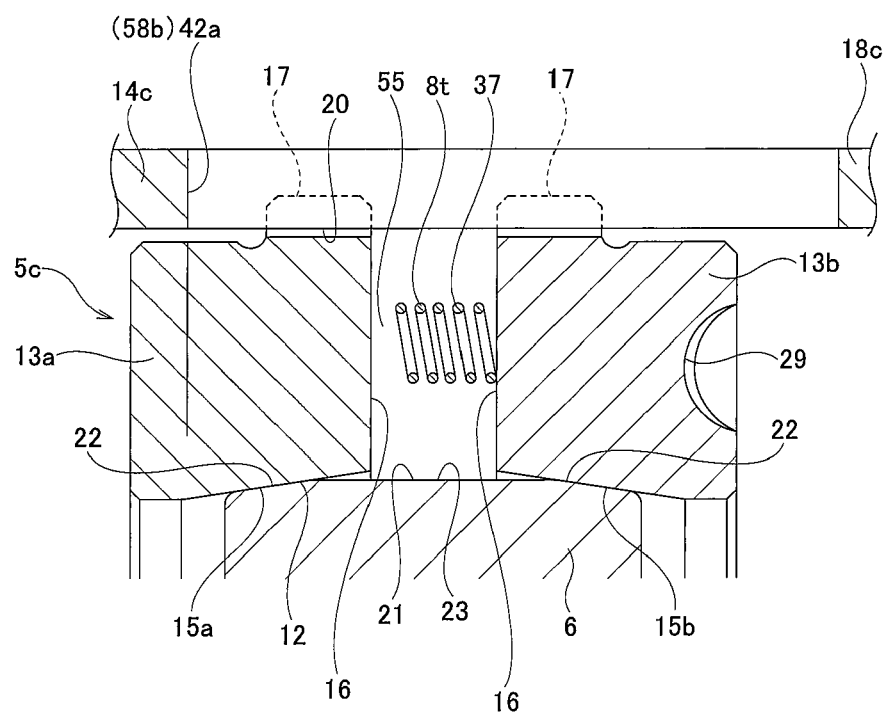
FIG. 49 is an enlarged cross-sectional view illustrating a sixth example of the sixth embodiment.

In a sixth example of the sixth embodiment illustrated in FIG. 49, the elastic member 8t is configured by a torsion coil spring 37. One torsion coil spring 37 can be arranged between the tip-end surfaces of the pair of roller elements 13a, 13b, alternately, a plurality of torsion coil springs can be arranged at a plurality of locations uniformly spaced in the circumferential direction between the tip-end surfaces of the pair of roller elements 13a, 13b. Moreover, a gap 55 is provided between an end portion on one side in the axial direction of the elastic member 8t and the tip-end surface (flat surface portion 16) of the roller element 13a on the one side in the axial direction, and an end portion on the other side in the axial direction of the elastic member 8t is brought into contact with the tip-end surface (flat surface portion 16) of the roller element 13b on the other side in the axial direction.

Figure 50:
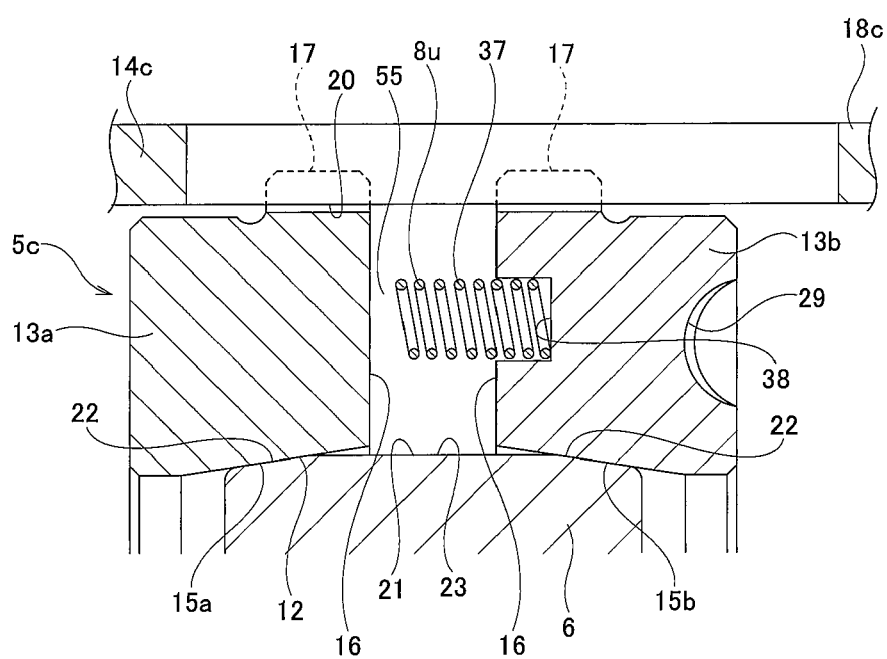
FIG. 50 is an enlarged cross-sectional view illustrating a seventh example of the sixth embodiment.

In a seventh example of the sixth embodiment illustrated in FIG. 50, the elastic member 8u includes a plurality of torsion coil springs 37. In this example, support concave portions 38 recessed in the axial direction are provided at a plurality of locations uniformly spaced in the circumferential direction of the tip-end surface of the roller element 13b on the other side in the axial direction of the pair of roller elements 13a, 13b of the ring roller 5a. An end portion on the other side in the axial direction of each of the torsion coil springs 37 is inserted inside the support concave portion 38 respectively. Moreover, a gap 55 is provided between an end portion on the one side in the axial direction of the elastic member 8u and the tip-end surface (flat surface portion 16) of the roller element 13a on the one side in the axial direction.

Figure 51:
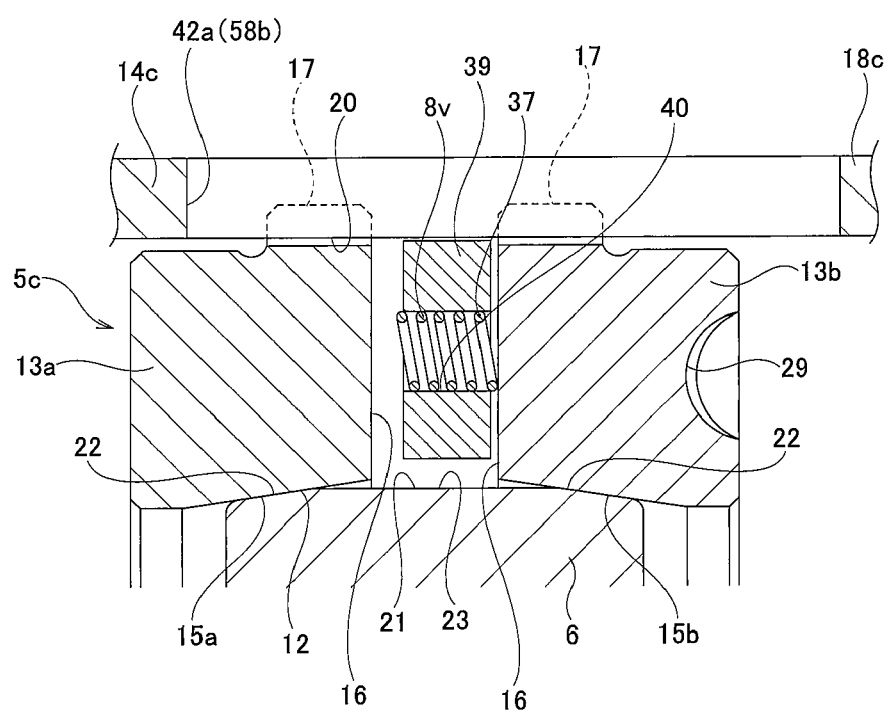
FIG. 51 is an enlarged cross-sectional view illustrating an eighth example of the sixth embodiment.

In an eighth example of the sixth embodiment illustrated in FIG. 51, the elastic member 8v includes a plurality of torsion coil springs 37. The frictional roller reducer of this example has a retainer 39 for holding the plurality of torsion coil springs 37. The retainer 39 has a hollow circular plate shape, and has retaining holes 40 penetrating in the axial direction at a plurality of locations uniformly spaced in the circumferential direction. The intermediate portion in the axial direction of each of the torsion coil springs 37 is inserted inside each of the retaining hole. Moreover, a gap 55 is provided between an end portion on one side in the axial direction of the elastic member 8v and the tip-end surface (flat surface portion 16) of the roller element 13a on the one side in the axial direction, and an end portion on the other side in the axial direction of the elastic member 8v is brought into contact with the tip-end surface (flat surface portion 16) of the roller element 13b on the other side in the axial direction.

Also in the fifth example to the eighth example of the sixth embodiment, the elastic member can be held between the tip-end surfaces of the pair of roller elements in a state where the elastic member is not compressed or is slightly compressed in the initial state. Even in this case, the distance between the tip-end surfaces of the pair of roller elements and the contact state between the tip-end surfaces of the pair of roller elements and the elastic member can be accurately regulated in the initial state, and the force applied to the pair of roller elements by the elastic member can be made to a desired magnitude when the torque transmitted by the frictional roller reducer becomes large.

Ninth Example of Sixth Embodiment

Figure 52:
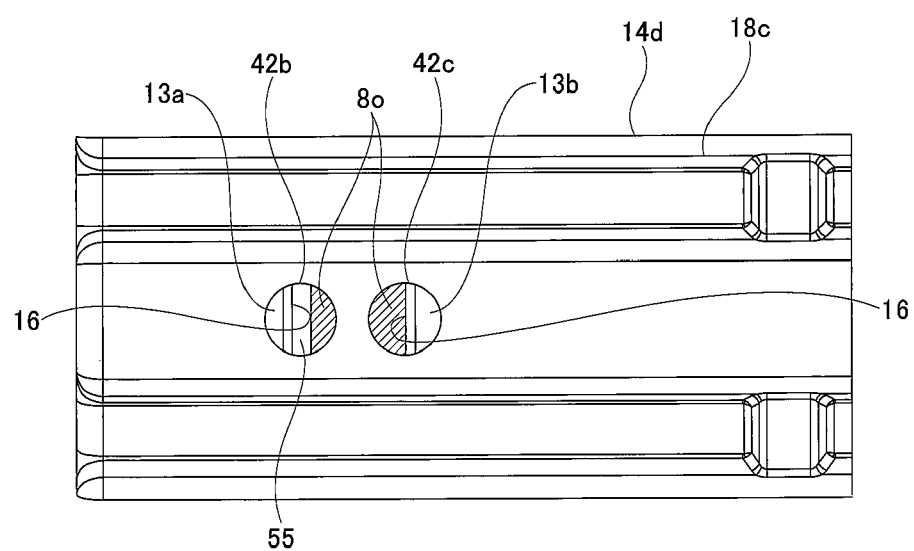
FIG. 52 is a view illustrating a ninth example of the sixth embodiment, corresponding to FIG. 41.

FIG. 52 illustrates a ninth example of the sixth embodiment. In order for the tip-end surfaces (flat surface portions 16) of the pair of roller elements 13a, 13b to be visually seen in the assembled state, the frictional roller reducer of this example has opening sections 42b, 42c provided in the cylindrical portion 19d of the connecting cylinder 14d that are different in shape and number from the first example of the sixth embodiment.

In this example, the connecting cylinder 14d has a pair of opening sections 42b, 42c through which the tip-end surfaces (flat surface portions 16) of the pair of roller elements 13a, 13b facing each other can be visually seen respectively. The pair of opening sections 42b, 42c are provided at two locations in the axial direction at a plurality of locations in the circumferential direction of the cylindrical portion 19d of the connecting cylinder 14d. The opening sections 42b, 42c also function as oil discharge holes.

The opening sections 42b are arranged at positions where an end portion on one side in the axial direction including the tip-end surface (flat surface portion 16) of the roller element 13a on the one side in the axial direction can be visually seen, and the opening section 42c are arranged at positions where an end portion on the other side in the axial direction including the tip-end surface (flat surface portion 16) of the roller element 13b on the other side in the axial direction. Moreover, end portions on both sides in the axial direction of the elastic member 8o can be visually seen from the opening sections 42b, 42c. Therefore, the opening sections 42b, 42c have a size that allows to confirm the contact state between the elastic member 8o and the roller elements 13a, 13b.

In the frictional roller reducer of this example, the connecting cylinder 14d that supports the pair of roller elements 13a, 13b so as to be able to relatively displace in the axial direction and not to be able to relatively rotate has opening sections 42b, 42c through which the tip-end surfaces (flat surface portions 16) of the pair of roller elements 13a, 13b facing each other can be visually seen. As a result, even after arranging the sun roller 4, the pair of roller elements 13a, 13b, and the plurality of intermediate rollers 6 on the radial inner side of the connecting cylinder 14c, the tip-end surfaces of the pair of roller elements 13a, 13b and the elastic member 8o arranged between the tip-end surfaces can be visually confirmed.

Therefore, with the frictional roller reducer of this example, as in the first example of the sixth embodiment, after assembling the frictional roller reducer, it is possible to insert a measuring instrument such as a caliper between the tip-end surfaces of the pair of roller elements 13a, 13b facing each other from the opening sections 42a so as to measure the distance in the axial direction between the tip-end surfaces and to confirm the position of the elastic member 8v. As a result, the distance in the axial direction between the tip-end surfaces of the pair of roller elements 13a, 13b facing each other and the size of the gap 55 can be accurately regulated, and in the initial state, the elastic member 8v can be appropriately arranged between the tip-end surfaces of the pair of roller elements 13a, 13b facing each other.

Moreover, the opening sections 42b, 42c have a size that allows to confirm the contact state between the elastic member 8v and the roller elements 13a, 13b. Therefore, in this example, after assembling the frictional roller reducer, it is possible to confirm the contact state between the elastic member 8v and the roller elements 13a, 13b through the opening sections 42b, 42c, as well as to confirm whether or not the elastic member 8v has been assembled or properly assembled.

In this example, the opening sections 42b, 42c for enabling the tip-end surfaces of the pair of roller elements 13a, 13b facing each other to be visually seen also function as oil discharge holes. Therefore, it is not necessary to provide opening sections in the cylindrical portion 18c of the connecting cylinder 14c only to make the tip-end surfaces of the pair of roller elements 13a, 13b facing each other to be visually seen.

In this example, since the opening sections 42b, 42c are provided at a plurality of locations uniformly spaced in the circumferential direction of the cylindrical portion 18d, after arranging the sun roller 4, the pair of roller elements 13a, 13b, and the plurality of intermediate rollers 6 on the radial inner side of the connecting cylinder 14d, the distance between the tip-end surfaces of the pair of roller elements 13a, 13b can be measured at a plurality of locations in the circumferential direction. Therefore, it is possible to confirm the parallelism between the tip-end surfaces of the pair of roller elements 13a, 13b.

In this example, a structure in which the gap 55 is provided between the elastic member 8v and the roller element 13a on the one side in the axial direction has been described. However, the frictional roller reducer according to the present embodiment can be applied to a structure in which an elastic member is held between the tip-end surfaces of the pair of roller elements in a state where the elastic member is not compressed or is slightly compressed in the initial state. Even in this case, the distance between the tip-end surfaces of the pair of roller elements and the contact state between the tip-end surfaces of the pair of roller elements and the elastic member can be accurately regulated in the initial state, and the force applied to the pair of roller elements by the elastic member can be made to a desired magnitude when the torque transmitted by the frictional roller reducer becomes large. The configuration and operational effects of the other parts are the same as those of the first example of the first embodiment and the first example of the sixth embodiment.

In this embodiment, an example in which the loading cam device 7 is used as the pressing device has been described. However, in case of implementing the present invention, a pump-type pressing device using fluid pressure such as oil or air, or a pressing device provided with an actuator such as an electric motor can also be used as a pressing device that presses the pair of roller elements in directions toward each other.

First Example of Seventh Embodiment

Figure 53:
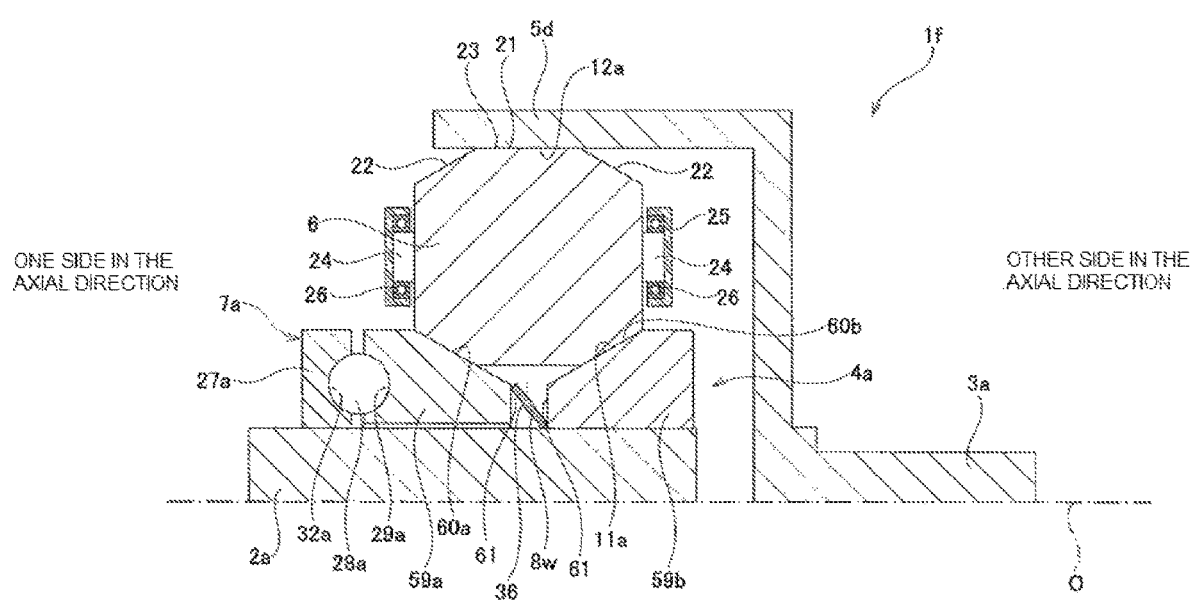
FIG. 53 is a schematic cross-sectional view of a frictional roller reducer of a first example of a seventh embodiment of the present invention.

FIG. 53 illustrates a first example of a seventh embodiment of the present invention. In the first example of the first embodiment to the ninth example of the sixth embodiment, the ring roller is provided with a pair of roller elements, and an elastic member is held between the pair of roller elements. However, in the frictional roller reducer if of this example, the sun roller 4a is provided with a pair of roller elements 59a, 59b, and an elastic member 8w is held between the tip-end surfaces of the pair of roller elements 59a, 59b. The frictional roller reducer 1h of this example includes an input shaft 2a, an output shaft 3a, a sun roller 4a, a ring roller 5d, a plurality of intermediate rollers 6, a loading cam device 7a, and an elastic member 8w.

The sun roller 4a includes a pair of roller elements 59a, 59b. Each of the pair of roller elements 59a, 59b has an inclined surface portion 60a, 60b on the outer circumferential surface inclined in a direction going closer to the intermediate rollers 6 in the radial direction, in other words, in a direction in which the outer diameter increases, as going away from each other in the axial direction. That is, in this example, the inner-diameter side rolling contact surface 11a is configured by the inclined surface portions 60a, 60b of the pair of roller elements 59a, 59b. In this example, the inclined surface portions 60b are configured by conical convex surfaces having a linear generating line.

Moreover, the pair of roller elements 59a, 59b have flat surface portions 61 orthogonal to their respective center axis O on the tip-end surfaces facing each other. In this example, the entire tip-end surfaces of the pair of roller elements 59a, 59b are configured by flat surface portions 61.

The sun roller 4a of this example is configured by combining a pair of roller elements 59a, 59b so as to be able to relatively displace in the axial direction through an input shaft 2a and a loading cam device 7a described later. Of the pair of roller elements 59a, 59b, the roller element 59a on one side in the axial direction (left side in FIG. 53) is externally fitted onto the intermediate portion in the axial direction of the input shaft 2a so as to be able to relatively displace in the axial direction and relatively rotate with respect to the input shaft 2a. On the other hand, the roller element 59b on the other side in the axial direction is externally fitted and fixed to the tip end portion of the input shaft 2a (an end portion on the other side in the axial direction; an end portion on the right side in FIG. 53) so as not to be able to relatively displace in the axial direction and relatively rotate with respect to the input shaft 2a.

The ring roller 5d has an outer-diameter side rolling contact surface 12a on the inner circumferential surface, and is arranged coaxially with the sun roller 4a around the sun roller 4a. In this example, the outer-diameter side rolling contact surface 12a is configured by a cylindrical surface whose inner diameter does not change in the axial direction. Moreover, the ring roller 5d is connected to the output shaft 3a so as to rotate integrally with the output shaft 3a.

Each of the plurality of intermediate rollers 6 has a rolling surface 21 on the outer circumferential surface, which comes in rolling contact with the inner-diameter side rolling contact surface 11a and the outer-diameter side rolling contact surface 12a. The rolling surface 21 has a pair of intermediate roller-side inclined surface portions 22 inclined in directions in which the outer diameter becomes smaller as going away from each other in the axial direction, and has a connection surface portion 23 arranged in the intermediate portions in the axial direction and connects the pair of intermediate roller-side inclined surface portions 22 to each other. In this example, each of the inclined surface portion 60a, 60b of the inner-diameter side rolling contact surface 11a comes in rolling contact with each of the intermediate roller-side inclined surface portions 22 of the rolling surface 21, and the outer-diameter side rolling contact surface 12a comes in rolling contact with a connection surface portion 23 of the rolling surface 21.

Each of the intermediate rollers 6 is supported by a fixed portion such as a housing that does not rotate even in use, so as to be able to rotate about the rotation shaft 24 provided in the center and to be able to displace in the radial direction. That is, although each of the intermediate rollers 6 can rotate, however, it is prevented from revolving around the center axis O of the input shaft 2a.

The loading cam device 7a presses the pair of roller elements 59a, 59b of the sun roller 4a in directions going closer to each other. The loading cam device 7a includes a roller element 59a on the one side in the axial direction, a cam disk 27a, and a plurality of rolling bodies 28a.

The roller element 59a on the one side in the axial direction has a driven-side cam surface 32a on a side surface on the one side in the axial direction, in which the same number of concave portions and convex portions are alternately arranged in the circumferential direction.

The cam disk 27a has a drive-side cam surface 29a on a side surface on the other side in the axial direction, in which the same number of concave portions and convex portions are alternately arranged in the circumferential direction, and is externally fitted and fixed to a portion on the one side in the axial direction of the input shaft 2a so as not to be able to relatively displace in the axial direction and relatively rotate with respect to the input shaft 2a.

Each of the plurality of rolling bodies 28a is arranged between the driven-side cam surface 32a of the roller element 59a on the one side in the axial direction and the drive-side cam surface 29a of the cam disk 27a so as to be able to roll freely.

The elastic member 8w is arranged between the flat surface portions 61 of the pair of roller elements 59a, 59b. In this example, the elastic member 8w is configured by one disc spring 36. Moreover, in the initial state before the loading cam device 7a exerts the pressing force, the elastic member 8w is held between the flat surface portions 61 of the pair of roller elements 59a, 59b in an elastically compressed state. Therefore, the elastic member 8w applies a force to the pair of roller elements 59a, 59b in directions going away from each other even in the initial state.

When the frictional roller reducer 1f of this example is in operation, the sun roller 4a is rotationally driven by rotationally driving the input shaft 2a by the drive source. When the sun roller 4a rotates, the intermediate rollers 6 rotate based on the rolling contact between the inner-diameter side rolling contact surface 11a of the sun roller 4a (the pair of inclined surface portion 60a, 60b) and the rolling surfaces 21 of the intermediate rollers 6 (the pair of intermediate roller-side inclined surface portions 22). When the intermediate rollers 6 rotate, the ring roller 5a rotates about the center axis O of the input shaft 2a based on the rolling contact with the rolling surface 21 of the intermediate rollers 6 (the connection surface portion 23) and the outer-diameter side rolling contact surface 12a of the ring roller 5a, and the rotation of the ring roller 5d is taken out from the output shaft 3a.

In the frictional roller reducer 1f of this example, when the cam disk 27a rotates with the rotation of the input shaft 2a, the amount of landing of the rolling bodies 28a of the loading cam device 7a from the bottom of the concave portions of the drive-side cam surface 29a and the amount of landing from the bottom of the concave portions of the driven-side cam surface 32a increase. As a result, the dimension in the axial direction of the loading cam device 7a is increased, and the roller element 59a on the one side in the axial direction is rotationally driven while the pair of roller elements 59a, 59b are pressed in directions going closer to each other. That is, at the same time that the roller element 59a on the one side in the axial direction is pressed to the other side in the axial direction, the cam disk 27a is pressed to the one side in the axial direction, so that the roller element 59b on the other side in the axial direction is pulled to the one side in the axial direction through the input shaft 2a.

When the pair of roller elements 59a, 59b are pressed in directions going closer to each other, the outer diameter of portions that come in rolling contact with the pair of intermediate roller-side inclined surface portions 22 of the rolling surface 21 of the inclined surface portion 60a, 60b of the inner-diameter side rolling contact surface 11a becomes large, and the surface pressure of the traction portions (rolling contact portions) between the inner-diameter side rolling contact surface 11a and the rolling surface 21 increases. Furthermore, when the intermediate rollers 6 are pressed outward in the radial direction due to the increase in the surface pressure, the surface pressure of the traction portion between the connection surface portion 23 of the rolling surface 21 and the outer-diameter side rolling contact surface 12a also increases. As a result, the torque input to the sun roller 4a from the input shaft 2a is transmitted to the ring roller 5d through the intermediate rollers 6 without causing excessive slipping in each of the traction portions.

In the frictional roller reducer 1f of this example, the elastic member 8w is held between the flat surface portions 61 of the pair of roller elements 59a, 59b, and the elastic member 8w applies a force to the pair of roller elements 59a, 59b in directions going away from each other. Therefore, the amount of increase in the surface pressure of each of the traction portions between the rolling surface 21 and the inner-diameter side rolling contact surface 11a and the outer-diameter side rolling contact surface 12a based on the loading cam device 7a pressing the pair of roller elements 59a, 59b in directions going closer to each other is reduced by the amount of the force applied to the pair of roller elements 59a, 59b from the elastic member 8w in directions going away from each other. In other words, the magnitude of the normal force acting on each of the traction portions is reduced by the force applied to the pair of roller elements 59a, 59b from the elastic member 8w, and the operating traction coefficient (tangential force/normal force according to the torque transmitted by the sun roller 4a, the ring roller 5d, and the intermediate rollers 6) representing the actual operating state becomes large.

Also in the frictional roller reducer 1f of this example as described above, similar to the frictional roller reducer 1 according to the first example of the first embodiment, the operating traction coefficient can be adjusted to an appropriate magnitude regardless of the magnitude of the torque to be transmitted, and the transmission efficiency of the frictional roller reducer 1f can be well secured. Moreover, when high torque is transmitted, the operating traction coefficient can be increased, and the accelerating increase in the pressing force due to the occurrence of skew of the intermediate rollers 6 can be effectively prevented.

In this example, the ring roller 5d is connected to the output shaft 3a so as to rotate integrally with the output shaft 3a, and the plurality of intermediate rollers 6 are supported so as not to be able to revolve about the center axis O of the input shaft 2a. However, in a case of implementing the present invention, when the sun roller is configured by a pair of roller elements, it is possible to support the ring roller so as not to be able to rotate and to be able to take out the revolution movement of the intermediate rollers from the output shaft. The configuration and operational effects of the other parts are the same as those of the first example of the first embodiment.

The first example of the first embodiment to the first example of the seventh embodiment as described above may be appropriately combined and implemented as long as no contradiction occurs.

REFERENCE SIGNS LIST 1, 1a, 1b, 1c, 1d, 1e, 1f Frictional roller reducer
2, 2a Input shaft
3, 3a Output shaft
4, 4a Sun roller
5, 5a, 5b, 5c, 5d Ring roller
6, 6z Intermediate rollers
7 Loading cam device
8, 8a, 8b, 8c, 8d, 8e, 8g, 8h, 8i, 8j, 8k, 8l, 8m, 8n, 8o, 8p, 8q, 8r, 8s, 8t, 8u, 8v, 8w, 8z Elastic member
9 Male spline portion
10 Flange portion
11 Inner-diameter side rolling contact surface
12 Outer-diameter side rolling contact surface
13a, 13b Roller elements
14, 14a, 14b, 14c, 14d Connecting cylinder
15b Inclined surface portion
16 Flat surface portion
17 Element-side engaging concave and convex portions
18, 18a, 18b, 18c, 18d Cylindrical portion
19, 19a Side plate portion
20 Cylinder-side engaging concave and convex portion
21, 21a, 21b, 21z Rolling surface
22, 22a Intermediate roller side inclined surface portion
23, 23a Connection surface portion
24 Rotation shaft
25 Holders 26 Radial rolling bearing
27, 27a Cam disk
28, 28a Rolling bodies
29, 29a Drive-side cam surface
30 Cylindrical portion
31 Side plate portion
32, 32a Driven-side cam surface
33 Thrust needle bearing
34 Thrust race
35a Retaining ring
36, 36a, 36b, 36c, 36d Disc spring
37 Torsion coil spring
38 Support concave portion
39 Retainer
40 Retaining hole
41 Gap
42, 42a, 42b, 42c Opening section
43 Support member
44 Oil supply holes
45 Angular contact ball bearing
46, 46a, 46b, 46c, 46d, 46e Oil discharge passage
47, 47a Notch
48 Shim plate
49 Concave grooves
50 Lock washer
51 Notch
52 Concave groove
53 Concave groove
54 Through hole
55 Gap
56 Concave portion
57 Convex portion
58a, 58b Oil discharge hole
59a, 59b Roller element
60b Inclined surface portion
61 Flat surface portion
100 Frictional roller reducer
101 Input shaft
102 Output shaft
103 Sun roller
104 Ring roller
105 Intermediate roller
106 Loading cam device
107 Flange portion
108 Inner-diameter side rolling contact surface
109 Outer-diameter side rolling contact surface
110a, 110b Roller element
111 Connecting cylinder
112a, 112b Inclined surface portion
113 Engaging concave and convex portion
114 Retaining ring
115 Rolling surface
116 Carrier
117 Cam disk
118 Rolling body
119 Drive-side cam surface
120 Cylindrical portion
121 Side plate portion
122 Convex portion
123 Driven-side cam surface
124 Angular contact ball bearing

The invention claimed is:
1. A frictional roller reducer including:
a sun roller;
a ring roller arranged coaxially with the sun roller around the sun roller;
a plurality of intermediate rollers respectively having a rolling surface on an outer circumferential surface thereof, the rolling surfaces of the plurality of intermediate rollers coming in rolling contact with the sun roller and the ring roller;
one roller of the sun roller or the ring roller having a pair of roller elements supported so as to be able to relatively displace in an axial direction, the pair of roller elements including inclined surface portions on a circumferential surface of the one roller coming in rolling contact with the rolling surfaces, the inclined surface portions inclined in directions going toward the intermediate rollers in a radial direction as going away from each other in the axial direction;
a pressing device pressing the pair of roller elements in directions going closer to each other, and
an elastic member arranged between and directly acting on the pair of roller elements, the elastic member urging the pair of roller elements in directions going away from the rolling surface of the intermediate rollers,
wherein the pressing device has one roller element of the pair of roller elements and a cam disk supported so as to be able to relatively rotate with respect to the one roller element and to relatively displace in the axial direction, and is configured by a loading cam device which expands a distance between the one roller element and the cam disk based on a rotation of the one roller element as torque is transmitted between the sun roller and the ring roller, and presses the pair of roller elements in directions going closer to each other, and
a gap is provided between the elastic member and at least one roller element of the pair of roller elements in an initial state before the pressing device exerts pressing force.

2. The frictional roller reducer according to claim 1, wherein
the rolling surface has a pair of intermediate roller side inclined surface portions arranged on both side portions in the axial direction, inclined in directions in which an outer diameter becomes smaller as going away from each other in the axial direction, and coming in rolling contact with the inclined surface portions, and has a connection surface portion arranged in an intermediate portion in the axial direction and having an outer diameter that does not change in the axial direction or a radius of curvature of a generating line thereof is larger than a radius of curvature of a generating line of the intermediate roller side inclined surface portions, and coming in rolling contact with the other roller of the sun roller and the ring roller.

3. The frictional roller reducer according to claim 2, wherein
the intermediate roller side inclined surface portion has an arc-shaped or a linear generating line.

4. The frictional roller reducer according to claim 1, wherein
the ring roller has the pair of roller elements having the inclined surface portions inclined in directions in which an inner diameter thereof becomes smaller as going away from each other in the axial direction, on an inner circumferential surface thereof.

5. The frictional roller reducer according to claim 4, wherein
the elastic member has two-disc springs combined in a substantially V-shaped cross section so that an inner diameter side thereof opens.

6. The frictional roller reducer according to claim 4, wherein
the elastic member has two-disc springs combined in a substantially V-shaped cross section so that an outer diameter side thereof opens.

7. The frictional roller reducer according to claim 4, wherein
the ring roller has a connecting cylinder supporting the pair of roller elements so as to be able to relatively displace in the axial direction and not to be able to relatively rotate.

8. Frictional roller reducer according to claim 7, wherein
the connecting cylinder has opening sections opening to an inner circumferential surface and an outer circumferential surface thereof.

9. The frictional roller reducer according to claim 8, wherein
the opening sections respectively have a size so that end surfaces of the pair of roller elements facing each other can be visually seen from a radial outer side of the connecting cylinder.

10. The frictional roller reducer according to claim 9, wherein
the opening sections have a size so that a contact state between the elastic member and the pair of roller elements can be visually seen from the radial outer side of the connecting cylinder.

11. The frictional roller reducer according to claim 8, wherein
the opening sections form oil discharge holes.

12. The frictional roller reducer according to claim 8, wherein
the opening sections are arranged at a plurality of locations uniformly spaced in a circumferential direction of the connecting cylinder.

13. The frictional roller reducer according to claim 4 including oil discharge passages communicating a radial inner side and a radial outer side of a space existing between the pair of roller elements and including the elastic member.

14. The frictional roller reducer according to claim 13, wherein
the elastic member is configured by one or a plurality of disc springs.

15. The frictional roller reducer according to claim 14, wherein
the elastic member has notches opening to an outer circumferential edge and/or an inner circumferential edge, or through holes penetrating an intermediate portion in the radial direction.

16. The frictional roller reducer according to claim 14 including a shim plate held between at least one roller element of the pair of roller elements and the elastic member, wherein
the shim plate has concave grooves or ridges along the radial direction on a side surface in the axial direction.

17. The frictional roller reducer according to claim 14, wherein
a lock washer is provided between at least one roller element of the pair of roller elements and the elastic member.

18. The frictional roller reducer according to claim 14, wherein
at least one roller element of the pair of roller elements has concave grooves along the radial direction on a tip-end surface.

19. The frictional roller reducer according to claim 13, wherein
the elastic member is configured by a wave washer.

20. The frictional roller reducer according to claim 13, wherein
the elastic member is configured by a torsion coil spring.

21. The frictional roller reducer according to claim 14 including a retainer having retaining holes penetrating in the axial direction at a plurality of locations in a circumferential direction and arranged between the pair of roller elements, wherein
a screw coil spring is held in each of the retaining holes.

* * * * *